United States Patent
Gotou et al.

(10) Patent No.: US 10,266,710 B2
(45) Date of Patent: Apr. 23, 2019

(54) INK, IMAGE FORMING METHOD, AND LIQUID DISCHARGING DEVICE

(71) Applicants: Hiroshi Gotou, Kanagawa (JP); Masahiko Ishikawa, Shizuoka (JP)

(72) Inventors: Hiroshi Gotou, Kanagawa (JP); Masahiko Ishikawa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/666,131

(22) Filed: Aug. 1, 2017

(65) Prior Publication Data
US 2018/0030292 A1 Feb. 1, 2018

(30) Foreign Application Priority Data

Aug. 1, 2016 (JP) .................. 2016-151470
Nov. 15, 2016 (JP) .................. 2016-222510
Jun. 12, 2017 (JP) .................. 2017-114844

(51) Int. Cl.
*B41J 2/01* (2006.01)
*C09D 11/107* (2014.01)
(Continued)

(52) U.S. Cl.
CPC ............... *C09D 11/107* (2013.01); *B41J 2/01* (2013.01); *C09D 11/00* (2013.01); *C09D 11/03* (2013.01);
(Continued)

(58) Field of Classification Search
None
See application file for complete search history.

(56) References Cited

U.S. PATENT DOCUMENTS

2006/0187278 A1* 8/2006 Langford .......... B41J 2/175
347/84
2012/0329940 A1* 12/2012 Shimanaka ........ C09C 3/12
524/547
(Continued)

FOREIGN PATENT DOCUMENTS

EP    3 093 316 A1    11/2016
EP    3 219 766 A1    9/2017
(Continued)

OTHER PUBLICATIONS

Robert F. Fedors, "A Method for Estimating Both the Solubility Parameters and Molar Volumes of Liquids," Polymer Engineering and Science, vol. 14, No. 2, 1974, pp. 147-154.
(Continued)

*Primary Examiner* — Erica S Lin
(74) *Attorney, Agent, or Firm* — Oblon, McClelland, Maier & Neustadt, L.L.P.

(57) ABSTRACT

An ink includes a coloring material, one or more organic solvents, a resin particle including a structure unit having a carboxyl group and a structure unit having an alkoxysilyl group, and water. The one or more organic solvents includes at least one organic solvent having a solubility parameter of 8.96 to less than 11.8. The ink has a dynamic surface tension A of 34.0 mN/m or less for a surface life of 15 msec at 25 degrees C. according to maximum bubble pressure technique. The dynamic surface tension A and a static surface tension B of the ink at 25 degrees C. satisfy the following relation: $10.0 \text{ percent} \leq [(A-B)/(A+B)] \times 100 \leq 19.0 \text{ percent}$.

20 Claims, 4 Drawing Sheets

(51) Int. Cl.
- *C09D 11/00* (2014.01)
- *C09D 11/03* (2014.01)
- *C09D 11/033* (2014.01)
- *C09D 11/037* (2014.01)
- *C09D 11/322* (2014.01)
- *C09D 11/324* (2014.01)
- *C09D 11/36* (2014.01)
- *C09D 11/106* (2014.01)
- *C09D 11/38* (2014.01)

(52) U.S. Cl.
CPC .......... *C09D 11/033* (2013.01); *C09D 11/037* (2013.01); *C09D 11/106* (2013.01); *C09D 11/322* (2013.01); *C09D 11/324* (2013.01); *C09D 11/36* (2013.01); *C09D 11/38* (2013.01)

(56) References Cited

U.S. PATENT DOCUMENTS

| | | |
|---|---|---|
| 2013/0194343 A1 | 8/2013 | Yokohama et al. |
| 2013/0323474 A1 | 12/2013 | Gotou et al. |
| 2014/0002539 A1 | 1/2014 | Goto et al. |
| 2014/0240391 A1 | 8/2014 | Goto et al. |
| 2014/0368572 A1 | 12/2014 | Goto |
| 2015/0030818 A1 | 1/2015 | Fujii et al. |
| 2015/0035896 A1* | 2/2015 | Gotou ................. B41J 11/0015 347/20 |
| 2015/0077480 A1 | 3/2015 | Fujii et al. |
| 2015/0079358 A1 | 3/2015 | Gotou et al. |
| 2015/0103116 A1 | 4/2015 | Gotou |
| 2015/0283828 A1 | 10/2015 | Aoai et al. |
| 2015/0307729 A1 | 10/2015 | Gotou et al. |
| 2016/0222234 A1 | 8/2016 | Matsuyama et al. |
| 2016/0333208 A1 | 11/2016 | Gotou et al. |
| 2016/0376455 A1 | 12/2016 | Katoh et al. |
| 2017/0009092 A1 | 1/2017 | Gotou et al. |
| 2017/0022381 A1 | 1/2017 | Takamura et al. |
| 2017/0121543 A1 | 5/2017 | Sakaguchi et al. |
| 2017/0130081 A1 | 5/2017 | Toyama et al. |
| 2017/0182770 A1 | 6/2017 | Gotou |
| 2017/0267889 A1 | 9/2017 | Katsuragi |

FOREIGN PATENT DOCUMENTS

| | | |
|---|---|---|
| JP | 2010-159355 | 7/2010 |
| JP | 2012-207202 | 10/2012 |
| JP | 2014-094998 | 5/2014 |

OTHER PUBLICATIONS

Imoto, Minoru, "Basic Theory of Attachment. fourth section," Koubunshi Kagakukai, Mar. 1, 1993, pp. 150-163.

Extended European Search Report dated Oct. 12, 2017 in Patent Application No. 17183972.3.

\* cited by examiner

INK, IMAGE FORMING METHOD, AND LIQUID DISCHARGING DEVICE

CROSS-REFERENCE TO RELATED APPLICATIONS

This patent application is based on and claims priority pursuant to 35 U.S.C. § 119 to Japanese Patent Application Nos. 2016-151470, 2016-222510, and 2017-114844, filed on Aug. 1, 2016, Nov. 15, 2016, and Jun. 12, 2017, respectively, in the Japan Patent Office, the entire disclosures of which are hereby incorporated by reference herein.

BACKGROUND

Technical Field

The present invention relates to an ink, image forming method, and a liquid discharging device.

Description of the Related Art

Color images can be easily recorded with low running cost by an image forming method utilizing inkjet recording method. Therefore, the inkjet recording method is widely and rapidly diffusing.

SUMMARY

According to the present invention, provided is an improved ink which includes a coloring material, one or more organic solvents, a resin particle including a structure unit having a carboxyl group and a structure unit having an alkoxysilyl group, and water. The one or more organic solvents includes at least one organic solvent having a solubility parameter of 8.96 to less than 11.8. The ink has a dynamic surface tension A of 34.0 mN/m or less for a surface life of 15 msec at 25 degrees C. according to maximum bubble pressure technique. The dynamic surface tension A and a static surface tension B of the ink at 25 degrees C. satisfy the following relation: $10.0$ percent$\leq [(A-B)/(A+B)]\times 100 \leq 19.0$ percent.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
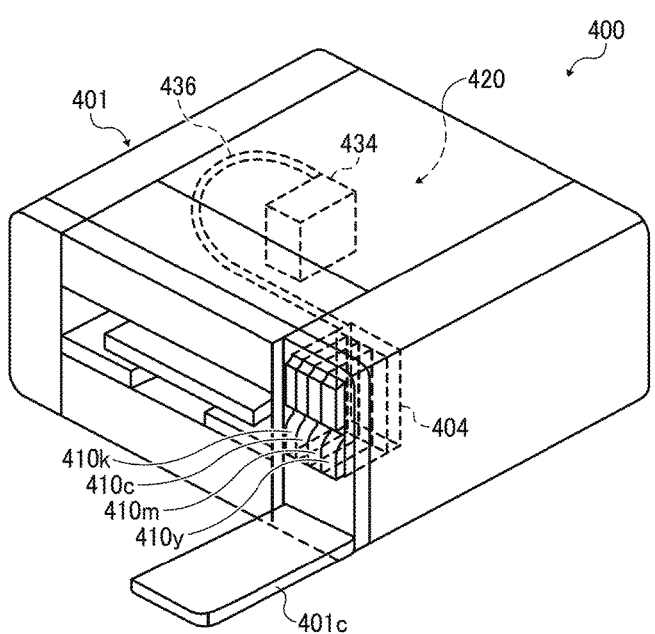
FIG. 1 is a diagram illustrating an example of the recording device using the ink according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Ink

The ink of the present disclosure includes a coloring material, one or more organic solvents, a resin particle including a structure unit having a carboxyl group and a structure unit having an alkoxysilyl group and water. The one or more organic solvents includes at least one organic solvent having a solubility parameter of 8.96 to less than 11.8. The ink has a dynamic surface tension A of 34.0 mN/m or less for a surface life of 15 msec at 25 degrees C. according to maximum bubble pressure technique. The dynamic surface tension A and the static surface tension B of the ink at 25 degrees C. satisfy the following relation: $10.0$ percent$\leq [(A-B)/(A+B)]\times 100 \leq 19.0$ percent. Also, the ink preferably includes a surfactant and other optional components.

The ink of the present disclosure was made based on the knowledge that since the relation between the dynamic surface tension of a typical ink for a surface life of 15 msec according to maximum bubble pressure technique and the static surface tension of the typical ink is not optimized, the ink is easily wet on a repelling ink film of the nozzle plate of an ink head so that the ink is attached to the nozzle, thereby degrading discharging stability.

In the ink of the present disclosure, the resin particle includes a structure unit having a carboxyl group and a structure unit having an alkoxysilyl group. The one or more organic solvent includes at least one organic solvent having a solubility parameter of 8.96 to less than 11.8. The ink has a dynamic surface tension A of 34.0 mN/m or less for a surface life of 15 msec at 25 degrees C. according to maximum bubble pressure technique.

Moreover, the dynamic surface tension A and the static surface tension B of the ink at 25 degrees C. satisfy the following relation: $10.0$ percent$\leq [(A-B)/(A+B)]\times 100 \leq 19.0$ percent. Therefore, the ink is secured to have wettability to a recording medium and is quickly permeated into a general printing paper having poor ink absorption property such as coated paper having a coated layer. In addition, viscosity of the ink increases on paper due to quick agglomeration of the pigment thereon during the drying process after the ink lands on the paper, so that beading can be suppressed.

In general, polyurethane resin particles and acrylic-based resin particles are unstabilized when they are brought into contact with an organic solvent having a solubility parameter of from 8.96 to less than 11.8. As a result, storage stability and discharging stability of ink are not secured. As a result of an investigation on this issue, the present inventors have found that stability of the resin particles to the organic solvents is increased if the resin particles include a structure unit having a carboxyl group and a structure unit having an alkoxysilyl group, so that storage stability of the ink becomes good and also discharging stability thereof is enhanced. Moreover, the present inventors also have found that blocking resistance, which is one of fixability, is improved.

The dynamic surface tension A of the ink for a surface life of 15 msec according to maximum bubble pressure technique is 34.0 mN/m or less, preferably 30.1 mN/m or less, more preferably 30.0 mN/m or less, furthermore preferably from 25.0 to 30.1 mN/m, and particularly preferably from 27.5 to 30.0 mN/m.

When the dynamic surface tension A is 34.0 mN/m or less, wettability and permeability to the general printing paper become good and beading and color bleed are also suppressed. In addition, coloring and occurrence of white spots on plain paper can be suppressed.

Dynamic surface tension of the ink at 25 degrees C. for a surface life of 15 msec according to maximum bubble pressure technique can be measured by, for example, SITA_DynoTester (manufactured by SITA Messtechnik GmbH).

The dynamic surface tension A and the static surface tension B of the ink at 25 degrees C. satisfy the following relation: 10.0 percent$\leq$[(A-B)/(A+B)]$\times$100$\leq$19.0 percent, preferably the relation: 10.7 percent$\leq$[(A-B)/(A+B)]$\times$100$\leq$17.3 percent, and more preferably the relation: 12.0 percent$\leq$[(A-B)/(A+B)]$\times$100$\leq$17.0 percent.

When the dynamic surface tension A and the static surface tension B of the ink at 25 degrees C. satisfy the following relation: 10.0 percent$\leq$[(A-B)/(A+B)]$\times$100$\leq$19.0 percent, the balance between the dynamic surface tension A and the static surface tension B of the ink is optimized. Therefore, the ink tends not to be easily wet on the repelling ink film of the nozzle plate of an inkjet head so that extremely stable ink can be obtained which has good discharging stability with non-discharging nozzle during continuous discharging.

It is necessary to suitably adjust the kind and the content of a surfactant in ink to cause the ink to have a dynamic surface tension A of 34.0 mN/m or less for a surface life of 15 msec at 25 degrees C. according to maximum bubble pressure technique and satisfy the relation between the dynamic surface tension A and the static surface tension B at 25 degrees C.: 10.0 percent$\leq$[(A-B)/(A+B)]$\times$100$\leq$19.0 percent.

It is preferable to use a polyether-modified siloxane compound, which is described later, as the surfactant. In addition, a preferable range of the content of the surfactant is specified later.

The static surface tension B of the ink at 25 degrees C. is preferably from 20.0 to 30.0 mN/m and more preferably from 20.8 to 26.8 mN/m.

When the static surface tension is in the range of from 20.0 to 30.0 mN/m, permeability of the ink can be enhanced so that cockling and curling are suppressed and permeation drying becomes good on plain paper.

Static surface tension of the ink can be measured at 25 degrees C. by using a fully-automatic surface tensiometer (CBVP-Z, manufactured by Kyowa Interface Science Co., Ltd.).

Organic Solvent

The one or more organic solvents include at least one organic solvent having a solubility parameter of from 8.96 to less than 11.8. The solubility parameter is preferably from 9 to less than 11.8 and more preferably from 9.03 to 11.3.

Inclusion of the organic solvent having a solubility parameter of from 8.96 to less than 11.8 makes it possible to suppress occurrence of beading on general printing paper.

The organic solvent in the present disclosure is a generic term for organic compounds classified as solvents and includes material represented by function such as wetting agent and permeating agent as long as they are compounds classified as solvents.

The solubility parameter (SP value) is a value indicating how easily both are mutually dissolved in each other. The SP value is represented by an attractive intermolecular force, that is, a square root of cohesive energy density (CED). CED is an energy required to evaporate 1 mL of an article.

The solubility parameter (SP) value is defined by the regular solution theory introduced by Hildebrand and indicates the solubility of a two-component system solution.

There are theories about the calculation method of SP value. In the present disclosure, a generally-used Fedors method is used.

According to Fedors method, the SP value can be calculated using the following relation B.

$$\text{SP value (solubility parameter)}=(CED)^{1/2}=(E/V)^{1/2} \qquad \text{Relation B}$$

In the relation B, E represents a molecule cohesion energy (cal/mol) and V represents a molecule volume (cm$^3$/mol). When the evaporation energy and the mol volume of an atom group are respectively $\Delta ei$ and $\Delta vi$, E and V are respectively represented by the following relation C and the following relation D.

$$E=\Sigma \Delta ei \qquad \text{Relation C}$$

$$V=\Sigma \Delta vi \qquad \text{Relation D}$$

As the calculation method and the data of evaporation energy $\Delta ei$ and the mol volume $\Delta vi$ of each atomic group, the data shown in Imoto, Minoru. Basic Theory of Attachment, fourth section, "KOUBUNSHI KAGAKUKAI" can be used.

In addition, regarding articles in which no —CF3 group, etc., is shown, R. F. Fedors, Polymer Eng. Sci. 14, 147 (1974) can be referred.

As the organic solvent having a solubility parameter of 8.96 to less than 11.8, at least one member selected from the group consisting of the amide compound represented by the following Chemical formula I and the oxetane compound represented by the following Chemical formula II is more preferable.

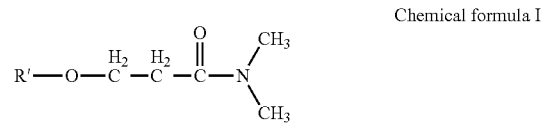

Chemical formula I

In the Chemical formula 1, R' represents an alkyl group having 4 to 6 carbon atoms, Chemical formula II

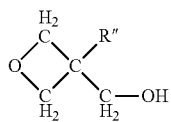

In the Chemical formula II, R″ represents an alkyl group having one or two carbon atoms.

Specific examples of the amide compound represented by the Chemical formula I and the oxetane compound represented by the Chemical formula II include, but are not limited to, but the following compounds.

Chemical structure 1

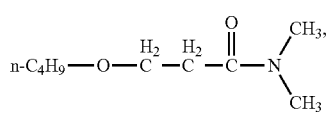

SP value: 9.03

Chemical structure 2

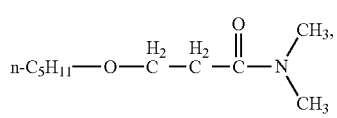

SP value: 9.00

Chemical structure 3

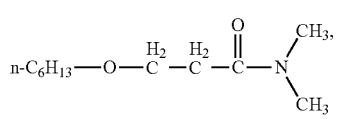

SP value: 8.96

Chemical structure 4

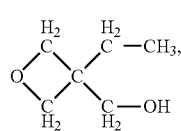

SP value: 11.3

Chemical structure 5

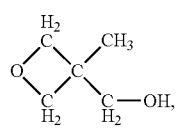

SP value: 11.79

Specific examples of the organic solvents having a solubility parameter of from 8.96 to less than 11.8 in addition to the amide compound represented by the Chemical formula I and the oxetane compound represented by the Chemical formula II include, but are not limited to, 3-ethyl-oxetane methanol (SP value: 11.31), β-methoxy-N,N-dimethylpropionamide (SP value: 9.19), β-buthoxy-N,N-dimethyl propionamide (SP value: 9.03), diethylene glycol monoethylether (SP value: 10.14), diethylene glycol monoisopropyl ether (SP value: 9.84), diethylene glycol monoisobutylether (SP value: 9.44), methylpolyglycol (SP value: 9.77), polypropylene glycol 250 (SP value: 10.46), polypropylene glycol 400 (SP value: 9.77), tripropylene glycol methylether (SP value: 9.77), polypropylene glycol glycerylether (SP value: 10.29), polypropylene glycol monomethylether (SP value: 9.05), polybutylene glycol 500 ESP value: 9.51), methylpropylene triglycol (SP value: 9.43), (2EO)(2PO) butyhlether (SP value: 9.11), (5EO)(5PO)butyhlether (SP value: 9.04), diethylene glycol mono-n-butylether (SP value: 9.86), diethylene glycol mono-vinylether (SP value: 10.90), diethylene glycol monomethyletther (SP value: 10.34), diethylene glycol monobuthyletther (SP value: 9.77), triethylene glycol monomethyletther (SP value: 10.12), diethylene glycol monoethyletther acetate (SP value: 9.31), N-methyldiisopropanol amine (SP value: 11.29), γ-butylolactone methacrylate (SP value: 11.15), methylacetate (SP value: 9.39), ethylacetate (SP value: 9.26), n-propylacetate (SP value: 9.17), n-propylalcohol (SP value: 10.52), butyhlacetate (SP value: 9.09), methylpropylene glycol (SP value: 9.73), propylene glycol-n-propylether (SP value: 9.82), 1-methoxy-2-propylacetate (SP value: 9.11), methylpropylene glycolacetate (SP value: 9.11), propylepropylene glycol (SP value: 9.82), ethyleneglycol monomethylether acetate (SP value: 9.39), cyclohexanol acetate (SP value: 10.01), butylpropylenen glycol (SP value: 9.69), 3-methoxybutyl acetate (SP value: 9.05), 3-methoxybutanol (SP value: 9.98), 3-methoxy-1-propanol (SP value: 10.41), 1,2-dimethyl-1,4,5,6-tetrahydropyrimidine (SP value: 10.21), ethyleneglycol mono-n-butylether acetate (SP value: 9.15), dipropylene glycol methylether (SP value: 9.69), 1,6-hexane dioldiacetate (SP value: 9.99), butylpropylene diglycol (SP value: 9.43), 1,4-butane dioldiacetate (SP value: 10.25), propylpropylenediglycol (SP value: 9.50), 1,3-butylenenglycol diacetate (SP value: 10.11), diethylene glycol monobutyletheracetate (SP value: 9.19), propylenenglycoldiacetate (SP value: 10.27), and dipropylenenglycol methyletheracetate (SP value: 8.99). These can be used alone or in combination.

As the organic solvents in addition to the amide compound represented by the Chemical formula I and the oxetane compound represented by the Chemical formula II, it is preferable to use polyhydric alcohols and permeating agents having a solubility parameter (SP value) of from 11.8 to 14.0.

Specific examples of the polyhydric alcohols having a solubility parameter (SP value) of from 11.8 to 14.0 include, but are not limited to, 3-methyl-1,3-butanediol (SP value: 12.05), 1,2-butane diol (SP value: 12.8), 1,3-butane diol (SP value: 12.75), 1,4-butane diol (SP value: 12.95), 2,3-butane diol (SP value: 12.55), 1,2-propane diol (SP value: 13.5), 1,3-propane diol (SP value: 13.72), 1,2-hexane diol (SP value: 11.8), 1,6-hexanediol (SP value: 11.95), 3-methyl-1,5-pentanediol (SP value: 11.8), triethyleneglycol (SP value: 12.12), and diethylenenglycol (SP value: 13.02). These can be used alone or in combination.

Of these, 3-methyl-1,3-butanediol (SP value: 12.05), 1,2-butanediol (SP value: 12.8), 1,3-butanediol (SP value: 12.75), 1,4-butanediol (SP value: 12.95), 2,3-butanediol (SP value: 12.55), 1,2-propanediol (SP value: 13.5), 1,3-propanediol (SP value: 13.72) are preferable. 1,2-butanediol (SP value: 12.8) and 1,2-propanediol (SP value: 13.5) are more preferable.

The total content of the polyhydric alcohol having an solubility parameter (SP value) of from 11.8 to 14.0, the amide compound represented by the Chemical formula I, and the oxetane compound represented by Chemical formula II preferably accounts for 30 to 60 percent by mass of the total content of ink.

When the content is 30 percent by mass or greater, beading and color bleed between colors on general printing paper can be suppressed. When the content is 60 percent by mass or less, the image quality can be good and the ink viscosity can be suitable, which makes discharging stability good.

Examples of the permeating agent are polyhydric alcohols and glycolethers having a solubility parameter of from 8.96 to less than 11.8.

Of these, 1,3-diol compounds represented by the following Chemical formula VII are preferable. 2-ethyl-1,3-hexane diol (SP value: 10.6) and 2,2,4-trimethyl-1,3-pentane diol (SP value: 10.8) are particularly preferable.

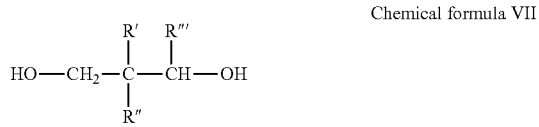

Chemical formula VII

In the Chemical formula VII, R' represents a methyl group or an ethyl group, R" represents a hydrogen atom or a methyl group, and R''' represents an ethyl group or a propyl group.

Specific examples of the permeating agent include, but are not limited to, 2-ethyl-2-methyl-1,3-propanediol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2,5-hexane diol, and 5-hexene-1,2-diol.

The proportion of the permeating agent is preferably from 0.5 to 4 percent by mass, more preferably from 1 to 3 percent by mass, and particularly preferably from 1 to 2 percent by mass to the total content of ink. When the proportion is not less than 0.5 percent by mass, ink is suitably permeated into a medium, which has a good impact on the image quality. When the proportion is not greater than 4 percent by mass, initial viscosity of ink becomes suitable.

The proportion of the organic solvent having a solubility parameter of from 8.96 to less than 11.8 to the entire ink is preferably 10 percent by mass or greater and more preferably from 20 to 60 percent by mass to the entire amount of ink.

When the proportion is 10 percent by mass or more, beading on general printing paper is sufficiently suppressed, thereby suppressing occurrence of color bleeding between colors. When the proportion is not greater than 60 percent by mass, image quality is improved and initial viscosity of ink becomes suitable, thereby stabilizing discharging.

The organic solvent preferably includes no polyhydric alcohol having an equilibrium moisture content of 30 percent or more at 23 degrees C. and a relative humidity of 80 percent.

The equilibrium moisture content is obtained based on the following relation A in the following manner: a petri dish on which one gram of each organic solvent is placed is stored in a desiccator while keeping the temperature from 22 to 24 degrees C. and relative humidity from 77 to 83 percent in the desiccator using a saturated solution of potassium chloride and sodium chloride.

Equilibrium moisture content (percent)=[moisture amount absorbed in organic solvent/(amount of organic solvent+moisture amount absorbed therein)]×100    Relation A If the organic solvent contains a polyhydric alcohol having an equilibrium moisture content of 30 percent or more at 23 degrees C. and an RH of 80 percent, ink is not easily permeated into general printing paper having poor ink absorption property such as coated paper having a coated layer so that the ink slowly dries after the ink lands on the paper, which may cause beading.

Specific examples include, but are not limited to, 1,2,3-butanetriol (equilibrium moisture content: 38 percent), 1,2,4-butanetriol (equilibrium moisture content: 41 percent), glycerin (equilibrium moisture content: 49 percent, SP value: 16.38). diglycerin (equilibrium moisture content: 38 percent), triethylene glycol (equilibrium moisture content: 39 percent, SP value: 15.4), tetraethylene glycol (equilibrium moisture content: 37 percent), diethylene glycol (equilibrium moisture content: 43 percent), and 1,3-butane diol (equilibrium moisture content: 35 percent).

Coloring Material

The coloring material has no particular limit. For example, pigments and dyes are usable. Of these, pigments are preferably used in terms of weatherability.

The pigment are typified into organic pigments and inorganic pigments.

Specific examples of the inorganic pigments include, but are not limited to, titanium oxide, iron oxide, calcium oxide, barium sulfate, aluminum hydroxide, barium yellow, cadmium red, chrome yellow, and carbon black. Of these, carbon black is preferable.

Carbon black (Pigment Black 7) can be manufactured by a known method such as a contact method, a furnace method, and a thermal method.

Specific examples include, but are not limited to, channel black, furnace black, gas black, and lamp black.

Examples of carbon black available on the market are Black Pearls®, Elftex®, Monarch®, Regal®, Mogul®, and Vulcan®.

Specific examples include, but are not limited to, Black Pearls 2000, Black Pearls 1400, Black Pearls 1300, Black Pearls 1100, Black Pearls 1000, Black Pearls 900, Black Pearls 880, Black Pearls 800, Black Pearls 700, Black Pearls 570, Black Pearls L, Elftex 8, Monarch 1400, Monarch 1300, Monarch 1100, Monarch 1000, Monarch 900, Monarch 880, Monarch 800, Monarch 700, Mogul L, Regal 330, Regal 400, Regal 660, and Vulcan P (all available from Cabot Corporation), SENSIJET Black SDP100 (available form SENSIENT), SENSIJET Black SDP 1000 (available from SENSIENT), and SENSIJET Black SDP 2000 (available from SENSIENT). These can be used alone or in combination.

Specific examples of the organic pigments include, but are not limited to, azo pigments, polycyclic pigments, dye chelate, nitro pigments, nitroso pigments, and aniline black. Of these, azo pigments and polycyclic pigments are preferable.

Specific examples of the azo pigments include, but are not limited to, azo lake, insoluble azo pigments, condensation azo pigments, and chelate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, and quinofuranone pigments. The dye chelate includes, but are not limited to, basic dye type chelate, and acidic dye type chelate.

Specific examples of the organic pigment include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 139, 150, 151, 153, 155, 180, 183, 185 and 213; C.I. Pigment Orange 5, 13, 16, 17, 36, 43, and 51; C.I. Pigment Red 1, 2, 3, 5, 17, 22, 23, 31, 38, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36. These can be used alone or in combination.

The specific surface area of the pigment has no particular limit and can be suitably selected to suit to a particular application. For example, the specific surface area is preferably from 10 to 1,500 $m^2/g$, more preferably from 20 to 600 $m^2/g$, and furthermore preferably from 50 to 300 $m^2/g$.

Unless a pigment having such a suitable surface area is available, it is possible to reduce the size of the pigment or pulverize it by using, for example, a ball mill, a jet mill, or ultrasonic wave for the pigment to have a relatively small particle diameter.

The 50 percent cumulative volume particle diameter (D50) of the pigment is preferably from 10 to 200 nm in ink.

The pigment is preferably a water-dispersible pigment. As the water-dispersible pigment, for example, (1). Surfactant dispersion pigment in which a pigment is dispersed by a surfactant, (2). A resin dispersion pigment in which a pigment is dispersed by a resin, (3). A resin coated dispersion pigment in which the surface of a pigment is covered with a resin, and (4). A self-dispersible pigment in which a hydrophilic group is provided to the surface of a pigment are suitable.

Of these, in terms of storage stability over time and restraint of viscosity increase during water evaporation, 3. The resin coverage dispersion pigment in which the surface of a pigment is covered with a resin and 4. The self-dispersible pigment in which a hydrophilic group is provided to the surface of a pigment are preferable.

As the self-dispersible pigment of 4 mentioned above in which a hydrophilic group is provided to the surface of a pigment, anionic-charged self-dispersible pigment is preferable. Specific examples of anionic hydrophilic groups of self-dispersible pigments include, but are not limited to, —COOM, —$SO_3M$, —$PO_3HM$, —$PO_3M_2$, —$CONM_2$, —$SO_3NM_2$, —NH—$C_6H_4$—COOM, —NH—$C_6H_4$—$SO_3M$, —NH—$C_6H_4$—$PO_3HM$, —NH—$C_6H_4$—$PO_3M_2$, —NH—$C_6H_4$—$CONM_2$, and —NH—$C_6H_4$—$SO_3NM_2$ Examples of the counter ion M are alkali metal ions and quaternary ammonium ion. Of these, quaternary ammonium ion is preferable.

Specific examples of quaternary ammonium ions include, but are not limited to, tetramethyl ammonium ion, tetraethyl ammonium ion, tetrapropyl ammonium ion, tetrabutyl ammonium ion, tetra pentyl ammonium ion, benzyl trimethyl ammonium ion, benzyl triethyl ammonium ion, and tetrahexyl ammonium ion. Of these, tetraethyl ammonium ion, tetrabutyl ammonium ion, and benzyl trimethyl ammonium ion are preferable. Of these, tetrabutyl ammonium ion is preferable.

If the self-dispersible pigment having a hydrophilic functional group or a quaternary ammonium ion is used, affinity is demonstrated in both water rich ink or organic solvent rich ink so that dispersion stability of pigment can be inferred to be maintained stable.

Of these self-dispersible pigments, if ink that uses a pigment modified by at least one of geminalbis phosphonic acid group and geminalbis phosphonic acid salt group has an excellent re-dispersibility after being dried, clogging does not occur even when the ink moisture around the inkjet head nozzles evaporates while the printing device is not operated for a long time. Therefore, the quality of images can be maintained by a simple cleaning operation. Moreover, since such ink has good storage stability over time and can restrain viscosity increase during moisture evaporation, ink fixability and discharging reliability at a head maintaining device are extremely excellent.

Specific examples of phosphonic acid group and phosphonic acid salt group are represented by the following Chemical structure i to Chemical structure iv.

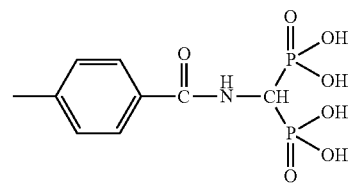

Chemical structure i

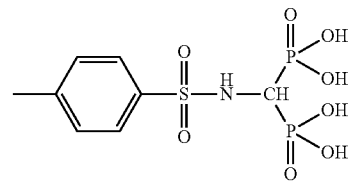

Chemical structure ii

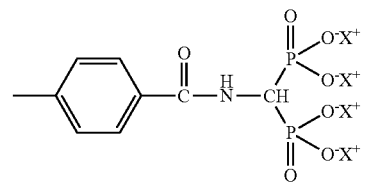

Chemical structure iii

In the Chemical structure iii, $X^+$ represents $Li^+$, $Na^+$, $NH_4^+$, $N(CH_3)_4^+$, $N(C_2H_5)_4^+$, $N(C_3H_7)_4^+$ or $N(C_4H_9)_4^+$.

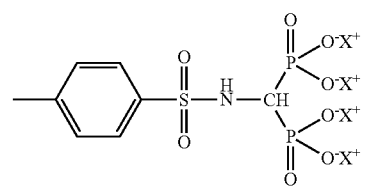

Chemical structure iv

In the Chemical structure iv, $X^+$ represents $Li^+$, $K^+$, $Na^+$, $NH_4^+$, $N(CH_3)_4+$, $N(C_2H_5)_4^+$, $N(C_3H_7)_4^+$, or $N(C_4H_9)_4^+$.

Reforming Treatment of Surface of Pigment

Reforming treatment of the surface of a pigment is described taking a case of geminalbis phosphonic acid group as an example. For example, the pigment can be reformed by the following method A or method B.

Method A 20 g of carbon black, 20 mmol of the compound represented by Chemical structure v or Chemical structure vi illustrated below, and 200 mL of deionized highly pure water are mixed at room temperature by a Silverson Mixer (6,000 rpm). When an obtained slurry has a pH greater than 4, 20 mmol of nitric acid is added. 30 minutes later, 20 mmol of sodium nitrite dissolved in a minute amount of deionized highly pure water is slowly added to the mixture. Furthermore, when the resultant is heated to 60 degrees C. while being stirred to conduct reaction for one hour, a reformed pigment is obtained in which the compound represented by Chemical structure v or Chemical structure vi is added to carbon black. Thereafter, the pH of the reformed pigment is adjusted to be 10 by NaOH aqueous solution, a reformed pigment dispersion is obtained 30 minutes later. Thereafter, subsequent to ultrafiltration by dialysis membrane using the reformed pigment dispersion and highly deionized water, the resultant is subject to ultrasonic wave dispersion to obtain a reformed pigment dispersion in which the solid portion is condensed.

Method B 500 g of dried carbon black, 1 L of highly deionized water, and one mol of the compound represented by Chemical structure v or Chemical structure vi are loaded in a mixer (4 L) (ProcessAll 4HV). Next, the mixture is vigorously mixed at 300 rpm for 10 minutes while keeping the system at 60 degrees C. Thereafter, 20 percent sodium nitrite aqueous solution (1 mol equivalent to the compound represented by Chemical structure v or Chemical structure vi is added in 15 minutes followed by mixing and stirring for three hours while keeping the system at 60 degrees C.

Thereafter, subsequent to withdrawal of the reactant while being diluted with 750 mL of highly deionized water, the resultant is subject to ultrafiltration by dialysis membrane using the thus-obtained reformed pigment dispersion and highly deionized water followed by ultrasonic wave dispersion to obtain a reformed pigment dispersion in which the solid portion is condensed. Moreover, when coarse particles are unnecessarily excessive, it is desirable to remove them by a centrifugal, etc.

Chemical structure v

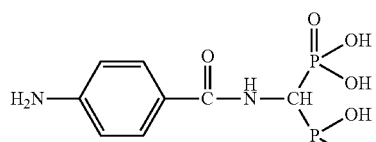

Chemical structure vi

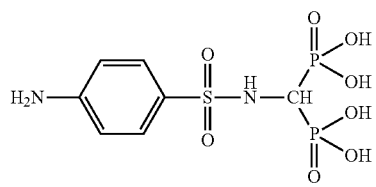

Optionally, it is suitable to add a pH regulator to the thus-obtained reformed pigment dispersion. As the pH regulator, the same pH regulator as specified for the ink, which are described later, can be used. Of these, $Na^+$, $N(CH_3)_4^+$, $N(C_2H_5)_4^+$, $N(C_3H_7)_4^+$, and $N(C_4H_9)_4^+$ are preferable.

Upon treatment by a pH regulator, at least part of the compound represented by Chemical structure v or Chemical structure vi is changed into a salt thereof (salt corresponding to a compound represented by Chemical structure iii or Chemical structure iv).

As the resin coated pigment dispersion of (3) mentioned above in which the surface of a pigment is coated with a resin, resin emulsion in which a pigment is contained in a resin is preferable.

The resin emulsion in which a pigment is contained in a resin means an article in which the pigment is encapsulated in the resin or adsorbed on the surface of the resin. In this case, it is not necessary that all the pigments are encapsulated or adsorbed and some of the pigments may be dispersed in the emulsion unless they have an adverse impact on the present disclosure.

Examples of the resin forming the resin emulsions are vinyl-based resins, polyester-based resins, and polyurethane-based resins. Of these, vinyl-based resins and the polyester-based resins are particularly preferable.

In this case, typical organic pigments or complex pigments in which inorganic pigment particles are coated with an organic pigment or carbon black can be used. The complex pigment can be manufactured by a method including precipitating organic pigments under the presence of inorganic pigments, a mechanochemical method including mechanically mixing and grinding inorganic pigments and organic pigments, etc.

Optionally, it is possible to provide an organosilane compound layer formed of polysiloxane and alkylsilane between inorganic pigments and organic pigments to improve attachability between them.

The organic pigment and the inorganic pigment have no particular limit and can be suitably selected from the mentioned above.

The mass ratio of the inorganic pigment particle and the organic pigment as coloring material or carbon black is preferably from 3:1 to 1:3 and more preferably from 3:2 to 1:2.

When the ratio of the coloring material is small, coloring property may deteriorate. As the ratio of the coloring material increases, transparency and saturation may deteriorate.

Suitable specific examples of such coloring material particles in which the inorganic pigment particle is covered with the organic pigment or carbon black include, but are not limited to, silica/carbon black complex material, silica/phthalocyanine complex material (PB15:3), silica/disazo yellow complex material, and silica/quinacridone complex material (PR122) (all manufactured by TODAKOGYO CORP.) because these have small primary particle diameters.

When inorganic pigment particles having a primary particle diameter of 20 nm are covered with an equivalent amount of organic pigments, the primary particle diameter of the pigment is about 25 nm. If a suitable dispersant is used to disperse the pigment to the degree of the primary particle diameter, it is possible to manufacture ultrafine pigment dispersion ink having a dispersion particle diameter of 25 nm.

With regard to the complex material, the organic pigment on the surface thereof contributes to dispersion. Also, since the feature of the inorganic pigment disposed in the center of the complex material demonstrates through the thin layer of the organic pigment having a thickness of about 2.5 nm, it is required to suitably select a pigment dispersant capable of stably dispersing both the organic pigment and the inorganic pigment at the same time.

The proportion of the coloring material to the entire ink is preferably from 1 to 15 percent by mass and more preferably 2 to 10 percent by mass. When the proportion is 1 percent by mass or greater, the coloring property of the ink and the image density are improved. When the proportion is not greater than 15 percent by mass, the ink does not thicken so that deterioration of discharging property can be prevented. It is also preferable in terms of economy.

Resin Particle

The resin particle has a structure unit including a carboxyl group and a structure unit including an alkoxysilyl group.

The resin particle has excellent film-forming (image forming) property, chemical resistance, water-resistance, and weather-resistance. Fixability ameliorates because the resin particle does not easily swell against a solvent added to ink due to this excellent chemical resistance. In addition, this excellent water resistance contributes to forming images having high image density (high coloring).

In the ink of the present disclosure, it is preferable that a resin particle having a charge having the same polarity as the pigment as coloring material and including a structure unit including a carboxyl group or an alkoxysilyl group be added in a form of resin emulsion.

The resin in the resin emulsion preferably has a glass transition temperature (Tg) is 15 degrees C. or higher, preferably 30 degrees C. or higher and more preferably 40 degrees C. or higher and preferably 100 degrees C. or lower and more preferably 70 degrees C. or lower as the upper limit.

The glass transition temperature (Tg) of the resin is logically guided based on the following relation I. Incidentally, the structure unit including an alkoxysilyl group is not included in the calculation of the glass transition temperature (Tg).

$$1/Tg = [(W1/Tg1) + (W2/Tg2) + \cdots + (Wn/Tgn)]/100 \quad \text{Relation I}$$

In the Relation I, W1 represents percent by mass of a monomer 1, Tg1 represents the glass transition temperature (degrees K) of the homopolymer that can be formed only from the monomer 1, W2 represents percent by mass of a monomer 2, Tg2 represents the glass transition temperature (degrees K) of the homopolymer that can be formed only from the monomer 2, Wn represents percent by mass of a monomer n, and Tgn represents the glass transition temperature (degrees K) of the homopolymer that can be formed only from the monomer n. W1+W2+ $\cdots$ +Wn=100

When an article having a radical polymerizable unsaturated group is used as an emulsifier during polymerization of a radical polymerizable unsaturated monomer in an aqueous medium, the emulsifier having a radical polymerizable unsaturated group is excluded from the identification of the structure of the radical polymerizable unsaturated monomer and the calculation of the glass transition temperature (Tg) of the copolymer as the monomer.

The proportion of (1): the structure unit (radical polymerizable unsaturated monomer having a carboxyl group) (a1) including a carboxylic group is preferably from 0.1 to 10 percent by mass in a resin, Specific examples of the radical polymerizable unsaturated monomer (a1) having a carboxyl group include, but are not limited to, acrylic acid, and methacrylic acid.

The proportion of (2): the structure unit (derived from a radical polymerizable unsaturated monomer having an alkoxysilyl group) (a2) including an alkoxysilyl group is preferably 0.1 percent by mass or greater and more preferably from 0.1 to 20 percent by mass in a resin. When the proportion is 0.1 percent by mass or greater, the particle size distribution of the formed resin particle according to dynamic light scattering and number counting method satisfies the condition specified above, the OD value becomes suitable, and abrasion resistance, fixability, and chemical resistance of the formed image matter can be enhanced. Most of the alkoxysilyl group is inferred to be hydrolyzed during formation of a resin emulsion and contributes to forming inner cross-linking of a resin particle. Part of the alkoxysilyl group is inferred to contribute to the formation of inter-particle cross-linking between resin particles and inter-particle cross-linking between resin particles and pigments. Therefore, when the proportion of the structure unit (a2) derived from a radical polymerizable unsaturated monomer having an alkoxysilyl group is 0.1 percent by mass or greater, the inner particle cross linking and inter-particle cross-linking due to the alkoxysilyl group can be suitable. As a consequence, the OD value becomes low and also abrasion resistance, fixability, and chemical resistance of formed image matter are enhanced.

Therefore, when the proportion of the structure unit (a2) derived from a radical polymerizable unsaturated monomer having an alkoxysilyl group is 0.1 percent by mass or greater, the inner particle cross linking and inter-particle cross-linking can be improved. As a consequence, the OD value is improved and also abrasion resistance, fixability, and chemical resistance of formed image matter are also enhanced.

Conversely, when a resin including the structure unit (a2) derived from a radical polymerizable unsaturated monomer having an alkoxysilyl group in an amount of greater than 20 percent by mass is used to form a resin emulsion, the structure unit derived from a radical polymerizable unsaturated monomer having an alkoxysilyl group is very hydrophobic, so that polymerization is difficult. Moreover, since the structure unit derived from a radical polymerizable unsaturated monomer having an alkoxysilyl group is a cross-linking component, it also serves as a component to degrade polymerization stability. In normal emulsion polymerization, if the cross-linking component is contained in an amount of 20 percent by mass or more, particles agglomerate during polymerization. As a consequence, no stable resin emulsion can be obtained.

Specific examples of the radical polymerizable unsaturated monomer (a2) having an alkoxysilyl group include, but are not limited to, γ-methacryloxy propylmethyl dimethoxy silane, γ-methacryloxy propyltrimethoxy silane, vinyltriethoxy silane, and vinyltrimethoxysilane.

Specific examples of the monomer (a3) controlling the glass transition temperatures (Tg) of other resins include, acrylic esters such as acrylic acid (Tg of homopolymer: 106 degrees C. or lower), methylacrylate (Tg of homopolymer: −8 degrees C.), ethylacrylate (Tg of homopolymer: −20 degrees C.), butylacrylate (Tg of homopolymer: −45 degrees C.), and acrylic acid-2-ethylhexyl (Tg of homopolymer: −55 degrees C.), methacrylic esters such as methacrylic acid (Tg of homopolymer: 228 degrees C.), methylmethacrylate (Tg of homopolymer: 100 degrees C.), ethylmethacrylate (Tg of homopolymer: 65 degrees C.), butylmethacrylate (Tg of homopolymer: 20 degrees C.), methacrylic acid-2-ethylhexyl (Tg of homopolymer: −10 degrees C.), and cyclohexyl methacrylate (Tg of homopolymer: 66 degrees C.), vinyl esters such as tertiary vinyl carboxylate, heterocyclic vinyl compounds such as vinyl pyrolidone, α-olefins such as ethylene and propylene, diens such as butadiene, monomers including glycidyl groups such as glycidylmethacrylate (Tg of homopolymer: 41 degrees C.) and allyl glycidyl ether, monomers including amino groups such as dimethyl aminoethyl methacrylate (Tg of homopolymer: 18 degrees C.), monomers including carboxylic acid amide group such as acrylamide (Tg of homopolymer: 150 degrees C.), monomers including cyano groups such as acrylonitrile (Tg of homopolymer: 96 degrees C.), and vinyl monomers such as styrene (Tg of homopolymer: 100 degrees C.) and divinyl benzene (Tg of homopolymer: 116 degrees C.). These can be used alone or in combination.

To obtain the resin emulsion, it is suitable to obtain a monomer pre-emulsion including a monomer liquid droplet having a volume average particle diameter of from 0.5 to 10 µm according to number counting method from the monomers (a1) to the monomer (a3), an emulsifier having an amount of 0.1 to less than 5 parts by mass to 100 parts of the total of the monomers (a1) to the monomer (a3), and water.

In the emulsion polymerization, the polymerization proceeds in water in such a manner that monomers served for polymerization is dissolved into water from the monomer liquid droplet little by little. That is, the polymerization field of the emulsion polymerization is not in the monomer liquid droplet but a micelle formed of an emulsifier produced in water phase. Therefore, to obtain a resin emulsion having a uniform composition and particle size distribution, it is suitable to proceed dissolution of monomers served for polymerization in water smoothly and uniformly.

The radical polymerizable unsaturated monomer (a2) having an alkoxysilyl group is a poorly water-soluble monomer having excellent hydrophobicity. To securely and uniformly such polymerize monomer (a2) having poorly water-solubility having excellent hydrophobicity, it is suitable to quickly dissolve the poorly-water-soluble monomer (a2) in water from the monomer liquid droplet.

To do so, it is suitable to use a monomer pre-emulsion having a monomer liquid droplet having a volume average particle diameter of from 0.5 to 10 µm and extremely suitable to use a monomer pre-emulsion having a monomer liquid droplet having a volume average particle diameter of from 0.5 to 5 µm. When the volume average particle diameter of the monomer liquid droplet in the monomer pre-emulsion is greater than 10 µm, the radical polymerizable unsaturated monomer (a2) having an alkoxysilyl group is not easily dissolved into water from the monomer liquid droplet. As a consequence, the monomer (a2) is not securely used to form resin particles but left still so that super coarse particles having a diameter of 1.5 µm or greater according to the number counting method and agglomeration are produced.

The monomer pre-emulsion having such a particle size distribution can be formed by, for example, a batch-type homomixer, an ultrasonic wave emulsifier, a high-pressure homogenizer, etc. suitably adjusting stirring speed, frequency, pressure, etc.

It is preferable that the particle diameter of the monomer pre-emulsion is small because as the particle diameter decreases, the dissolution speed of monomers from monomer droplets into water increases. However, it is generally difficult to obtain a monomer pre-emulsion having a volume average particle diameter less than 0.5 µm even by the devices mentioned above.

The volume average particle diameter of the monomer pre-emulsion according to the number counting method is preferably from 0.5 to 10 µm.

As in the case of checking coarse particles of resin emulsions, the monomer pre-emulsion is diluted with distilled water in such a manner that the monomer concentration is about from 0.001 to 0.05 percent by mass to obtain the volume average particle diameter thereof by Accusizer (available from PARTICLE SIZING SYSTEMS, USA).

The emulsifier accounts for 0.1 to less than 5 parts by mass and preferably 1 to 3 parts by mass of 100 parts by mass of the total content of the monomer (a1) to (a3). When the amount of the emulsifier is 5 parts by mass or more, water-resistance of formed image matter deteriorates. Conversely, when the amount of the emulsifier is less than 0.1 parts by mass, it is not possible to stably maintain the dispersion state of a monomer pre-emulsion.

It is possible to use an anionic emulsifier alone as emulsifier and use it in combination with a nonionic emulsifier.

Moreover, reactive emulsifiers having radical polymerizable functional groups, non-reactive emulsifiers having no radical polymerizable functional groups, or the combination of both can be used as the emulsifier. In order to improve water-resistance of formed image matter, it is preferable to use reactive emulsifiers having radical polymerizable functional groups.

The reactive emulsifier means anionic or nonionic emulsifier having at least one radically polymerizable unsaturated double bond in the molecule.

Specific examples include, but are not limited to, sulfo succinic acid ester-based emulsifier (for example, LATEMUL S-12OP, S-180, both manufactured by Kao Corporation, ELEMINOL JS-2, manufactured by Sanyo Chemical Industries, Ltd., etc.) and alkyl phenolether-based emulsifier (AQUALON KH-20, RN-20 both manufactured by DKS Co. Ltd.).

Specific examples of the non-reactive emulsifier include, but are not limited to, anionic non-reactive emulsifiers such as polyoxyethylene alkylphenyl ether sulfates, polyoxyethylene polycyclic phenyl ether sulfates, and polyoxyethylene alkylether sulfates, polyoxyethylene alkylphenyl ethers such as polyoxyethylene nonylphenyl ether and polyoxyethylene octyl phenyl ether, polyoxyethylene alkyl ethers such as polyoxyethylene lauryl ethers, polyoxyethylene stearyl ethers, and polyoxyethylene oleyl ether, polyoxy polycyclic phenylethers such as polyoxyethylene distyrenied phenylether, and nonionic non-reactive emulsifiers such as polyoxyethylene sorbitan aliphatic esters.

Specific examples of the anionic non-reactive emulsifiers include, but are not limited to, HITENOL NF-08 (number of repeated ethylene oxide units, hereinafter referred to as EO unit number: 8), NF-17 (EO unit number: 17) (both manufactured by DKS Co. Ltd.) and ELEMINOL ES-12 (EO unit number: 6), ES-30 (EO unit number: 15), and ES-70 (EO unit number: 35) (all manufactured by Sanyo Chemical Industries, Ltd.).

Specific examples of the nonionic non-reactive emulsifiers include, but are not limited to, EMULGEN (EO unit number: 8), 1118 S-70 (EO unit number: 18), 1135S-70 (EO unit number: 35), and 1150S-70 (EO unit number: 50) (all manufactured by Kao Corporation).

Those can be used alone or in combination.

The resin emulsion includes water, an emulsifier, and an aqueous polymerization initiator and it is suitable to conduct radical polymerization by dripping the monomer pre-emulsion to the polymerization field including no monomer pre-emulsion.

A great amount of water and part of the monomer pre-emulsion for dripping are loaded in a reactive container and thereafter the rest of the monomer pre-emulsion for dripping and a polymerization initiator are added thereto. Alternatively, a polymerization initiator, a polymerization initiator, and part of the monomer pre-emulsion for dripping are loaded in a reactive container and thereafter the rest of the monomer pre-emulsion for dripping is added thereto. These methods are typically employed to manufacture a resin emulsion.

However, when the radical polymerizable monomer (a2) having an alkoxysilyl group, which is poorly water-soluble, is used as described in the present disclosure, the monomer (a2) dissolved into water from monomer liquid droplets is supplied to the polymerization field and thereafter polymerized without accumulating in the polymerization field as quickly as possible. It is suitable that the monomer (a2) does not exist any more. That is, dissolution of the monomer (a2) and disappearance of the monomer (a2) due to the quick polymerization promote further dissolution of the monomer (a2), which smoothly proceeds polymerization reaction.

Therefore, in the present disclosure, no inclusion of part of the monomer pre-emulsion in a reactive container is suitable. If a part of the monomer pre-emulsion is loaded in a reactive container, when the rest of the monomer pre-emulsion is dripped from a dripping tank, the poorly water-soluble monomer (a2) in the monomer supplied by dripping accumulates in the polymerization field until the poorly water-soluble monomer (a2) in the monomer present from the start is consumed by polymerization, which causes super coarse particles to appear and agglomeration to occur.

The polymerization filed including water, an emulsifier, and an aqueous polymerization initiator in the present disclosure means that all of the three are present in the middle of polymerization of the monomers in a monomer pre-emulsion. That is, in addition to the method in which water, an emulsifier, and an aqueous polymerization initiator are loaded in a reactive container equipped with a heating device and a cooling device and monomer pre-emulsion is dripped thereto, a method of placing water and an emulsifier in such a reactive container and dripping a monomer pre-emulsion and an aqueous polymerization initiator from a separate dripping tank to the reactive container or a method of placing water and an emulsifier in such a reactive container and dripping a monomer pre-emulsion containing an aqueous polymerization initiator to the reactive container can be employed.

Examples of the emulsifier placed in the reactive container are the same as those specified when obtaining the monomer pre-emulsion.

The total content of the emulsifier constituting a monomer pre-emulsion and the emulsifier placed in the reactive container is from greater than 0.1 to 5 parts by mass to 100 parts of the total content of the monomers (a1) to (a3). When the content of the emulsifier is greater than 5 parts by mass in total, water-resistance of formed image matter deteriorates. Conversely, when the content of the emulsifier is 0.1 parts by mass or less, it is not possible to stably maintain the dispersion state of a resin emulsion.

Specific examples of the radical polymerization initiator include, but are not limited to, persulfate such as potassium persulfate, sodium persulfate, and ammonium persulfate.

The content of the polymerization initiator is preferably from 0.1 to 1 part by mass and more preferably from 0.2 to 0.8 parts by mass to 100 parts by mass of the total content of the monomers for use in the emulsion polymerization. When the content is from 0.1 to 1 part by mass, water resistance and polymerization stability become good.

A combination of a persulfate-based initiator and a reducing agent is suitable as a redox initiator. Specific examples of the persulfate-based initiator include, but are not limited to, perbutyl H (tertiary butyl hydroperoxide), perbutyl O (tertiary butylperoxy-2-ethylhexanoate), cumenehydroperoxide, and p-menthanehydroperoxide. Specific example of the reducing agent include, but are not limited to, erbit N (sodium isoascorbic acid), L-Ascorbic acid (vitamin C), sodium sulfite, acid sodium sulfite, sodium metabisulfite (SMBS), and sodium hyposulfite (hydrosulfite).

The resin emulsion can be obtained by a method different than the methods specified above. For example, it is suitable to adopt a method in which a part of an aqueous polymerization initiator is dripped to a reaction container in which a part of a monomer pre-emulsion is placed to start polymerization reaction and, after the monomer including poorly water-soluble monomer (a2) placed in the reaction container is sufficiently consumed by the polymerization, the rest of the monomer pre-emulsion and the aqueous polymerization initiator are dripped to the reaction container. In this method, the monomer pre-emulsion is present at the time of starting polymerization but disappears during the polymerization so that it is possible to suppress appearance of super coarse particles and occurrence of agglomeration. The monomer concentration in the reaction container at the start of polymerization is preferably 20 percent by mass or less. When the monomer concentration is 20 percent by mass or less, the reaction heat during polymerization is suitable, thereby stabilizing the polymerization.

The resin emulsion obtained by the various methods described above contains a very minor amount of super coarse particle having a diameter of 1.5 μm or greater.

It is preferable to neutralize the resin emulsion with a volatile basic compound.

Specific examples of the volatile basic compound include, but are not limited to, ammonium and amines such as monoethylamine, dimethylethanol amine, diethylethanol amine, and methylpropanol amine. These can be used alone or in combination.

It is also possible to optionally use a hydrophilic organic solvent for the resin emulsion.

The 50 percent cumulative volume particle diameter (D50) of the resin in the resin emulsion according to dynamic light scattering method is preferably from 50 to 200 nm. It is preferable that no coarse particles having a diameter of 0.5 μm (=500 nm) or greater according to dynamic light scattering method be observed.

The 50 percent cumulative volume particle diameter (D50) is the particle diameter corresponding to 50 percent of the cumulative amount of volume distribution of the particle size distribution curve obtained by dynamic light scattering method. Specifically, a resin emulsion is diluted until the solid portion thereof is from 0.01 to 0.1 percent by mass. Using Microtrac UPA (manufactured by Leeds & Nothup), the 50 percent cumulative volume particle diameter (D50) is obtained.

The proportion of the resin particle to the entire ink is preferably from 0.5 to 10 percent by mass and more preferably 1 to 8 percent by mass in solid form.

Whether the ink contains resin particles including alkoxysilyl group and carboxylic groups as structure unit can be analyzed in the following manner.

Resin Isolation

1. While an ink is being stirred by a magnetic stirrer, 0.1N hydrochloric acid aqueous solution is added to the ink for acid deposition until the ink indicates a pH of around 4. The agglomerated and precipitated solid is filtrated by Büchner funnel type glass filter (opening of 1.0 μm or less). The resultant is rinsed with highly pure water several times.

2. The rinsed agglomerated and precipitated material is dried under a reduced pressure by a reduced pressure drier for three hours at 40 degrees C.

3. The dried agglomerated and precipitated material is loaded in a filter paper having a cylinder-like form and subject to Soxhlet extraction for five hours using tetrahydrofuran (THF).

4. THF as solvent is removed from the extraction liquid obtained in the Soxhlet extraction by a rotary evaporator.

5. Furthermore, the thus-obtained residual is dried under a reduced pressure by a reduced pressure drier for three hours at 30 degrees C.

Analysis

The dried residual is subject to GC-MS, H1-NMR, and IR spectrum analysis to analyze whether the ink contains resin particles including an alkoxysilyl group and a carboxylic groups as structure unit.

Water

As the water, deionized water, ultrafiltered water, reverse osmosis water, pure water such as distilled water, and ultra pure water can be used.

The content of the water in the ink has no particular limit and can be selected to a particular application.

Surfactant

It is preferable to contain a polyether-modified siloxane compound as surfactant. Inclusion of polyether-modified siloxane compound as surfactant makes ink not easy to be wet on the ink repelling film of the nozzle plate of an ink head. Therefore, defective discharging caused by ink attachment to the nozzle can be prevented so that discharging stability is improved.

The polyether-modified siloxane compound is at least one member selected from the group consisting of compounds represented by the following Chemical formulae III to VI in terms of keeping dispersion stability, low dynamic surface tension, permeability, and leveling property irrespective of the kind of coloring material and a combination of organic solvents.

Chemical formula III

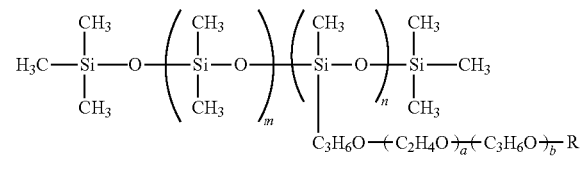

In the Chemical formula III, m represents 0 or an integer of from 1 to 23 and n represents an integer of from 1 to 10. a represents an integer of from 1 to 23 and b represents 0 or an integer of from 1 to 23. R represents a hydrogen atom or an alkyl group having 1 to 4 carbon atoms, Chemical formula IV

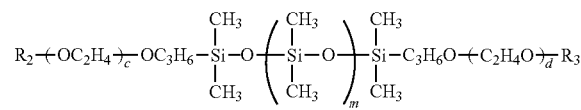

In the Chemical formula IV, m represents an integer of from 1 to 8 and each c and d independently represent integers of from 1 to 10. Each $R_2$ and $R_3$ independently represent hydrogen atoms or alkyl groups having 1 to 4 carbon atoms.

Chemical formula V

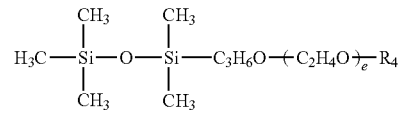

In the Chemical formula V, e represents an integer of from 1 to 8 and $R_4$ represents a hydrogen atom or an alkyl group having 1 to 4 carbon atoms.

Chemical formula VI

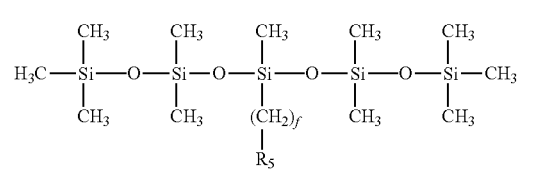

In the Chemical formula VI, f represents an integer of from 1 to 8. $R_5$ represents a polyether group represented by the following chemical formula a, Chemical formula a

In the Chemical formula a, g represents 0 or an integer of from 1 to 23, h represents 0 or an integer of from 1 to 23, excluding a case in which g and h are 0 at the same time, $R_6$ represents a hydrogen atom or an alkyl group having 1 to 4 carbon atoms.

Specific examples of the polyether-modified siloxane compound represented by the Chemical formula III include, but are not limited to, the compounds represented by the following Chemical structures.

Chemical structure VI

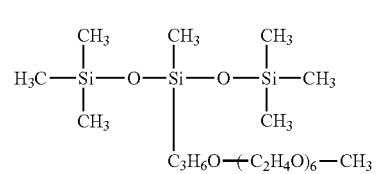

Chemical structure VII

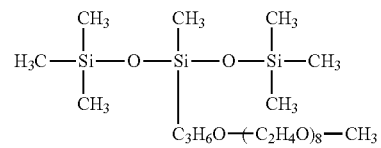

Chemical structure VIII

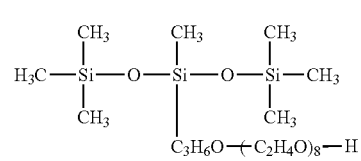

-continued

Chemical structure IX

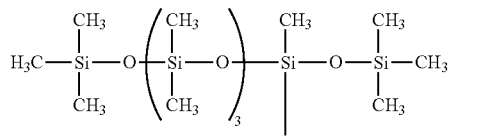

Chemical structure X

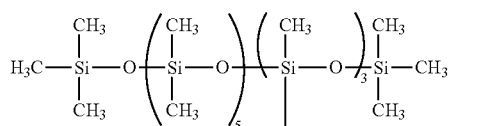

Chemical structure XI

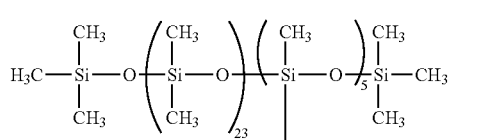

Chemical structure XII

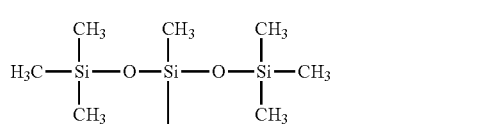

Chemical structure XIII

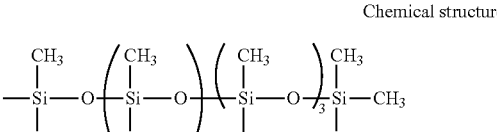

Specific examples of the polyether-modified siloxane compound represented by the Chemical formula IV include, but are not limited to, the compounds represented by the following Chemical structures.

Chemical structure XIV

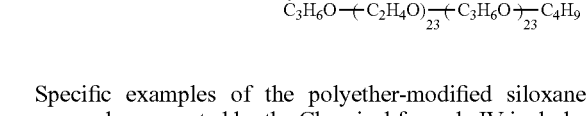

Specific examples of the polyether-modified siloxane compound represented by the Chemical formula V include, but are not limited to, the compounds represented by the following Chemical structures.

Chemical structure XV

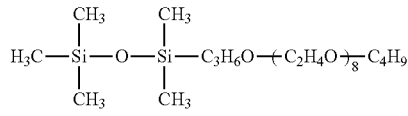

Specific examples of the polyether-modified siloxane compound represented by the Chemical formula VI include, but are not limited to, the compounds represented by the following Chemical structures.

Chemical structure XVI

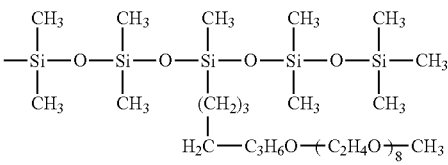

Chemical structure XVII

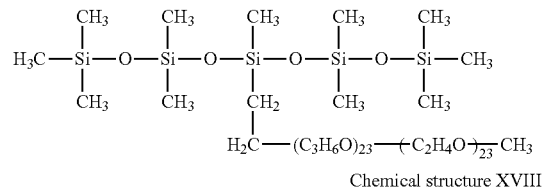

Chemical structure XVIII

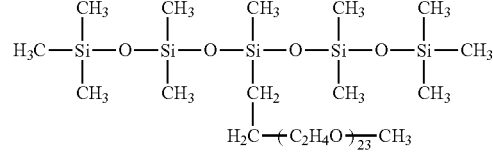

Any suitably synthesized polyether-modified siloxane compound and products available on the market are also usable.

There is no specific limitation to the method of synthesizing the polyether-modified siloxane compound and it can be suitably selected to suit to a particular application.

Specifically, the polyether-modified siloxane compound can be obtained by hydrosilylation reaction of (A) polyether and (B) organohydrogen siloxane.

The polyether as the component (A) represents polyoxyalkylene copolymers represented by the formula —($C_nH_{2n}O$)—, where n represents an integer of from 2 to 4.

The polyoxyalikylene copolymer unit preferably includes oxyethylene unit —($C_2H_4O$)—, oxypropylene unit —($C_3H_6O$)—, oxybutylene unit —($C_4H_8O$)—, or the mixture unit thereof. The oxyalkylene unit can be arranged in any manner and form block or random copolymer structures. Of the two, the random copolymer structure is preferable. More preferably, polyoxyalikylene preferably includes both oxyethylene unit —($C_2H_4O$)— and oxypropylene unit —($C_3H_6O$)— in a random copolymer.

Organohydrogen siloxane as the component (B) includes organopolysiloxane including at least one hydrogen bonded with silicon (SiH) in one molecule. Examples of the organopolysiloxane are any arbitrary numbers or combinations of ($R_3SiO_{0.5}$), ($R_2SiO$), ($RSiO_{1.5}$), and ($SiO_2$), where R independently represents an organic group or a hydrocarbon group.

When R in ($R_3SiO_{0.5}$), ($R_2SiO$), ($RSiO_{1.5}$) is a methyl group, the siloxy unit is represented as M, D, and T unit. ($SiO_2$) siloxy unit is represented as Q unit.

The organohydrogen siloxane has similar structures and at least one SiH present on the siloxy unit.

The methyl-based siloxy unit in the organohydrogen siloxane include "MH" siloxy unit ($R_2HSiO_{0.5}$), "DH" siloxy unit (RHSiO), and "TH" siloxy unit ($HSiO_{1.5}$).

The organohydrogen siloxane may include any number of M, MH, D, DH, T, TH, or Q siloxy unit under the condition that at least one siloxy unit includes SiH.

The component (A) and the component (B) are caused to react in hydrosilylation reaction. There is no specific limitation to the hydrosilylation reaction and it can be suitably selected to suit to a particular application. Addition of a hydrosilylation catalyst is preferable to conduct the hydrosilylation reaction.

There is no specific limitation to the hydrosilylation catalyst and can be suitably selected to suit to a particular application.

Specific examples include, but are not limited to, platinum, rhodium, ruthenium, palladium, osmium, or iridium metal, organic metal compounds thereof, and combinations thereof.

The content of the hydrosilylation catalyst is preferably from 0.1 to 1,000 ppm and more preferably from 1 to 100 ppm based on the mass of the component (A) and the component (B).

The hydrosililation reaction can be conducted without dilution or under the presence of a solvent. It is preferable to conduct the reaction under the presence of a solvent.

Specific examples of the solvent include, but are not limited to, alcohols (for example, methanol, ethanol, isopropanol, butanol, and n-propanol), ketones (for example, acetone, methylethyl ketone, and methyl isobutyl ketone), aromatic hydrocarbons (for example, benzene, toluene, and xylene), aliphatic hydrocarbon (for example, heptane, hexane, and octane), glycol ethers (for example, propylene glycol methylether and ethylene glycol n-butylether), halogenized hydrocarbon (for example, dichloromethane, 1,1,1-trichloroethane, methylene chloride, and chloroform), dimethylsulfoxide, dimethyl fromamide, acetonitrile, tetrahydrofuran, benzine, mineral spirit, and naphtha. These can be used alone or in combination.

The content of the component (A) and the component (B) for use in the hydrosilylation reaction has no particular limit and can be suitably adjusted to suit to a particular application. It is represented in the molar ratio of the content of all of the unsaturated groups in the component (A) and the content of SiH of the component (B). It is preferable to use an amount of 20 mol percent or less of polyether unsaturated groups to the SiH mol content of organohydrogen siloxane. It is more preferable to use an amount of 10 mol percent or less of polyether unsaturated groups.

There is no specific limitation to the hydosilylation reaction and it can be conducted by any known batch method, semi-continuation method, or continuation method. For example, it is possible to conduct the reaction using a plug flow reactor.

Specific examples of polyether-modified siloxane compounds available on the market include, but are not limited to, 71ADDITIVE, 74ADDITIVE, 57ADDITIVE, 8029ADDITIVE, 8054ADDITIVE, 8211ADDITIVE, 8019ADDITIVE, 8526ADDITIVE, FZ-2123, and FZ-2191, all manufactured by Dow Corning Toray Co., Ltd., TSF4440, TSF4441, TSF4445, TSF4446, TSF4450, TSF4452, and TSF4460, all manufactured by Momentive Performance Materials Inc., SILFACE SAG002, SILFACE SAG003, SILFACE SAG005, SILFACE SAG503A, SILFACE SAG008, and SILFACE SJM003, all manufactured by Nisshin Chemical Co., Ltd., TEGO Wet KL245, TEGO Wet 250, TEGO Wet 260, TEGO Wet 265, TEGO Wet 270, and TEGO Wet 280, all manufactured by Evonik Industries AG, and BYK-345, BYK-347, BYK-348, BYK-375, and BYK-377, all manufactured by BYK Japan KK. These can be used alone or in combination.

Of these, TEGO Wet 270 (manufactured by Evonik Industries AG) and SILFACE SAG503A (manufactured by Nisshin Chemical Co., Ltd.) are preferable.

In addition to the polyether-modified siloxane compound, fluorochemical surfactants, silicone-based surfactants, acetyleneglycol-based or acetylenealcohol-based surfactants can be used in combination.

The proportion of the surfactant to the entire ink is preferably from 0.001 to 5 percent by mass and more preferably from 0.5 to 3 percent by mass. When the proportion is from 0.001 to 5 percent by mass, ink is not easily wet on the ink repelling film of the nozzle plate of an ink head. Therefore, defective discharging caused by ink attachment to a nozzle can be prevented and discharging stability is improved.

As another aspect of the present disclosure, the ink contains a coloring material, at least one organic solvent selected from the group consisting of the compounds represented by the following Chemical structures 1 to 5, resin particles, and water. It optionally contains other components.

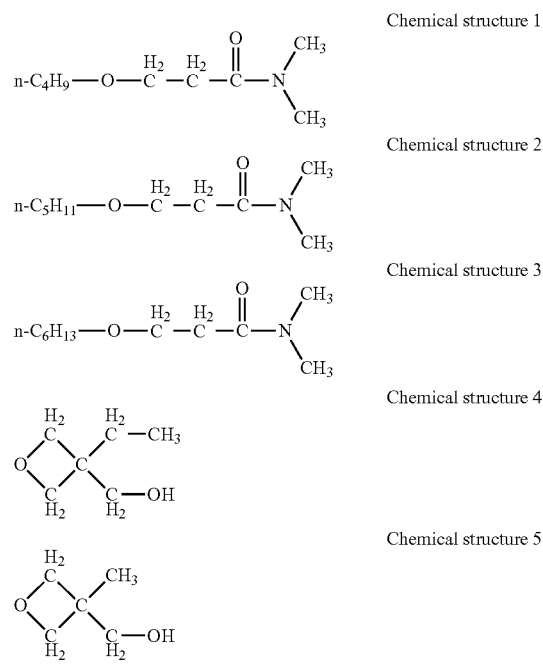

The coloring agent, the resin particle, the organic solvent other than the compounds represented by the Chemical structures 1 to 5 illustrated above, and water are the same as those mentioned above for the ink of the present disclosure.

Other Components

There is no specific limitation to the selection of the other components. For example, foam inhibitors (defoaming agent), pH regulators, preservatives and fungicides, chelate reagents, corrosion inhibitors, anti-oxidants, ultraviolet absorbers, oxygen absorbers, and photostabilizing agents can be selected.

Foam Inhibitor (Defoaming Agent)

A very small amount of a foam inhibitor is added to ink to prevent foaming in the ink. The foaming means that liquid forms a thin film enclosing air. The properties such as surface tension and viscosity of ink have impacts on forming foams. That is, a force to make the surface area as least as possible is applied to liquid such as water having a high surface tension so that no or little foaming occurs. To the contrary, ink having a high viscosity and high permeation property tends to foam because the surface tension thereof is low so that the foam formed due to viscosity of the liquid is easily maintained and does not easily burst.

Normally, foam inhibitors locally lower the surface tension of foam film or foam inhibitors insoluble in a foaming agent is dotted on the surface of the foaming agent to break the foam. When a polyether-modified siloxane compound capable of extremely reducing the surface tension as surfactant and a foam inhibitor of the former mechanism is used, it is not possible to locally reduce the surface tension of a foam film. Therefore, such foam inhibitors are not normally used. Therefore, the foam inhibitor insoluble in a foaming liquid is used instead. As a result, since it is not insoluble in the solution, stability of the ink deteriorates.

On the other hand, although the foam inhibitor represented by the following Chemical formula A is less able to reduce the surface tension than the polyether-modified siloxane compound, compatibility with the polyether-modified siloxane compound is good. Therefore, the foam inhibitor is efficiently taken in by the foam film, so that the surface of the foam film locally becomes an unequilibrium state due to the difference of the surface tension between the polyether-modified siloxane compound and the foam inhibitor.

Therefor, the compound represented by the following Chemical formula A is used as foam inhibitor.

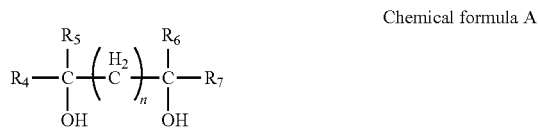

Chemical formula A

In the Chemical formula A, each $R_4$ and $R_5$ independently represent alkyl groups having 3 to 6 carbon atoms, each $R_6$ and $R_7$ independently represent alkyl groups having one or two carbon atoms, and n represents an integer of from 1 to 6.

Specific examples of the compound represented by the Chemical formula A include, but are not limited to, 2,4,7,9-tetramethyldecane-4,7-diol and 2,5,8,11-tetramethyl dodecane-5,8-diol. Of these, considering foam suppression and compatibility with ink, 2,5,8,11-tetramethyldodecane-5,8-diol is preferable.

The proportion of the foam inhibitor to the entire ink is preferably from 0.01 to 10 percent by mass and more preferably 0.1 to 5 percent by mass. When the proportion is 0.01 percent by mass or greater, defoaming power is sufficient When the proportion is 10 percent by mass or greater, good defoaming property is obtained so that ink properties such as viscosity and particle diameter become suitable.

pH Regulator

There is no specific limitation to the pH regulator capable of adjusting the pH of prescribed ink to be from 7 to 11 without having an adverse impact on the ink. It can be suitably selected to suit to a particular application.

Specific examples include, but are not limited to, alcohol amines, hydroxides of alkali metal elements, ammonium hydroxides, phosphonium hydroxides, and carbonates of alkali metal elements. When the pH is less than 7 or greater than 11, an inkjet head and an ink supplying unit tend to be greatly dissolved, which may lead to modification, leakage, poor discharging performance, etc. of the ink.

Specific examples of the alcohol amines include, but are not limited to, diethanol amine, triethanol amine, and 2-amino-2-ethyl-1,3-propane diol.

Specific examples of the hydroxides of alkali metal elements include, but are not limited to, lithium hydroxide, sodium hydroxide, and potassium hydroxide.

Specific examples of the ammonium hydroxides include, but are not limited to, ammonium hydroxide and quaternary ammonium hydroxide.

A specific example of the phosphonium hydroxides is quaternary phosphonium hydroxide.

Specific examples of the carbonates of alkali metal elements include, but are not limited to, lithium carbonate, sodium carbonate, and potassium carbonate.

Preservatives and Fungicides

Specific examples of the preservatives and fungicides include, but are not limited to, dehydrosodium acetate, sodium sorbinate, sodium 2-pyridine thiol-1-oxide, sodium benzoate, and pentachlorophenol sodium.

Chelate Reagent

Specific examples of the chelate reagents include, but are not limited to, ethylene diamine sodium tetraacetate, nitrilo sodium triacetate, hydroxyethylethylene diamine sodium tri-acetate, diethylenetriamine sodium quinternary acetate, and uramil sodium diacetate.

Corrosion Inhibitor

Specific examples of the corrosion inhibitor include, but are not limited to, acid sulfite, thiosodium sulfate, thiodiglycolate ammon, diisopropyl ammonium nitrite, pentaerythritol tetranitrate, and dicyclohexyl ammonium nitrite.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Method of Manufacturing Ink

The coloring material, the organic solvent, the resin particle, the surfactant, and the other optional components are dispersed or dissolved in water and thereafter stirred and mixed to manufacture the ink of the present disclosure. The stirring and mixing are conducted by a sand mill, a homogenizer, a ball mill, a paint shaker, an ultrasonic wave dispersing device, a stirrer having a stirring wing, a magnetic stirrer, a high performance dispersing device, etc.

Ink Properties

Properties of the ink are not particularly limited and can be suitably selected to suit to a particular application. For example, viscosity, surface tension, etc, are preferable if those are in the following ranges.

Viscosity of the ink is preferably from 5 to 25 mPa·S and more preferably from 6 to 20 mPa·S at 25 degrees C. When the ink viscosity is 5 mPa·S or greater, the printing density and the printing quality are improved. When the ink viscosity is 25 mPa·S or less, a suitable ink discharging property is secured.

Viscosity can be measured by a viscometer (RE-550L, manufactured by TOKI SANGYO CO., LTD.) at 25 degrees C.

The ink of the present disclosure can be suitably used for inkjet recording or spray painting.

The ink for inkjet recording can be used in any printer having an inkjet head such as a piezoelectric element head in which a diaphragm constituting the wall of an ink flowing path is transformed to change the volume of the ink flowing path by using a piezoelectric element as pressure generating device to apply a press to the ink in the ink flowing path, a thermal head in which ink is heated in an ink flowing path by a heat element to produce air bubbles, and an electrostatic head in which a diaphragm constituting the wall surface of an ink flowing path is transformed by the electrostatic force generated between a diaphragm and an electric pole disposed facing each other to change the volume in the ink flowing path, causing ink droplets to be discharged.

Ink Container

The ink container of the present disclosure includes ink accommodating unit to accommodate the ink of the present disclosure and other optional suitably-selected members.

There is no specific limit to the ink container. It is possible to select any form, any structure, any size, and any material. For example, an ink accommodating unit having at least an ink bag formed of aluminum laminate film, a resin film, etc. can be suitably used.

Image Forming Method and Image Forming Apparatus

The image forming method of the present disclosure includes an ink discharging process and other optional processes on a necessity basis.

The image forming apparatus of the present disclosure includes at least an ink discharging device and other suitably selected optional devices on a necessity basis.

The image forming method of the present disclosure is executed by the image forming apparatus of the present disclosure and the ink discharging process is suitably conducted by the ink discharging device. In addition, the other processes are suitably conducted by the other corresponding devices.

Ink Discharging Process and Ink Discharging Device

The ink discharging process includes applying a stimulus (energy) to the ink of the present disclosure to jet the ink to form an image on a recording medium.

The ink discharging device applies a stimulus (energy) to the ink of the present disclosure to jet the ink to form an image on a recording medium. There is no specific limit to the ink discharging device. For example, various nozzles for discharging ink can be suitably used.

The stimulus (energy) is generated by, for example, a stimulus generating device. There is no specific limit to the selection of the stimuli. Heat (temperature), pressure, vibration, and light can be suitably selected. These can be used alone or in combination. Of these, heat and pressure are preferable.

Specific examples of the stimulus generating device include, but are not limited to, a heater, a pressure applying device, a piezoelectric element, a vibrator, an ultrasonic wave oscillator, and light. To be more specific, there are a piezoelectric actuator as the piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

There is no specific limit to how the ink is jetted, which differs depending on the kind of the stimulus, etc. For example, in a case in which the stimulus is "heat", a method can be used in which thermal energy corresponding to recording signals is applied by, for example, a thermal head to generate bubbles in the ink and the ink is jetted and sprayed as liquid droplets from the orifices of nozzles of the recording head by the pressure of the bubble. In addition, in a case in which the stimulus is "pressure", for example, a method can be used in which a voltage is applied to a piezoelectric element attached to the position referred to as a pressure chamber located in the ink flow path in a recording head to bend the piezoelectric element to contract the volume of the pressure chamber, thereby jetting and spraying the ink from the orifices of nozzles of the recording head as liquid droplets.

Other Processes and Other Devices

The other optional processes are not particularly limited and can be suitably selected to suit to a particular application. Examples are a drying process and a control process.

The other optional devices are not particularly limited and can be suitably selected to suit to a particular application. Examples are a drying device and a control device.

Drying Process and Drying Device

The drying process is to heat and dry a recording medium on which an image is recorded with the ink. The drying process is executed by a drying device.

The drying is not particularly limited and can be suitably selected to suit to a particular application. For example, the drying can be conducted by an infra red drier, a microwave drier, a roll heater, a drum heater, or heated air. Moreover, it is also suitable to provide a fixing process of fixing an image by heating the surface thereof to 100 to 150 degrees C. by a heating device to smooth and fix the surface of the image.

This fixing process improves gloss and fixability of recorded matter. A roller, a drum heater, etc. having a heated mirror surface is suitably used as the heating and fixing device and the mirror surface (smoothing portion) is brought into contact with the image formed surface. Taking into account image quality, safety, and economy, a fixing roller heated to 100 to 150 degrees C. is preferable.

Control Process and Control Device

The control process mentioned above is to control each process and can be suitably conducted by the control device.

The control device (controller) has no particular limit as long as it can control the behavior of each device. It can be suitably selected to suit to a particular application. For example, devices such as a sequencer and a computer are preferable.

The ink of the present disclosure is applicable to various recording devices employing an inkjet recording method, such as printers, facsimile machines, photocopiers, multifunction peripherals (serving as a printer, a facsimile machine, and a photocopier), and 3D model manufacturing devices (3D printers, additive manufacturing device, etc.).

In the present disclosure, the recording device and the recording method respectively represent a device capable of discharging ink, various processing fluids, etc. to a recording medium and a method of conducting recording utilizing the device. The recording medium means an article to which ink or various processing fluids can be attached even temporarily.

The recording device may further optionally include a device relating to feeding, conveying, and ejecting the recording medium and other devices referred to as a pre-processing device, a post-processing device, etc. in addition to the head portion to discharge the ink.

The recording device and the recording method may further optionally include a heater for use in the heating process and a drier for use in the drying process. For example, the heating device and the drying device include devices including heating and drying the print surface of a recording medium and the opposite surface thereof. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with the ink. For example, the print method and the recording device can produce patterns like geometric design and 3D images.

In addition, the recording device includes both a serial type device in which the liquid discharging head is caused to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll form as recording media.

Figure 2:
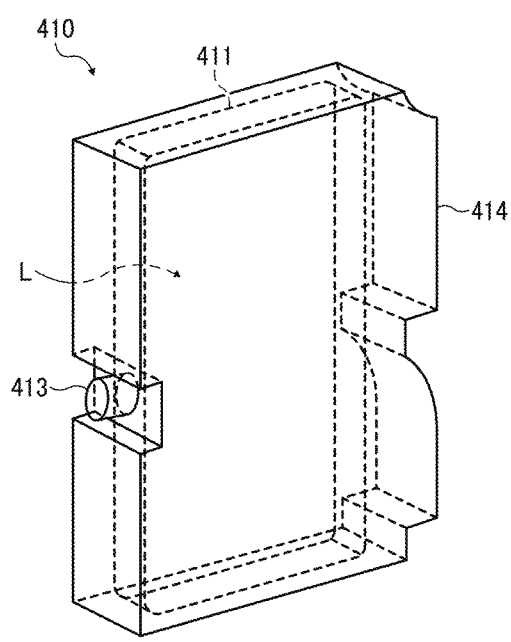
FIG. 2 is a diagram illustrating a perspective view of a main tank to accommodate the ink according to an embodiment of the present disclosure.

The recording (print) device is described using an example with reference to FIG. 1 and FIG. 2. FIG. 1 is a diagram illustrating a perspective view of the recording device. FIG. 2 is a diagram illustrating a perspective view of the main tank. An image forming apparatus 400 as an embodiment of the recording device is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packaging member such as aluminum laminate film. The ink accommodating unit 411 is accommodated in, for example, a plastic container housing unit 414. As a result, the main tank 410 is used as an ink cartridge of each color.

A cartridge holder 404 is disposed on the rear side of the opening when a cover 401c is opened. The cartridge holder 404 is detachably attached to the main tank 410. As a result, each ink discharging outlet 413 of the main tank 410 communicates with a discharging head 434 for each color via a supplying tube 436 for each color so that the ink can be discharged from the discharging head 434 to a recording medium.

This recording device may include not only a portion to discharge ink but also a device referred to as a pre-processing device, a post-processing device, etc.

As an example of the pre-processing device and the post-processing device, as in the case of the ink such as black (K), cyan (C), magenta (M), and yellow (Y), the pre-processing device and the post-processing device may further include a liquid accommodating unit including a pre-processing fluid and/or a post-processing fluid to discharge the pre-processing fluid and/or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

How to use the ink is not limited to the inkjet printing method.

Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

The usage of the ink of the present disclosure is not particularly limited and can be suitably selected to suit to a particular application. For example, the ink can be used for printed matter, a paint, a coating material, and foundation. The ink can be used to form two-dimensional texts and images and furthermore a three-dimensional solid object (3D modeling object) as a material for 3D modeling.

An apparatus for manufacturing a solid freeform fabrication to fabricate a three-dimensional solid object can be any known device with no particular limit. For example, the apparatus includes an ink container, a supplying device, and a discharging device, a drier, etc. The three-dimensional solid object includes an object manufactured by repeated ink coating. In addition, the three-dimensional solid object can be manufactured by processing a structure having a substrate such as a print medium to which the ink is applied as a molded processed product. The molded processed product is fabricated from printed matter or a structure having a sheet-like form, film-like form, etc. by, for example, heating drawing or punching. The molded processed product is suitably used for articles which are molded after surface-decorating. Examples thereof are gauges or operation panels of vehicles, office machines, electric and electronic devices, cameras, etc.

Liquid Discharging Device

The liquid discharging device of the present disclosure includes the ink of the present disclosure, a liquid discharging portion, a circulating device, and other optional devices. The liquid discharging portion includes nozzles to discharge the ink, a liquid chamber communicating with the nozzles, a supply port through which the ink flows into the liquid chamber, and a circulation port through which the ink flows out of the liquid chamber. The circulating device causes the ink that has flown into the liquid chamber through the supply port to partially or entirely flow out of the liquid chamber through the circulation port.

When the ink of the present disclosure is discharged by using a typical head, the ink around meniscus tends to form a film during decapping, which may cause defective discharging such as curving and swaying during re-discharging. However, due to the head having the circulating device, the ink around the meniscus is circulated so that film-forming during capping can be prevented. As a consequence, discharging stability is enhanced for a long period of time, which makes it possible to stably sustain quality of recording.

Since the head having the circulating device circulates the ink, meniscus is not easily maintained in comparison with a typical head because the ink is circulated. Therefore, meniscus overflow and bubble engulfment tend to occur. However, due to the combination of the ink of the present disclosure and the head including the circulation device, the balance between the dynamic surface tension A and the static surface tension B of the ink is optimized so that the ink is not easily wet on the ink repelling film on a nozzle plate, which makes it possible to maintain meniscus. As a result, meniscus overflow and bubble engulfment can be prevented so that quality images can be stably provided for a long period of time.

Figure 3:
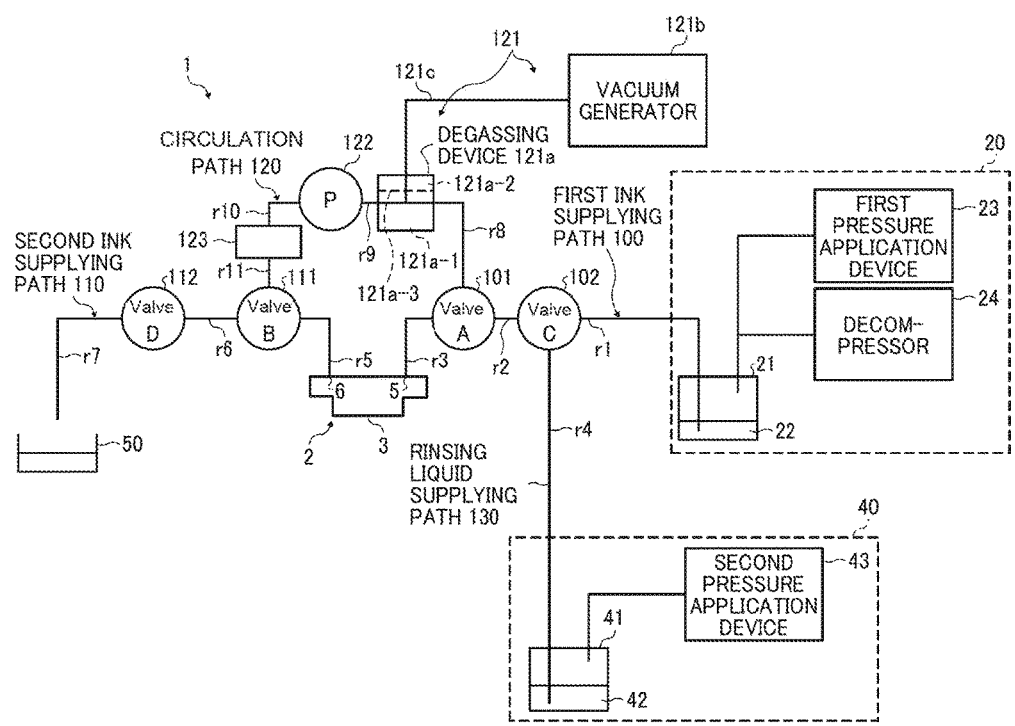
FIG. 3 is a schematic diagram illustrating an example of the liquid discharging device according to an embodiment of the present disclosure.

FIG. 3 is a schematic diagram illustrating an example of the liquid discharging device (inkjet device, image forming apparatus).

A liquid discharging device 1 includes a nozzle 3 to discharge liquid droplets such as ink, a head (liquid discharging portion, liquid discharging head) 2 including a discharging mechanism, a first ink supplying path (first path) 100 to supply liquid (first liquid, second liquid) to the head 2, a second ink supplying path (second supplying path) 110 to supply liquid (first liquid, second liquid) to the head 2, a first liquid supply portion 20 equipped with an ink tank (first liquid storage portion) 21 to supply the ink (first liquid) 22 to the head 2 via the first ink supplying path 100, a circulation path (third path) 120 communicating with the first ink supplying path 100 and the second ink supplying path 110 via a valve A (first switching valve 101) and a valve B (second switching valve 111) respectively, a degassing device 121 {degassing device 121*a*+vacuum generator (pump) 121*b*} disposed on the circulation path 120, a liquid circulating device (pump) 122, a rinse solution supplying path (fourth path) 130 communicating with the first ink supplying path 100 or the second ink supplying path 110 via a valve C (third switching valve 102), a second liquid supply portion 40 equipped with a rinse solution tank 41 to supply a rinse solution 42 (second liquid) to the head 2 via the rinse solution supplying path 130, and a valve D (path gate device 112) disposed on the first ink supplying path 100 or the second ink supplying path 110 to cause the liquid in the first ink supplying path 100 or the second ink supplying path 110 to the head 2.

The head (liquid discharging portion) 2 includes a plurality of fine nozzles 3 at the front surface to discharge the ink (first liquid) 22 and a liquid chamber inside of the head 2 to store the ink, communicating with the nozzles. In addition, at different portions of the head 2, a first port 5 and a second port 6 are respectively caused to communicate with one end of the first ink supplying path 100 and one end of the second ink supplying path 110 to cause the ink 22 and the rinse solution 42 to flow in or out of the liquid chamber. One of the first port 5 and the second port 6 is a support port of the liquid and the other is a circulation port of the liquid. The first port 5 communicates with one end of the first ink supplying path 100 and the second port 6 communicates with one end of the second ink supplying path 110.

As the method (liquid discharging mechanism) of discharging the ink from the nozzle 3 as ink droplets, the method of heating the ink to push it out or the method of applying a bias to a piezoelectric element disposed in the head to transform it to push out the ink is suitable.

The ink is discharged to print an image, etc. on a subject. An example of the subject is a sheet-like form, typically paper.

One end of the first ink supplying path (first path) 100 is connected with the first port 5 of the head and the other end with the ink 22 in the ink tank 21. The first ink supplying path 100 is constituted of three paths of r1, r2, and r3.

The rinse solution supplying path (fourth path) 130 is constituted of a path r4. One end of the path r4 is connected with the valve C and the other end with the rinse solution 42 in the rinse solution tank 41.

Each of the valve A (first switching valve 101), the valve B (second switching valve 111), and the valve C (third switching valve 102) communicates with three paths and has a feature to communicate any two of the three paths at the same time. That is, the valve A is disposed in the middle of the first ink supplying path 100 and communicates with one end of the circulation path 120. The valve B is disposed in the middle of the second ink supplying path 110 and communicates with the other end of the circulation path 120. The valve C is disposed in the middle of the first ink supplying path 100 relatively close to the ink tank 21 in comparison with the valve A and connected with one end (downstream side) of the rinse solution supplying path 130.

The valve D (path gate device 112) is disposed in the middle of the second ink supplying path 110 relatively close to a waste liquid tank 50 in comparison with the valve B and opens and closes the second ink supplying path 110 to shut and connect the communication with atmosphere.

Manual methods, inflatable methods, and electromagnetic methods can be employed as the method of switching the connection pattern (open and close pattern) between the paths by the valve A, the valve B, the valve C, and the valve D. Of these, the electromagnetic method is preferable if a control circuit is used to control them.

Next, the ink tank 21 and the portion (the first liquid supply portion 20) around the ink tank 21 are described.

The ink tank 21 is a container to store the ink 22 discharged from the nozzle of the head 2.

A first pressure applying device 23 and a decompression device (decompressor) 24 communicate with the air phase present in the upper part of the ink tank 21.

In addition, one end (open end) of the first ink supplying path 100 enters into the ink tank 21 and reaches the bottom part thereof to communicate with the ink 22 inside the ink tank 21.

The first ink supplying path 100 is connected with the first supplying path 5 from the inside of the ink tank 21 via the valve C and the valve A.

The first pressure applying device 23 employs the inflatable method to send out compressed air and is driven and ceased arbitrarily upon receipt of the control signal from a control circuit.

The first pressure applying device 23 includes a configuration including, for example, a combination of a compressor and an electromagnetic valve to open and close the path through which compressed air generated by the compressor is sent out.

When the first pressure applying device 23 is driven, the air phase in the sealed ink tank 21 is pressurized and the ink 22 is pushed out toward the first ink supplying path 100.

The decompressor 24 reduces the air pressure and is driven and ceased by a control circuit and the amount of decompression is also controlled. The decompressor 24 constitutes a first liquid collecting mechanism which generates the pressure difference between the first liquid supply portion and the second ink supplying path 110 to collect the ink (first liquid) 22 to the first liquid supply portion 20 from the head 2.

An example of the configuration of the decompressor 24 is a combination of a vacuum pump and an adjusting device which restricts the amount of air flow in the path connecting with the vacuum pump to adjust the amount of pressure reduction.

If the decompressor 24 is driven to reduce the pressure of the air phase in the ink tank 21, the ink 22 in the first ink supplying path 100 is back toward the ink tank 21.

In the liquid discharging device 1, the ink 22 may leak from the nozzle 3 without intention when the ink pressure in the head 2 is greater than atmospheric pressure. To prevent this from occurring, it is suitable to drive the decompressor 24. The air phase in the sealed ink tank 21 is reduced to reduce the ink pressure in the ink tank 21. Due to this, a negative pressure is supplied to the liquid chamber in the head 2 via the first ink supplying path 100 so that the ink pressure in the head 2 is reduced. Therefore, the ink pressure in the head 2 can be maintained at a suitable negative pressure.

In addition, if the amount of decompression is increased in the decompressor 24, the ink 22 in the head 2 can be retrieved to the ink tank 21 via the first ink supplying path 100.

Next, the configuration of the rinse solution tank 41 and the portion (the second liquid supply portion 40) around the rinse solution tank 41 is described.

The rinse solution tank 41 is a sealed container to store the rinse solution 42 to rinse the head 2 and the first ink supplying path 100 and the second ink supplying path 110 around the head 2. A second pressure applying device 43 communicates with the air phase present in the upper part of the rinse solution tank 41.

In addition, one end (open end) of the rinse solution supplying path 130 enters into the rinse solution tank 41 and extends to the bottom part thereof to communicate with the rinse solution 42 inside the rinse solution tank 41.

The rinse solution supplying path 130 is connected with the valve C from the rinse solution tank 41.

The inside configuration of a second pressure applying device 43 is the same as that of the first pressure applying device 23.

When the second pressure applying device 43 is driven, the air phase in the rinse solution tank 41 is pressurized and the rinse solution 42 is pushed out toward the rinse solution supplying path 130.

Next, the configuration of the waste liquid tank 50 and the part around the waste liquid tank 50 is described.

The waste liquid tank 50 is a container to eject a part of the rinse solution 42 already used for rinsing the liquid chamber of the head 2. The liquid ejected from the head 2 to the second ink supplying path 110 is received at the waste liquid tank 50.

The waste liquid in the waste liquid tank 50 is not in contact with an end of the second ink supplying path 110. The end of the second ink supplying path 110 on the side of the waste liquid tank 50 is in contact with atmosphere.

Therefore, when the decompressor 24 on the ink tank side is driven, atmospheric air can be inhaled from the second ink supplying path 110 to the head 2.

The waste liquid ink 50 is used to rinse the paths around the head 2 in the rinsing process, which is described later.

Next, the circulation path 120 through which the liquid is circulated via the paths avoiding the head 2 is described.

One end of the circulation path 120 is connected with the valve A and the other with the valve B. A degassing device 121a, the pump 122, and a filter 123 are disposed on the circulation path 120.

The degassing device 121a removes dissolved air in the ink 22. The inside of the degassing device 121a is divided into an ink chamber 121a-1 and an air chamber 121a-2. The ink chamber 121a-1 and the air chamber 121a-2 are separated by a member 121a-3 which blocks liquid but not air. If the air chamber 121a-2 is decompressed while causing the ink to flow in the ink chamber 121a-1, the air dissolved in the ink 22 in the ink chamber 121a-1 moves to the air chamber 121a-2 via the member 121a-3 that does not block air so that the ink 22 can be degassed. An example of the member that blocks liquid but not air is hollow fiber membrane.

In addition, as the degassing device 121a, it is possible to use a device in which material that ink can pass through, for example, a bundle of hollow fiber membrane made of Teflon® tube or silicone tube is disposed in a degassing chamber and the part around the hollow fiber membrane is subject to decompression by a vacuum pump to separate and remove air dissolved in the ink. Moreover, as the degassing method of ink in the degassing device, various methods such as ultrasonic wave vibration method or centrifugal separation method can be used.

The filter 123 can let the ink 22 flowing in the circulation path 120 through and remove dust, impurities, solid material, etc. in the ink 22. As the material of the filter, fibrous articles such as glass fiber can be used.

The pump 122 circulates the ink 22 in the circulation path 120 and the head 2 at a constant flowing amount. The pump 122 can be driven and ceased by using a control circuit.

The air chamber 121a-2 of the degassing device communicates and is connected with a vacuum generating device 121b via a tube 121c.

When the vacuum generating device 121b is driven to reduce the pressure in the air chamber 121a-2 in the degassing device 121a, air in the ink 22 is removed.

An example of the vacuum generating device 121b is a vacuum pump.

The vacuum generating device can be driven and ceased by a control circuit. Therefore, degassing and ceasing degassing by the degassing device 121a can be arbitrarily controlled.

The sequence of the disposition of the pump 122, the degassing device 121a, and the filter 123 in the middle of the circulation path is not particularly limited.

Next, how the circulation path 120 is filled with the ink 22 is described.

First, the valve A is operated to cause the ink tank 21 to communicate with the degassing device 121a via the flow paths (r1, r2, and r8). At the same time, the flow path r3 is blocked by the valve A and the flow path r4 is blocked by the valve C. In addition, the valve B is operated to cause the pump 122 in the circulation path 120 to communicate with the waste liquid tank 50 (atmosphere). The pump 122 is driven to move the ink 22 from the ink tank 21 towards the waste liquid tank 50. That is, a flow path r5 is blocked by the valve B to cause a flow path r11 (flow paths, r10, r9, and r8) to communicate with a flow path r6 and a valve D is opened to cause a flow path r6 with a flow path r7. The pump 122 is driven until the circulation path 120 (r8, r9, r10, and r11) from the valve A to the degassing device 121a, to the pump 122, and to the valve B is filled with the ink 22. When the circulation path 120 is filled with the ink 22, the pump 122 is halted.

As a result, the circulation path 120 from the valve A to the degassing device 121, to the pump 122, to the filter 123, and to the valve B is filled with the ink 22.

Next, how the head 2 is filled with the ink 22 is described.

The valve A and the valve C are operated to cause the ink tank 21 to communicate with the first port 5 via the flow paths (r1, r2, and r3). The valve A is operated to open the flow path r8. In addition, the valve C is operated to block the flow path r4. Moreover, the valve B is operated to cause the second port 6 to communicate with the waste liquid tank 50 via the flow paths r5, r6, and r11. At the same time, the valve D is operated to open the flow path r7.

As a result, the flow paths r1, r2, and r3, the liquid chamber in the head 2, and the flow paths r5, r6, and r7 are communicating with each other. The circulation path 120 is also communicating with the first ink supplying path 100 and the valve B.

Next, using the first pressure applying device 23, the inside of the ink tank 21 is pressurized to move the ink 22 to the head 22 via the first ink supplying path 100. The application of the pressure to the ink tank 21 is ceased at the time when the flow paths r1 to r3, r5, and r6 from the first ink supplying path 100, to the liquid chamber in the head 2, to the second supplying path 6, and to the valve D are filled with the ink. Thereafter, the valve D is closed.

As a result, the circulation path 120 from ink tank 21, to the degassing device 121a, to the pump 122, to the filter 123, and to the valve B and the head 2 are filled with the ink.

If the head is driven in this condition, the ink liquid droplet can be discharged from the nozzle.

In addition, if the vacuum generating device 121*b* is driven while circulating the ink in the circulation path 120 by the pump 122, the ink 22 can be degassed by using the degassing device 121*a*.

Since such a configuration is employed to circulate and degas the ink 22 in the circulation path 120 by using the pump 122, the ink 22 can be degassed. Also, as described later, since the head 2 can be cleaned by inflating air to pressurize the rinse solution 42 to push it out from the nozzle, the two demands which are not easily satisfied at the same time can be met.

Figure 4:
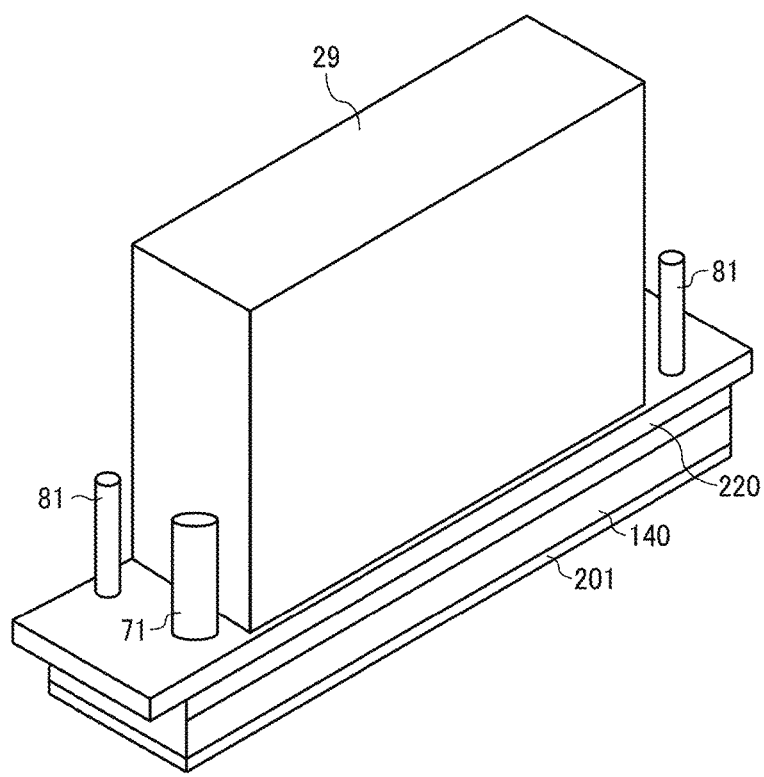
FIG. 4 is a diagram illustrating an exterior of an embodiment of the ink discharging head in the ink discharging device according to an embodiment of the present disclosure.
Figure 5:
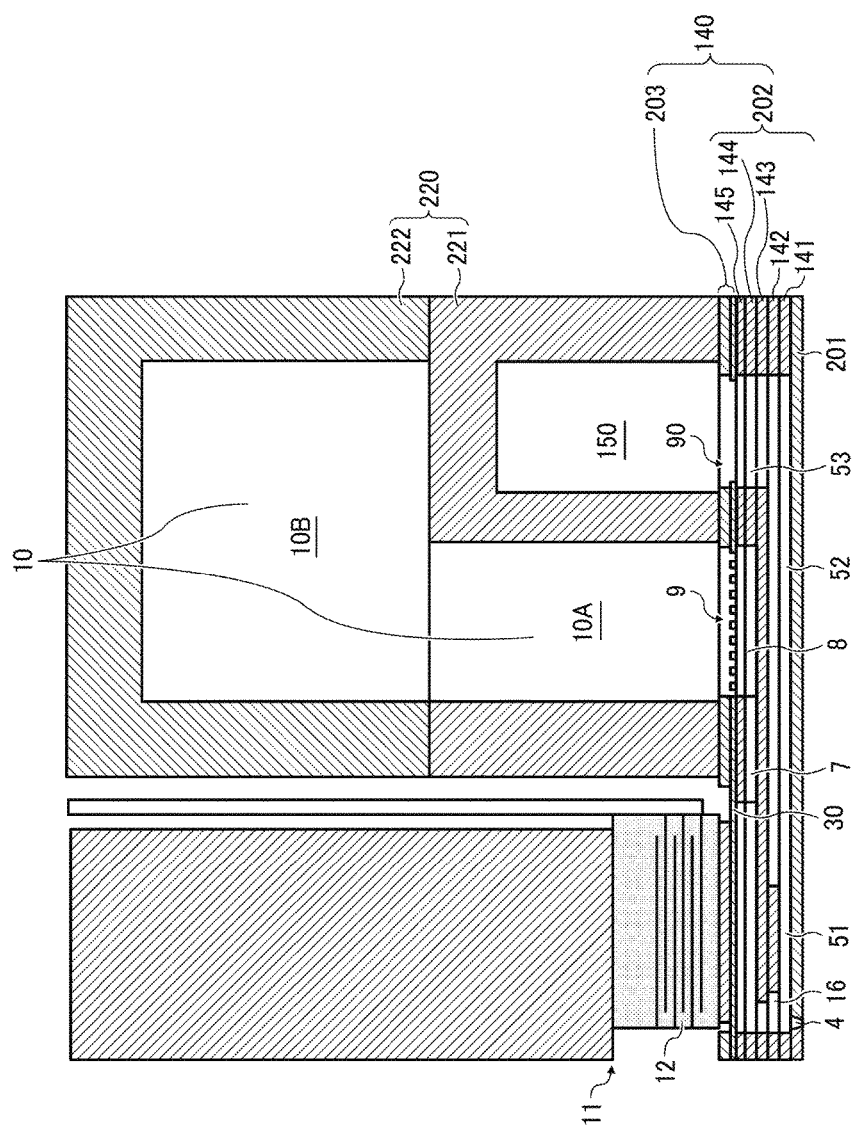
FIG. 5 is a diagram illustrating a cross section in a direction orthogonal to the nozzle arrangement direction of the ink discharging head in the ink discharging device according to an embodiment of the present disclosure.

Next, the ink circulation in the circulation type discharging head is described. As illustrated in FIGS. 4 and 5, a supply port 71 communicating with a common liquid chamber and a circulation port 81 communicating with a circulation common liquid chamber 150 are formed at ends of a circulation liquid chamber member 220. The supply port 71 and the circulation port 81 are respectively connected with the ink supply tank 21 and the circulation tank 41 to store the ink via respective tubes. The ink stored in the ink supply tank 21 is supplied to an individual liquid chamber 16 via the supply port 71, a common liquid chamber 10, a liquid introducing portion 8, and a fluid resistance 7.

Moreover, while a piezoelectric member 12 is driven to discharge the ink in the individual liquid chamber 16 from a nozzle 4, the entire or the part of the ink accumulated in the individual liquid chamber 16 without being discharged circulates to the circulation tank via a fluid resistance 51, circulation flow paths 52 and 53, a circulation common liquid chamber 150, and the circulation port 81.

The ink can be circulated during both operation and non-operation of the circulation type discharging head. If the ink circulates downtime, the ink in the individual liquid chamber 16 is always refreshed and agglomeration and sedimentation of the components contained in the ink can be suppressed.

In the liquid discharging head, a nozzle plate 201, a flow path plate 202, and a diaphragm member 203 as wall member are laminated and attached to each other. Also, the liquid discharging head includes a piezoelectric actuator 11 to displace the diaphragm member 203, a common liquid chamber member 220, and a cover.

The nozzle plate 201 includes multiple nozzles 4 to discharge ink.

The flow path plate 202 forms the individual liquid chamber 16 communicating with the nozzle 4, the fluid resistance 7 communicating with the individual liquid chamber 16, and the liquid introducing portion 8 communicating with the fluid resistance 7. In addition, the flow path plate 202 is formed of a plurality of plate-like members 141 to 145 laminated and attached to each other from the side of the nozzle plate 201. These plate-like members 141 to 145 and the diaphragm member 203 are laminated and attached to each other to form a flow path member 140.

The diaphragm member 203 includes a filter portion 9 as an orifice causing the liquid introducing portion 8 to communicate with the common liquid chamber 10 formed of the common liquid chamber member 220.

The diaphragm member 203 is a wall member constituting the wall of the individual liquid chamber 16 of the flow path plate 202. This diaphragm member 203 has a double layer structure (but not limited to double layer) formed of a first layer forming a thin portion and a second layer forming a thick portion from the side of flow path plate 202. The first layer forms a transformable vibration area 30 at the site corresponding to the individual liquid chamber 16.

On the plate like member 141 forming the flow path plate 2, a through-hole groove portion (through hole having a groove like form) constituting the individual liquid chamber 16, the fluid resistance 51, and a through hole groove portion constituting the circulation flow path 52 are formed.

Similarly, on the plate like member 142, a through-hole groove portion constituting the individual liquid chamber 16 and a through hole groove portion constituting the circulation flow path 52 are formed.

Similarly, on the plate like member 143, a through-hole groove portion constituting the individual liquid chamber 16 and a through hole groove portion constituting a circulation flow path 53 with the nozzle disposition direction along the longitudinal direction are formed.

Similarly, on the plate like member 144, a through-hole groove portion constituting the individual liquid chamber 16, a through-hole groove portion constituted of the fluid resistance 7, a through-hole groove portion constituting the liquid introducing portion 8, and a through-hole groove portion constituting the circulation flow path 53 with the nozzle disposition direction along the longitudinal direction are formed.

Similarly, on the plate like member 145, a through-hole groove portion constituting the individual liquid chamber 16, a through-hole portion (forming liquid chamber on the downstream of the filter) constituting the liquid introducing portion with the nozzle disposition direction along the longitudinal direction, and a through hole groove portion constituting a circulation flow path 53 with the nozzle disposition direction along the longitudinal direction are formed.

On the diaphragm member 203, the vibration area 30, the filter 9, and a through hole groove portion constituting a circulation flow path 53 with the nozzle disposition direction along the longitudinal direction are formed.

As a consequence, complicated flow paths can be formed with such a simple configuration of the flow path member 140 constituted of a plurality of laminated and attached plate-like members.

According to this configuration, on the flow path member 140 formed of the flow path plate 202 and the diaphragm member 203, the fluid resistance 51 along the surface direction of the flow path plate 202 communicating with each of the individual liquid chambers 16, the circulation flow plate 52, and the circulation flow path 53 along the thickness direction of the flow path member 140 communicating with the circulation flow path 52 are formed. The circulation flow path 53 communicates with a circulation common liquid chamber 150, which is described later.

The common liquid chamber member 220 includes the common liquid chamber 10 and the circulation common liquid chamber 150 to which the ink is supplied from the supply and circulation mechanism.

The common liquid chamber member 220 is constituted of the first common liquid chamber member 221 and the second common liquid chamber member 222. The first common liquid chamber member 221 is attached to the flow path member 140 on the side of the diaphragm member 203 and the second liquid chamber member 222 is laminated and attached to the first common liquid chamber member 221.

The first common liquid chamber member 221 forms a common liquid chamber 10A on the downstream side, which constitutes a part of the common liquid chamber 10 communicating with the liquid introducing portion 8 and the circulation common liquid chamber 150 communicating with the circulation flow path 53. In addition, the second common liquid chamber 222 includes a common liquid chamber 10B on the upstream side, which constitute the rest of the common liquid chamber 10.

The common liquid chamber 10A on the downstream side forming a part of the common liquid chamber 10 and the circulation common liquid chamber 150 are disposed side by side in the direction orthogonal to the nozzle arrangement direction.

Due to this, the dimension of the circulation common liquid chamber 150 obtains freedom of designing from the dimension required for the flow paths including the individual liquid chamber 16, the fluid resistance 7, and the liquid introducing portion 8 formed of the flow path member 140.

Moreover, since the circulation common liquid chamber 150 and a part of the common liquid chamber 10 are disposed side by side, the width of the head 2 along the direction orthogonal to the nozzle arrangement direction can be suppressed, thereby preventing a size increase of the head 2. The common liquid chamber member 220 includes the common liquid chamber 10 to which ink is supplied from a head tank or a liquid cartridge and the circulation common liquid chamber 150.

On the side of the diaphragm member 203 opposite to the individual liquid chamber 16 is arranged the piezoelectric actuator 11 including an electromechanical transducer element as a drive device to transform the vibration area 30 of the diaphragm member 203.

Next, how the ink (liquid droplet) 22 is discharged from the nozzle of the head is described.

The valve A and the valve C are operated to cause the first ink supplying path 100 to communicate with the first port 5 from the ink tank 21. Moreover, the valve B is operated to cause the flow path r5 to communicate with the flow path r6 to cause the flow paths from the second port 6 to the waste liquid tank 50 to communicate with each other. Thereafter, the valve D is operated to open the flow path r7.

At this point, the liquid chamber in the head 2 is filled with the ink 22 and the first ink supplying flow path 100 from the ink tank 21 to the head 2 is open.

Next, the head is driven using a head drive circuit to discharge the ink from the nozzle 3.

If the ink 22 in the liquid chamber in the head 2 is consumed by discharging, the ink is supplied from the ink tank 21 to the head 2 due to osmotic pressure.

In addition, the decompressor 24 is driven to adjust the decompression amount in the ink tank 21. Consequently, due to the communication between the air phase in the ink tank 21 and the first ink supplying flow path 100, the ink pressure in the head 2 is maintained at a suitable negative pressure.

The negative pressure to suitably maintain the ink pressure in the head 2 is described.

The ink tank 21 is located at a position relatively higher than the head 2 and when the head 2 is filled with the ink 22, a pressure is applied to the ink 22 in the head 2 due to Bernoulli's theorem.

The pressure of the air phase in the ink tank 21 is defined as P1. In addition, the ink pressure in the nozzle 3 in the head 2 is defined as P2. In addition, the height of the bottom surface of the ink tank 21 relative to the nozzle 3 is defined as h0.

The ink pressure P2 in the nozzle 3 is obtained by the following Relation 1.

$$P2 = P1 + \rho \times h0 \times g \qquad \text{Relation 1}$$

In the Relation 1, $\rho$ represents density of ink and g represents gravity acceleration.

If the pressure P1 of the air phase in the ink tank 2 is equal to atmospheric air pressure, the ink pressure P2 in the nozzle 3 is greater than atmospheric air pressure according to the Relation 1.

Since the pressure of the air outside the nozzle 3 is atmospheric air pressure, the ink pressure P2 in the nozzle 3 is higher than the air pressure outside the nozzle 3 so that the ink flows out of the nozzle 3 to the outside.

In order to prevent this ink overflow from the nozzle 3, the ink pressure P2 is required to be around atmospheric air pressure, In order to prevent this ink overflow from the nozzle 3, it is suitable to reduce the pressure P1 of the air phase in the ink tank 21 to less than atmospheric air pressure.

If the pressure of air in the air phase in the ink tank 21 is defined as P1' when the ink pressure P2 in the nozzle 3 is equal to atmospheric air pressure, P1' is obtained according to the following Relation 2 based on the Relation 1.

$$P1' = P0 - \rho \times h0 \times g \qquad \text{Relation 2}$$

In the Relation 2, P0 represents atmospheric air pressure.

When the ink 22 is discharged from the head 2, the decompressor 24 is driven to make the pressure of the air phase in the ink tank 21 around P1' obtained by the Relation 2.

The print subject and the head 2 are relatively moved to conduct printing while the head is discharging ink.

Next, how to circulate and degas the ink 22 in the circulation path 120 is described (circulation, timing of degassing, direction of ink flow, and flow path in which the ink 22 flows).

As an example, the method of degassing the ink (second liquid) 22 while the ink 22 is being circulated in the circulation path 120 (third path) in the liquid discharging device 1 is described.

In the degassing method in which the ink 22 is being circulated, the ink 22 is degassed using the degassing device 121a (degasser) while the ink 22 is being circulated by the pump 122 (liquid circulating device) in a condition in which the closed paths (the flow path r3, r8, r9, r10, and r5 and the head 2) passing through the valve A (first switching valve 101), the circulation path 120, the valve B (second switching valve 111), and the head 2 (liquid discharging portion) are filled with the ink 22.

That is, in this embodiment, the ink is degassed and circulated in the state in which the path from the valve A, to the first port 5, to the head 2, to the second port 6, to the valve B, and to the circulation path 120 is filled with the ink 22.

First, the pump 122 circulates the ink 22 in the closed path from the valve A, to the degassing device 121a, to the pump 122, to the filter 123, to the valve B, to the second port 6, to the head 2, to the first port 5, and to the valve A.

At this point, the valve A is operated to cause the flow path r3 to communicate with the flow path r8 to open the path from the first port 5 to the degassing device 121 (the flow path r2 is closed). The valve B is operated to cause the flow path r10 to communicate with the flow paths r11 and r5 to open the path from the pump 122 to the second port 6 (the flow path r6 is closed).

Next, the pump 122 is driven to degas the ink 22 using the degassing device 121 while the ink is being circulated in the paths mentioned above. When the vacuum generating device 121b is driven to reduce the pressure in the air chamber 121a-2 in the degassing device 121a. The air dissolved in the ink 22 flowing in the liquid chamber 121a-1 of the degassing device 121*a* is suctioned toward the vacuum generating device 121*b* through the degassing device 121*a* to degas the ink 22.

At this point, the ink 22 passed through the filter 123 in the circulation path so that fine particles such as dust mixed in the ink 22 can be removed.

The ink 22 is circulated and degassed for a predetermined time. After the predetermined time elapses after the circulation and the degassing start, the vacuum generating device 121*b* is ceased to terminate the degassing operation. Next, the pump 122 is ceased to stop the ink circulation.

The ink 22 can be circulated or degassed clockwise or counter clockwise in the closed paths mentioned above by the pump 122 in FIG. 3.

In the present disclosure, the liquid discharging head is a mechanical part to discharge and jet liquid from nozzles.

The liquid discharged is not particularly limited and it is possible to use any liquid having a viscosity and a surface tension that do not block discharging from a head. Liquid having a viscosity of 30 mPa·s or less at room temperature and normal pressure or under heating or cooling is preferable. Examples are solutions, suspension, emulsions, etc. including a solvent such as water and an organic solvents, coloring materials such as dyes and pigments, function-imparting materials such as polymerizable compounds, resins, and surfactants, biocompatible materials such as DNA, amino acids, proteins, and calcium, eatable materials such as natural coloring matter. These can be used for, for example, ink for inkjet, surface treatment liquid, forming liquid for structure elements for electronic elements and luminous elements and electronic circuit registration pattern, and liquid material for three-dimensional fabrication.

Articles using piezoelectric actuators (a laminate type piezoelectric element and thin-layer type piezoelectric element), thermal actuators using the thermoelectric conversion element such as a heat element, and an electrostatic actuator including a diaphragm and a counter electrode are suitable as the energy generating source to discharge liquid.

The liquid discharging unit is a collective form in which a functional part and/or a mechanism is integrated in the liquid discharging head, meaning that an assembly of parts relating to liquid discharging. For example, the liquid discharging unit includes a combination of the liquid discharging head and at least one of a supply and circulation mechanism, a carriage, a maintenance and recovery mechanism, and a main scanning moving mechanism.

Integration means that, for example, the liquid discharging head is mutually fastened, attached, engaged, etc. with functional parts or mechanism or one is carried by the other in a movable manner. In addition, the liquid discharging head and the functional parts or mechanism may be detachably attached to each other.

For example, the liquid discharging head may be integrated with the supply and circulation mechanism as the liquid discharging unit. In addition, the liquid discharging head can be integrated with the supply and circulation mechanism by mutually being connected by a tube, etc. Optionally, a unit including a filter may be added between the liquid discharging head and the supply and circulation mechanism of the liquid discharging unit.

In addition, the liquid discharging head may be integrated with the carriage as the liquid discharging unit.

In addition, the liquid discharging head may be integrated with a scanning moving mechanism as the liquid discharging unit while the liquid discharging head is held in a movable manner by the guiding member constituting a part of the scanning moving mechanism.

In addition, the liquid discharging head, the carriage, and the maintenance and recovery mechanism may be integrated as the liquid discharging unit while the capping member constituting a part of the maintenance and recovery mechanism is fastened to the carriage onto which the liquid discharging head is mounted.

In addition, the liquid discharging head and the supplying mechanism may be integrated as the liquid discharging unit while the tube is connected with the supply and circulation mechanism or the liquid discharging head onto which the flow path parts are mounted. Via this tube, the liquid in the liquid storage portion is supplied to the liquid discharging head.

The main scanning moving mechanism includes the guiding member. In addition, the supplying mechanism includes the tube and the installation unit.

In the present disclosure, the device to discharge a liquid (liquid discharging device) includes a liquid discharging head or a liquid discharging unit and drives the liquid discharging head to discharge the liquid. The device to discharge a liquid includes not only a device capable of discharging the liquid onto a medium to which the liquid is attachable but also a device that discharges the liquid into air or a fluid.

The device to discharge a liquid may include a unit that feeds, transfers, or ejects a medium to which the liquid can be attached, a pre-processing device, a post-processing device, etc.

For example, the device to discharge a liquid includes an image forming apparatus which discharges ink onto a recording medium to form an image thereon and a solid freeform fabrication device (three-dimensional modeling device) which discharges a liquid fabrication (modeling liquid) to laminated powder layers to fabricate a solid freeform object (three dimensional object).

In addition, the device to discharge a liquid is not limited to those which produce meaningful visible images such as texts and figures by the discharged liquid. For example, the device to discharge a liquid may form meaningless patterns or 3D objects.

What the liquid is attachable to means what the liquid can be attached to even temporarily and material to which liquid is attached and caused to adhere or attached and permeated.

Specific examples include, but are not limited to, recording media such as paper, recording paper, film, and cloth, electronic devices such as electronic substrate and piezoelectric elements, powder layer, internal organ models, cells for checking. Unless particularly specified, all to which liquid can be attached is included.

The material to which the liquid can be attached is anything to which the liquid can be attached even temporarily.

Specific examples include, but are not limited to, paper, thread, fiber, cloth, leather, metal, plastics, glass, wood, and ceramics.

The liquid is not particularly limited and it is possible to use any liquid having a viscosity and a surface tension that do not block discharging from a head.

Liquid having a viscosity of 30 mPa·s at room temperature and normal pressure or under heating or cooling is preferable.

Examples are solutions, suspension, emulsions, etc. including a solvent such as water and an organic solvents, coloring materials such as dyes and pigments, function-imparting materials such as polymerizable compounds, resins, and surfactants, biocompatible materials such as DNA, amino acids, proteins, and calcium, eatable materials such as natural coloring matter. These can be used for, for example, ink for inkjet, surface treatment liquid, forming liquid for structure elements for electronic elements and luminous elements and electronic circuit registration pattern, and liquid material for three-dimensional fabrication.

The device to discharge liquid (liquid discharging device) includes a device in which the liquid discharging head and an article to which liquid can be attached relatively move to each other but not limited thereto.

Specific example include, but are not limited to, a serial type device in which the liquid discharging head is caused to move and a line type device in which the liquid discharging head is not caused to move.

In addition, other examples of the device to discharge liquid are a processing fluid applicator which discharges a processing fluid to a recording medium to apply the processing fluid to the surface of the recording medium to reform the surface and a jet granulator which granulates fine particles of raw materials by jetting a liquid composition in which the raw materials are dispersed in a solution through nozzles.

Moreover, image forming, recording, printing, modeling, etc. in the present disclosure represent the same meaning.

Image Formed Matter

The image formed matter of the present disclosure includes a recording medium and an image layer formed on the recording medium with ink. The image layer includes a coloring material, an organic solvent and a resin. The resin includes a structure unit having a carboxyl group and a structure unit having an alkoxysilyl group. The organic solvent includes at least one organic solvent having a solubility parameter of 8.96 to less than 11.8. Also, the ink has a dynamic surface tension A of 34.0 mN/m or less for a surface life of 15 msec at 25 degrees C. according to maximum bubble pressure technique. The dynamic surface tension A and the static surface tension B of the ink at 25 degrees C. satisfy the following relation: 10.0 percent≤[(A−B)/(A+B)]×100≤19.0 percent.

The formed image matter can be formed on plain paper and general printing paper with high quality while beading is suppressed. Also, the formed image matter has good image fixability and can be suitably used for various purposes as references on which various texts and images are recorded.

Recording Medium

There is no specific limitation to the recording medium and it can be suitably selected to suit to a particular application. For example, plain paper, gloss paper, special paper, cloth, film, transparent sheets, general printing paper, etc. are suitable.

Of these, in terms of recording images having high quality (image density, saturation, beading, color bleed) and high gloss with excellent smear fixability, general printing paper having a liquid imbibition in a particular range is preferable.

A specific example is a recording medium having a coated layer on at least one side thereof and the side having the coated layer preferably has a transfer amount of pure water to the recording medium of from 2 to 35 ml/m² in a contact time of 100 ms and a transfer amount of pure water to the recording medium of from 3 to 40 ml/m² in a contact time of 400 ms as measured by a dynamic scanning absorptometer (DSA).

When a recording medium having an excessively small transfer amount of pure water is used, beading (a phenomenon in which adjacent dots attracted to each other make images feel rough) and color bleed (bleeding between colors) tend to occur even if the ink mentioned above is used.

When a recording medium having an excessively large transfer amount of pure water is used, the ink dot diameter after recording tends to become smaller than desired, so that solid images may not be filled with the ink.

This dynamic scanning absorptometer (Kuga, Shigenori, Dynamic scanning absorptometer (DSA); Journal of JAPAN TAPPI, published in May 1994, Vol. 48, pp. 88-92) can accurately measure the imbibition liquid amount in an extremely short period of time. Measuring by this dynamic scanning absorptometer is automated according to the method of: (1) directly reading the absorption speed of liquid from the moving of meniscus in a capillary; and (2) spirally scanning a sample having a disc-like form with an imbibition head, while automatically changing the scanning speed according to predetermined patterns to measure the necessary number of points of the single sample. The liquid supply head to the paper sample is connected with the capillary via a TEFLON® tube and the position of the meniscus in the capillary is automatically read by an optical sensor.

Specifically, the transfer amount of pure water is measured using a dynamic scanning absorptometer (K350 Series D type, manufactured by Kyowa Seiko Inc.).

Each of the transfer amount in the contact time of 100 ms can be obtained by interpolation from the measuring results of the transfer amount in the proximity contact time of the contact time.

General printing paper having a liquid imbibition in the particular range is available on the market.

Specific examples include, but are not limited to, POD GLOSS COAT, OK TOP COAT+, OK KINFUJI+, and SA KINFUJI+(manufactured by Oji Paper Co., Ltd.), SUPER MI DUL, AURORA COAT, and SPACE DX (all manufactured by Nippon Paper Industries Co., Ltd.), α matte and μ coat (manufactured by Hoketsu Paper Co., Ltd.), RAICHO ART and RAICHO SUPER ART (manufactured by Chuetsu Pulp & Paper Co., Ltd.), and PEARL COAT N (manufactured by Mitsubishi Paper Mills Limited).

General printing paper means paper having a coated layer formed of an inorganic filler and a resin on one side or both side and plain paper means paper having no coated layer on the surface thereof.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Preparation Example 1

Preparation of Surface Reformed Black Pigment Dispersion 1

100 g of Black Pearls® 1000 (carbon black having a BET specific surface area of 343 m²/g and a DBPA of 105 ml/100 g, manufactured by Cabot Corporation), 100 mmol of sulfanilic acid, and 1 litter of highly deionized water were mixed by a Silverson Mixer at 6,000 rpm in room temperature environment.

When the obtained slurry had a pH of 4 or higher, 100 mmol of nitric acid was added. 30 minutes later, 100 mmol of sodium nitrite dissolved in a minute amount of highly deionized water was slowly added to the mixture. Furthermore, the temperature was raised to 60 degrees C. while being stirred to conduct reaction for one hour.

Next, the pH of the resultant was adjusted to be 9 with 10 percent by mass tetrabutyl ammonium hydroxide solution (methanol solution) to obtain a reformed pigment dispersion including a pigment bonded with at least one sulfanilic acid group or a sulfanilic acid tetrabutyl ammonium salt 30 minutes later.

Ultra-filtration using dialysis membrane was conducted using the thus-obtained reformed pigment dispersion including a pigment bonded with at least one sulfanilic acid group or a sulfanilic acid tetrabutyl ammonium salt and highly deionized water.

Moreover, the resultant was subject to ultrasonic wave dispersion to obtain a reformed pigment dispersion in which the solid portion was concentrated to 20 percent by mass.

The surface treatment level of the thus-obtained reformed pigment dispersion was 0.75 mmol/g and the volume average particle diameter was 120 nm as measured by a particle size distribution measuring instrument (NANOTRAC UPA-EX150, manufactured by NIKKISO CO., LTD.).

Preparation Example 2

Preparation of Surface Reformed Black Pigment Dispersion 2

500 g of Black Pearls® 880 (carbon black having a BET specific surface area of 220 m$^2$/g and a DBPA of 105 ml/100 g, manufactured by Cabot Corporation), 1 litter of highly deionized water, and 1 mol of 4-amino benzoate were loaded in ProcessAll 4HV mixer (4 Litter). Next, the mixture was vigorously mixed at 300 rpm while being heated at 60 degrees C. for 10 minutes. 20 percent by mass sodium nitrite aqueous solution (1 mole equivalent based on 4-amino benzoic acid) was added to this mixture in 15 minutes. The system was mixed and stirred for three hours while being heated at 60 degrees C. The reactant was taken out while being diluted with 750 ml of highly deionized water.

Next, the pH of the resultant was adjusted to be 9 with 10 percent by mass tetrabutyl ammonium hydroxide solution (methanol solution) to obtain a reformed pigment dispersion including a pigment bonded with at least one amino benzoic acid group or a amino benzoic acid tetrabutyl ammonium salt 30 minutes later.

Thereafter, ultra-filtration using dialysis membrane was conducted using the thus-obtained reformed pigment dispersion including a pigment bonded with at least one amino benzoic acid group or a amino benzoic acid tetrabutyl ammonium salt and highly deionized water. Moreover, the resultant was subject to ultrasonic wave dispersion to obtain a reformed pigment dispersion in which the solid portion was concentrated to 20 percent by mass.

The surface treatment level of the thus-obtained reformed pigment dispersion was 0.5 mmol/g and the volume average particle diameter was 104 nm as measured by a particle size distribution measuring instrument (NANOTRAC UPA-EX150, manufactured by NIKKISO CO., LTD.).

Preparation Example 3

Preparation of Surface Reformed Black Pigment Dispersion 3

500 g of Black Pearls® 880 (carbon black having a BET specific surface area of 220 m$^2$/g and a DBPA of 105 ml/100 g, manufactured by Cabot Corporation), 1 litter of highly deionized water, and 175 mmol of 4-amino benzoate were loaded in ProcessAll 4HV mixer (4 Litter). Next, the mixture was vigorously mixed at 300 rpm while being heated at 60 degrees C. for 10 minutes. 20 percent by mass sodium nitrite aqueous solution (175 mmole equivalent based on 4-amino benzoic acid) was added to this mixture in 15 minutes. The system was mixed and stirred for three hours while being heated at 60 degrees C. The reactant was taken out while being diluted with 750 ml of highly deionized water.

Next, the pH of the resultant was adjusted to be 9 with 10 percent by mass tetraethyl ammonium hydroxide solution to obtain a reformed pigment dispersion including a pigment bonded with at least one amino benzoic acid group or a amino benzoic acid tetraethyl ammonium salt 30 minutes later.

Thereafter, ultra-filtration using dialysis membrane was conducted using the thus-obtained reformed pigment dispersion including a pigment bonded with at least one amino benzoic acid group or a amino benzoic acid tetraethyl ammonium salt and highly deionized water. Moreover, the resultant was subject to ultrasonic dispersion to obtain a reformed pigment dispersion in which the solid portion was concentrated to 20 percent by mass.

The surface treatment level of the thus-obtained reformed pigment dispersion was 0.35 mmol/g and the volume average particle diameter was 114 nm as measured by a particle size distribution measuring instrument (NANOTRAC UPA-EX150, manufactured by NIKKISO CO., LTD.).

Preparation Example 4

Preparation of Surface Reformed Black Pigment Dispersion 4

1 kg of pigment dispersion of self-dispersible carbon black Aqua-Black 162 (solid portion: 19.2 percent by mass, manufactured by TOKAI CARBON CO., LTD.) was subject to acid deposition by 0.1 normal aqueous solution of HCL. Next, the pH of the resultant was adjusted to be 9 with 40 percent benzyl trimethylammonium hydroxide solution (methanol solution) to obtain a reformed pigment dispersion including a pigment bonded with at least one carboxylic acid group or a carboxylic acid benzyl trimethyl ammonium salt 30 minutes later.

Thereafter, ultra-filtration using dialysis membrane was conducted using the thus-obtained reformed pigment dispersion including a pigment bonded with at least one carboxylic acid group or a carboxylic acid benzyl trimethyl-ammonium salt and highly deionized water. Moreover, the resultant was subject to ultrasonic wave dispersion to obtain a reformed pigment dispersion in which the solid portion was concentrated to 20 percent by mass.

The volume average particle diameter of the thus-obtained reformed pigment dispersion was 100 nm as measured by a particle size distribution measuring instrument (NANOTRAC UPA-EX150, manufactured by NIKKISO CO., LTD.).

Preparation Example 5

Preparation of Surface Reformed Black Pigment Dispersion 5

1 kg of pigment dispersion of SENSIJET Black SDP2000 (Solid portion: 14.5 percent by mass, manufactured by SENSIENT Corporation) was subject to acid deposition with 0.1 normal HCL aqueous solution. Thereafter, the pH of the resultant was adjusted to be 9 with 10 percent by mass tetrabutyl ammonium hydroxide solution (methanol solution) to obtain a reformed pigment dispersion including a pigment bonded with at least one carboxylic acid group or a carboxylic acid tetrabutyl ammonium salt and a sulfonic acid group or a sulfonic acid tetrabutyl ammonium salt 30 minutes later.

Thereafter, ultra-filtration using dialysis membrane was conducted using the thus-obtained reformed pigment dispersion including a pigment bonded with at least one carboxylic acid group or a carboxylic acid tetrabutyl ammonium salt and a sulfonic acid group or a sulfonic acid tetrabutyl ammonium salt. Moreover, the resultant was subject to ultrasonic wave dispersion to obtain a reformed pigment dispersion in which the solid portion was concentrated to 20 percent by mass.

The volume average particle diameter of the thus-obtained reformed pigment dispersion was 120 nm as measured by a particle size distribution measuring instrument (NANOTRAC UPA-EX150, manufactured by NIKKISO CO., LTD.).

Preparation Example 6

Preparation of Dispersion Element 1 of Surface Reformed Magenta Pigment 1 kg of SENSIJET SMART Magenta 3122BA (Pigment Red 122 surface treated dispersion, solid portion: 14.5 percent by mass, manufactured by SENSIENT Corporation) was subject to acid deposition with 0.1 normal HCL aqueous solution. Next, the pH of the resultant was adjusted to be 9 with 10 percent by mass tetraethyl ammonium hydroxide solution to obtain a reformed pigment dispersion including a pigment bonded with at least one amino benzoic acid group or an amino benzoic acid tetraethyl ammonium salt 30 minutes later.

Thereafter, ultra-filtration using dialysis membrane was conducted using the thus-obtained reformed pigment dispersion including a pigment bonded with at least one amino benzoic acid group or amino benzoic acid tetraethyl ammonium salt and highly deionized water. Moreover, the resultant was subject to ultrasonic wave dispersion to obtain a reformed pigment dispersion in which the solid portion was concentrated to 20 percent by mass.

The volume average particle diameter of the thus-obtained reformed pigment dispersion was 104 nm as measured by a particle size distribution measuring instrument (NANOTRAC UPA-EX150, manufactured by NIKKISO CO., LTD.).

Preparation Example 7

Preparation of Surface Reformed Cyan Pigment Dispersion Element 1

1 kg of SENSUET SMART Cyan 3154BA (Pigment Blue 15:4 surface treated dispersion, solid portion: 14.5 percent by mass, manufactured by SENSIENT Corporation) was subject to acid deposition with 0.1 normal HCL aqueous solution. Next, the pH of the resultant was adjusted to be 9 with 40 percent benzyl trimethyl ammonium hydroxide solution (methanol solution) to obtain a reformed pigment dispersion including a pigment bonded with at least one amino benzoic acid group or an amino benzoic acid benzyl trimethyl ammonium salt 30 minutes later.

Thereafter, ultra-filtration using dialysis membrane was conducted using the thus-obtained reformed pigment dispersion including a pigment bonded with at least one amino benzoic acid group or an amino benzoic acid benzyl trimethyl ammonium salt and highly deionized water. Moreover, the resultant was subject to ultrasonic wave dispersion to obtain a reformed pigment dispersion in which the solid portion was concentrated to 20 percent by mass.

The volume average particle diameter of the thus-obtained reformed pigment dispersion was 116 nm as measured by a particle size distribution measuring instrument (NANOTRAC UPA-EX150, manufactured by NIKKISO CO., LTD.).

Preparation Example 8

Preparation of Surface Reformed Yellow Pigment Dispersion 1

1 kg of SENSUET SMART Yellow 3074BA (Pigment Yellow 74, surface treated dispersion, solid portion: 14.5 percent by mass, manufactured by SENSIENT Corporation) was subject to acid deposition with 0.1 normal HCL aqueous solution. Next, the pH of the resultant was adjusted to be 9 with 10 percent by mass tetrabutyl ammonium hydroxide solution (methanol solution) to obtain a reformed pigment dispersion including a pigment bonded with at least one amino benzoic acid group or an amino benzoic acid tetrabutyl ammonium salt 30 minutes later.

Thereafter, ultra-filtration using dialysis membrane was conducted using the thus-obtained reformed pigment dispersion including a pigment bonded with at least one amino benzoic acid group or amino benzoic acid tetrabutyl ammonium salt and highly deionized water. Moreover, the resultant was subject to ultrasonic wave dispersion to obtain a reformed pigment dispersion in which the solid portion was concentrated to 20 percent by mass.

The volume average particle diameter of the thus-obtained reformed pigment dispersion was 145 nm as measured by a particle size distribution measuring instrument (NANOTRAC UPA-EX150, manufactured by NIKKISO CO., LTD.).

Preparation Example 9

Preparation of Polymer Particle Dispersion Containing Carbon Black Pigment

Preparation of Polymer Solution A

A flask equipped with a mechanical stirrer, a thermometer, a nitrogen gas introducing tube, a reflux tube, and a dripping funnel was sufficiently replaced with nitrogen gas and thereafter 11.2 g of styrene, 2.8 g of acrylic acid, 12.0 g of lauryl methacrylate, 4.0 g of polyethlene glycol methacrylate, 4.0 g of styrene macromer (AS-6, manufactured by TOA GOSEI CO., LTD.), and 0.4 g of mercapto ethanol were loaded and mixed in the flask and the system was heated to 65 degrees C.

Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (AS-6, manufactured by TOA GOSEI CO., LTD.), 3.6 g of mercapto ethanol, 2.4 g of azobismethyl valeronitrile, and 18 g of methylethyl ketone was dripped into the flask in two and a half hours. Subsequently, a liquid mixture of 0.8 g of azobismethyl valeronitrile and 18 g of methylethyl ketone was dripped into the flask in half an hour. After one-hour aging at 65 degrees C., 0.8 g of azobismethyl valeronitrile was added and aged for another hour. After the reaction was complete, 364 g of methylethyl ketone was added to the flask to obtain 800 g of polymer solution A having a concentration of 50 percent by mass.

Preparation of Polymer Particle Dispersion Containing Carbon Black Pigment 28 g of the polymer solution A, 42 g of C.I. carbon black (FW100, manufactured by Degussa AG), 13.6 g of 1 mol/l potassium hydroxide aqueous solution, 20 g of methylethyl ketone, and 13.6 g of deionized water were sufficiently stirred and thereafter mixed and kneaded using a roll mill. The thus-obtained paste was loaded in 200 g of deionized water followed by sufficient stirring. Methyl ethyl ketone and water were distilled away using an evaporator and coarse particles were removed by filtrating the thus-obtained liquid dispersion with a polyvinylidene fluoride membrane filter having an average opening diameter of 5.0 μm under pressure to obtain a carbon black pigment containing polymer particle liquid dispersion containing a solid pigment portion in an amount of 15 percent by mass and a solid portion concentration of 20 percent by mass.

The volume average particle diameter of the polymer particles in the thus-obtained polymer particle liquid dispersion containing carbon black was 104 nm as measured by particle size distribution measuring instrument (NANO-TRAC UPA-EX150, manufactured by NIKKISO CO., LTD.)

Manufacturing Example 1

Preparation of Resin Emulsion 1

A mixture of 1.2 parts by mass of acrylic acid as the monomer (a1), 6 parts of vinyltrimethxy silane (Sila-Ace 210, manufactured by CHISSO CORPORATION) as the monomer (a2), 35.5 parts by mass of methylmethacrylate as the monomer (a3), 60.3 parts by mass of acrylic acid-2-ethylhexyl, 1.0 part of acrylamide, 1.5 parts of AQUALON KH-20 (reactive emulsifier, manufactured by DKS Co. Ltd.) as emulsifier, and 53.1 parts of deionized water were emulsified by a batch type homomixer to prepare a monomer pre-emulsion, which was placed in a dripping tank.

If the number of particles having a diameter of 0.5 μm or greater is 5,000 particles/cm³ or more, the measuring precision deteriorates. Therefore, in order that the number of the particles having a diameter of 0.5 μm or greater was around 5,000 particles/cm³, the monomer pre-emulsion having a monomer concentration of around 60 percent was diluted with distilled water. The volume average particle diameter of the monomer pre-emulsion about the diluted liquid in which the monomer concentration was about 0.002 percent by mass was 3.0 μm according to the number counting method as measured by Accusizer (manufactured by PARTICLE SIZING SYSTEMS, USA).

89.4 parts by mass of deionized water was loaded in a four-necked flask (having a volume of 2 L) as a reaction container equipped with a reflux condenser, a stirrer, a thermometer, a nitrogen introducing tube, and an inlet through which raw material was loaded. The liquid was stirred and heated to 60 degrees C. while introducing nitrogen into the flask. Thereafter, 0.5 parts of AQUALON KH-20 (manufactured by DKS Co. Ltd.) as alkylphenylether-based reactive emulsifier was added to the reaction container and at the same time, 6 parts of 5 percent by mass ammonium persulfate (hereinafter referred to as APS) (0.3 percent by mass as ammonium persulfate) was added thereto.

10 minutes after the 5 percent APS aqueous solution was added to the reaction container, the monomer pre-emulsion was continuously dripped from the dripping tank to the reaction container in five hours. Also, 6 parts of the 5 percent by mass APS aqueous solution (0.3 parts as ammonium persulfate) was incessantly dripped from another dropping tank to the reaction container in five hours. The reaction container was maintained at 70 degrees C.

After the dripping, the resultant was aged at 70 degrees C. for three hours. Thereafter, the resultant was cooled down to 50 degrees C. and ammonium water was added followed by filtration using a polyester cloth of 180 meshes. The agglomerated matter remaining on the filter cloth was dried at 150 degrees C. for 20 minutes. The agglomerated amount (percent by mass) was 0.1 percent by mass when obtained based on the content of the monomer, the emulsifier, and the polymerization initiator.

A part of the resin emulsion was measured and taken out after the filtration and dried at 150 degrees C. for 20 minutes. The concentration of the solid portion was 39.5 percent by mass. In addition, the resin emulsion had a pH of 8 and a viscosity of 50 mPa·s.

The limit of the measuring device of the the number of particles having a diameter of 0.5 μm or greater is around 5,000 particles/cm³ or less. Therefore, the resin emulsion after the filtration was diluted to a solid portion concentration of 0.002 percent by mass in order to obtain such a range. The 50 percent cumulative volume particle diameter ($D_{50}$) was 130 nm according to dynamic light scattering method using microtrac UPA (manufactured by Leeds & Nothrup).

Separately, the resin emulsion after the filtration was diluted to a solid portion concentration of 0.002 percent by mass and the diluted liquid was subject to number counting method to obtain the number of super coarse particles having a particle diameter of 1.5 μm or greater using Accusizer (manufactured by PARTICLE SIZING SYSTEMS, USA). The number of super coarse particles having a particle diameter of 1.5 μm or greater in the resin emulsion was $1.0 \times 10^5$ particles/cm³ in 0.1 percent by mass of the solid portion concentration.

The glass transition temperature (hereinafter, referred to as theoretical Tg) obtained from the monomers excluding vinyl trimethoxyxilane was 5 degrees C.

Manufacturing Example 2

Preparation of Resin Emulsion 2

Resin emulsion 2 was manufactured in the same manner as in Manufacturing Example 1 except that the recipe in the Manufacturing Example 1 was changed to the following recipe.

| Recipe | |
|---|---|
| Acrylic acid: | 3.0 parts |
| Butyl acrylate: | 12.5 parts |
| Acrylic acid-2-ethylhexyl: | 20.0 parts |
| Styrene: | 22.0 parts |
| Vinyl trimethoxyxilane (Sila-Ace 210, manufactured by Chisso Corporation): | 6 parts |

The 50 percent cumulative volume particle diameter ($D_{50}$) of the thus-obtained resin emulsion 2 was 100 nm as measured by dynamic light scattering method. In addition, the theoretical Tg obtained from the monomers excluding vinyl trimethoxyxilane was 15 degrees C. The solid portion concentration was 39.6 percent by mass.

Manufacturing Example 3

Preparation of Resin Emulsion 3

Resin emulsion 3 was manufactured in the same manner as in Manufacturing Example 1 except that the recipe in the Manufacturing Example 1 was changed to the following recipe.

| Recipe | |
|---|---|
| Acrylic acid: | 5.0 parts |
| Acrylic acid-2-ethylhexyl: | 22.0 parts |
| Methacrylic acid-2-ethylhexyl: | 6.0 parts |
| Methacrylic acid cyclohexyl: | 5.0 parts |
| Styrene: | 22.0 parts |
| Vinyl trimethoxyxilane (Sila-Ace 210, manufactured by Chisso Corporation): | 6 parts |

The 50 percent cumulative volume particle diameter ($D_{50}$) of the thus-obtained resin emulsion 3 was 80 nm as measured by dynamic light scattering method. In addition, the theoretical Tg obtained from the monomers excluding vinyl trimethoxyxilane was 30 degrees C. The solid portion concentration was 39.4 percent by mass.

Manufacturing Example 4

Preparation of Resin Emulsion 4

Resin emulsion 4 was manufactured in the same manner as in Manufacturing Example 1 except that the recipe in the Manufacturing Example 1 was changed to the following recipe.

| Recipe | |
|---|---|
| Methacrylic acid: | 3.0 parts |
| Butyl acrylate: | 25.0 parts |
| Acrylic Amide: | 1.0 part |
| Styrene: | 29.0 parts |
| Vinyl trimethoxyxilane (Sila-Ace 210, manufactured by Chisso Corporation): | 6 parts |

The 50 percent cumulative volume particle diameter ($D_{50}$) of the thus-obtained resin emulsion 4 was 80 nm as measured by dynamic light scattering method. In addition, the theoretical Tg obtained from the monomers excluding vinyl trimethoxyxilane was 45 degrees C. The solid portion concentration was 39.5 percent by mass.

Manufacturing Example 5

Preparation of Resin Emulsion 5

Resin emulsion 5 was manufactured in the same manner as in Manufacturing Example 1 except that the recipe in the Manufacturing Example 1 was changed to the following recipe.

| Composition | |
|---|---|
| Methacrylic acid: | 6.0 parts |
| Ethyl acrylate: | 20.0 parts |
| Methyl methacrylate: | 16.0 parts |
| Acrylic Amide: | 1.0 part |
| Styrene: | 20.0 parts |
| Vinyl trimethoxyxilane (Sila-Ace 210, manufactured by Chisso Corporation): | 6 parts |

The 50 percent cumulative volume particle diameter ($D_{50}$) of the thus-obtained resin emulsion 5 was 90 nm as measured by dynamic light scattering method. In addition, the theoretical Tg obtained from the monomers excluding vinyl trimethoxyxilane was 70 degrees C. The solid portion concentration was 39.7 percent by mass.

Example 1

Preparation of Ink 20.00 parts of 3-n-buthoxy-N,N-dimethyl propaneamide represented by the Chemical structure 1, 25.00 parts of 1,2-propane diol, 2.00 parts of 2,2,4-trimethyl-1,3-pentane diol, 1.00 part of polyether-modified siloxane compound represented by the Chemical structure VII, and 0.50 parts of 2,4,7,9-tetramethyl decane-4,7-diol were loaded in a vessel equipped with a stirrer and stirred for 30 minutes to obtain a uniform mixture.

Thereafter, 0.05 parts of mildew-proofing agent (Proxel GXL, manufactured by AVECIA GROUP), 0.20 parts of 2-amino-2-ethyl-1,3-propane diol, 37.50 parts of the surface reformed black pigment dispersion 1 of Preparation Example 1, and deionized water were added to the mixture and stirred for 60 minutes to obtain a uniform ink. Moreover, 6.25 parts of the resin emulsion 1 of the Manufacturing Example 1 was added thereto to make the total 100 parts followed by stirring for 30 minutes to obtain ink.

Thereafter, the thus-obtained ink was filtrated with a polyvinylidene fluoride membrane filter having an average hole diameter of 1.2 µm under pressure to remove coarse particles and dust. Thus, ink of Example 1 was prepared.

Example 2

40.00 parts of 3-ethyl-hydroxymethyl oxetane represented by the Chemical structure 4, 2.00 parts of 2,2,4-trimethyl-1,3-pentane diol, 2.00 parts of polyether-modified siloxane compound represented by the Chemical structure IX, and 0.50 parts of 2,4,7,9-tetramethyl decane-4,7-diol were loaded in a vessel equipped with a stirrer and stirred for 30 minutes to obtain a uniform mixture.

Thereafter, 0.05 parts of mildew-proofing agent (Proxel GXL, manufactured by AVECIA GROUP), 0.20 parts of 2-amino-2-ethyl-1,3-propane diol, 37.50 parts of the surface reformed black pigment dispersion 1 of Preparation Example 1, and deionized water were added to the mixture and stirred for 60 minutes to obtain uniform material.

Moreover, 6.25 parts of the resin emulsion 2 of the Manufacturing Example 2 was added thereto to make the total 100 parts followed by stirring for 30 minutes to obtain ink.

Thereafter, the thus-obtained ink was filtrated with a polyvinylidene fluoride membrane filter having an average hole diameter of 1.2 µm under pressure to remove coarse particles and dust. Thus, ink of Example 2 was prepared.

Examples 3 to 15 and Comparative Examples 1 to 8

The organic solvents, surfactants, and the deforming agents shown in Tables 1 to 5 were mixed in the same manner as in Example 1 or Example 2. Thereafter, the mildew-proofing agent, the pH regulator, the coloring material (pigment dispersion), and the resin emulsion shown in Tables 1 to 5 were mixed and stirred to obtain a uniform ink.

Thereafter, the thus-obtained ink was filtrated with a polyvinylidene fluoride membrane filter having an average hole diameter of 1.2 μm under pressure to remove coarse particles and dust. Thus, inks of Examples 3 to 15 and Comparative Examples 1 to 8 were prepared.

The organic solvents used in Examples 1 to 15 and Comparative Examples 1 to 8 are shown in Table A.

TABLE A

| Organic solvent | Polyhydric alcohol having a solubility parameter (SP value) of from 8.96 to less than 11.8 | Organic solvent | Chemical structure 1 3-n-buthoxy-N,N-dimethyl propaneamide (SP value: 9.03) Chemical structure 4 3-ethyl-3-hydroxyl methyl oxetane (SP value: 11.3) |
| --- | --- | --- | --- |
| | | Per- meating agent | 2-ethyl-1,3-hexanediol (SP value: 10.6) 2,2,4-trimethyl-1,3-pentanediol (SP value: 10.8) |
| | Polyhydric alcohol having a solubility parameter (SP value) of from 11.8 to 14.0 | Organic solvent | 1,2-butane diol (SP value: 12.8) 1,2-Propane diol (SP value: 13.5) |
| | Polyhydric alcohol having an equilibrium moisture content of 30 percent or more at 23 degrees C. and a relative humidity of 80 percent | Wetting Agent | Glycerin (SP value: 16.38) Triethylene glycol (SP value: 15.4) |

TABLE 1

| Component (percent by mass) | | Example 1 | Example 2 | Example 3 | Example 4 | Example 5 |
| --- | --- | --- | --- | --- | --- | --- |
| Coloring material (pigment dispersion) | Surface reformed black pigment dispersion 1 (Preparation Example 1) | 37.50 | 37.50 | — | — | — |
| | Surface reformed black pigment dispersion 2 (Preparation Example 2) | — | — | 37.50 | — | — |
| | Surface reformed black pigment dispersion 3 (Preparation Example 3) | — | — | — | 35.00 | — |
| | Surface reformed black pigment dispersion 4 (Preparation Example 4) | — | — | — | — | 37.50 |
| | Surface reformed black pigment dispersion 5 (Preparation Example 5) | — | — | — | — | — |
| | Surface reformed magenta pigment dispersion 1 (Preparation Example 6) | — | — | — | — | — |
| | Surface reformed cyan pigment dispersion 1 (Preparation Example 7) | — | — | — | — | — |
| | Surface reformed yellow pigment dispersion 1 (Preparation Example 8) | — | — | — | — | — |
| | SENSIJET SMART Magenta 3122BA (sodium aminobenzoate) | — | — | — | — | — |
| | SENSIJET SMART Magenta 3154BA (sodium aminobenzoate) | — | — | — | — | — |
| | SENSIJET SMART Yellow 3047BA (sodium aminobenzoate) | — | — | — | — | — |
| | SENSIJET Black SDP2000 (sodium carbonate, sodium sulfonate) | — | — | — | — | — |
| | Polymer particle dispersion containing carbon black (Preparation Example 9) | — | — | — | — | — |
| Resin Particle | Resin emulsion 1 of Manufacturing Example 1 | 6.25 | — | — | — | — |
| | Resin emulsion 2 of Manufacturing Example 2 | — | 6.25 | — | — | — |
| | Resin emulsion 3 of Manufacturing Example 3 | — | — | 6.25 | — | — |
| | Resin emulsion 4 of Manufacturing Example 4 | — | — | — | 6.25 | — |
| | Resin emulsion 5 of Manufacturing Example 5 | — | — | — | — | 6.25 |
| | Polycarbonate urethane resin emulsion (TAKELAC ™ W-6110) | — | — | — | — | — |

TABLE 1-continued

| | Component (percent by mass) | Example 1 | Example 2 | Example 3 | Example 4 | Example 5 |
|---|---|---|---|---|---|---|
| Organic solvent | Vinyl chloride-based acrylic resin emulsion (VINYBLAN 700) | — | — | — | — | — |
| Organic solvent | Chemical structure 1 3-n-buthoxy-N,N-dimethyl propaneamide (SP value: 9.03) | 20.00 | — | 30.00 | — | — |
| | Chemical structure 4 3-ethyl-3-hydroxyl methyl oxetane (SP value: 11.3) | — | 40.00 | — | 42.00 | 30.00 |
| | 1,2-butane diol (SP value: 12.8) | — | — | 10.00 | — | 5.00 |
| | 1,2-propane diol (SP value: 13.5) | 25.00 | — | — | — | 5.00 |
| | Triethylene glycol butyhlmethyl ether (SP value: 8.41) | — | — | — | — | — |
| Wetting agent | Glycerin (SP value: 16.38) | — | — | — | — | — |
| | Triethylene glycol (SP value: 15.4) | — | — | — | — | — |
| Permeating agent | 2-Ethyl-1,3-hexanediol (SP value: 10.6) | — | — | 2.00 | 2.00 | 2.00 |
| | 2,2,4-Trimethyl-1,3-pentanediol (SP value: 10.8) | 2.00 | 2.00 | — | — | — |
| Surfactant | Chemical structure VII polyether-modified siloxane compound | 1.00 | — | — | — | — |
| | Chemical structure IX polyether-modified siloxane compound | — | 2.00 | — | — | — |
| | Chemical structure X polyether-modified siloxane compound | — | — | 2.00 | — | — |
| | TEGO Wet 270 | — | — | — | 2.00 | — |
| | SILFACE SAG503A | — | — | — | — | 1.00 |
| | UNIDYNE™ DSN403N | — | — | — | — | — |
| | Zonyl FS-300 | — | — | — | — | — |
| | Surfynol 104E | — | — | — | — | — |
| | SOFTANOL EP7025 | — | — | — | — | — |
| Mildew-proofing agent | Proxel GXL | 0.05 | 0.05 | 0.05 | 0.05 | 0.05 |
| Foam Inhibitor (Defoaming Agent) | 2,4,7,9-tetramethyldecane-4,7-diol | 0.50 | 0.50 | — | — | 0.40 |
| | 2,5,8,11-tetramethyldecane-5,8-diol | — | — | 0.40 | 0.40 | — |
| pH regulator | 2-amino-2-ethyl-1,3-propane diol | 0.20 | 0.20 | 0.20 | 0.10 | 0.10 |
| | Pure water | Rest | Rest | Rest | Rest | Rest |
| | Total (Percent by mass) | 100 | 100 | 100 | 100 | 100 |

TABLE 2

| | Component (percent by mass) | Example 6 | Example 7 | Example 8 | Example 9 | Example 10 |
|---|---|---|---|---|---|---|
| Coloring material (pigment dispersion) | Surface reformed black pigment dispersion 1 (Preparation Example 1) | — | — | — | — | — |
| | Surface reformed black pigment dispersion 2 (Preparation Example 2) | — | — | — | — | — |
| | Surface reformed black pigment dispersion 3 (Preparation Example 3) | — | — | — | — | — |

TABLE 2-continued

| | Component (percent by mass) | | Example 6 | Example 7 | Example 8 | Example 9 | Example 10 |
|---|---|---|---|---|---|---|---|
| | | Surface reformed black pigment dispersion 4 (Preparation Example 4) | — | — | — | — | — |
| | | Surface reformed black pigment dispersion 5 (Preparation Example 5) | 37.50 | — | — | — | — |
| | | Surface reformed magenta pigment dispersion 1 (Preparation Example 6) | — | 35.00 | — | — | — |
| | | Surface reformed cyan pigment dispersion 1 (Preparation Example 7) | — | — | 22.50 | — | 22.50 |
| | | Surface reformed yellow pigment dispersion 1 (Preparation Example 8) | — | — | — | 22.50 | — |
| | | SENSIJET SMART Magenta 3122BA (sodium aminobenzoate) | — | — | — | — | — |
| | | SENSIJET SMART Cyan 3154BA (sodium aminobenzoate) | — | — | — | — | — |
| | | SENSIJET SMART Yellow 3074BA (sodium aminobenzoate) | — | — | — | — | — |
| | | SENSIJET Black SDP2000 (sodium carbonate, sodium sulfonate) | — | — | — | — | — |
| | | Polymer particle dispersion containing carbon black (Preparation Example 9) | — | — | — | — | — |
| | Resin Particle | Resin emulsion 1 of Manufacturing Example 1 | 7.50 | — | — | — | — |
| | | Resin emulsion 2 of Manufacturing Example 2 | — | 7.50 | — | — | — |
| | | Resin emulsion 3 of Manufacturing Example 3 | — | — | — | — | — |
| | | Resin emulsion 4 of Manufacturing Example 4 | — | — | 7.50 | 7.50 | 7.50 |
| | | Resin emulsion 5 of Manufacturing Example 5 | — | — | — | — | — |
| | | Polycarbonate urethane resin emulsion (TAKELAC ™ W-6110) | — | — | — | — | — |
| | | Vinyl chloride-based acrylic resin emulsion (VINYBLAN 700) | — | — | — | — | — |
| Organic solvent | Organic solvent | Chemical structure 1 3-n-buthoxy-N,N-dimethyl propaneamide (SP value: 9.03) | 30.00 | — | — | — | 39.00 |
| | | Chemical structure 4 3-ethyl-3-hydroxyl methyl oxetane (SP value: 11.3) | — | 39.00 | 49.00 | 52.50 | — |
| | | 1,2-butane diol (SP value: 12.8) | — | — | — | — | — |
| | | 1,2-Propane diol (SP value: 13.5) | 10.00 | — | — | — | 10.00 |
| | | Triethylene glycol butyhlmethyl ether (SP value: 8.41) | — | — | — | — | — |
| | Wetting agent | Glycerin (SP value: 16.38) | — | — | — | — | — |
| | | Triethylene glycol (SP value: 15.4) | — | — | — | — | — |
| | Permeating agent | 2-Ethyl-1,3-hexanediol (SP value: 10.6) | 1.00 | 2.00 | 2.00 | 2.00 | 2.00 |
| | | 2,2,4-trimethyl-1,3-pentanediol (SP value: 10.8) | — | — | — | — | — |
| | Surfactant | Chemical structure VII polyether-modified siloxane compound | — | 2.00 | — | — | — |

TABLE 2-continued

|  | Component (percent by mass) | Example 6 | Example 7 | Example 8 | Example 9 | Example 10 |
|---|---|---|---|---|---|---|
|  | Chemical structure IX polyether-modified siloxane compound | — | — | 2.00 | — | — |
|  | Chemical structure X polyether-modified siloxane compound | — | — | — | 3.00 | — |
|  | TEGO Wet 270 | 3.00 | — | — | — | — |
|  | SILFACE SAG503A | — | — | — | — | 2.00 |
|  | UNIDYNE ™ DSN403N | — | — | — | — | — |
|  | Zonyl FS-300: | — | — | — | — | — |
|  | Surfynol 104E | — | — | — | — | — |
|  | SOFTANOL EP7025 | — | — | — | — | — |
| Mildew-proofing agent | Proxel GXL | 0.05 | 0.05 | 0.05 | 0.05 | 0.05 |
| Foam Inhibitor (Defoaming Agent) | 2,4,7,9-tetramethyldecane-4,7-diol | 0.40 | 0.40 | 0.40 | 0.40 | 0.40 |
|  | 2,5,8,11-tetramethyldodecane-5,8-diol | — | — | — | — | — |
| pH regulator | 2-amino-2-ethyl-1,3-propane diol | 0.20 | 0.20 | 0.20 | 0.20 | 0.20 |
|  | Pure water | Rest | Rest | Rest | Rest | Rest |
|  | Total (Percent by mass) | 100 | 100 | 100 | 100 | 100 |

TABLE 3

|  | Component (percent by mass) | Example 11 | Example 12 | Example 13 | Example 14 | Example 15 |
|---|---|---|---|---|---|---|
| Coloring material (pigment dispersion) | Surface reformed black pigment dispersion 1 (Preparation Example 1) | — | — | — | — | — |
|  | Surface reformed black pigment dispersion 2 (Preparation Example 2) | — | — | — | — | — |
|  | Surface reformed black pigment dispersion 3 (Preparation Example 3) | — | — | — | — | — |
|  | Surface reformed black pigment dispersion 4 (Preparation Example 4) | — | — | — | — | — |
|  | Surface reformed black pigment dispersion 5 (Preparation Example 5) | — | — | — | — | — |
|  | Surface reformed magenta pigment dispersion 1 (Preparation Example 6) | — | — | — | — | — |
|  | Surface reformed cyan pigment dispersion 1 (Preparation Example 7) | — | — | — | — | — |
|  | Surface reformed yellow pigment dispersion 1 (Preparation Example 8) | — | — | — | — | — |
|  | SENSIJET SMART Magenta 3122BA (sodium aminobenzoate) | — | — | 35.00 | — | — |
|  | SENSIJET SMART Cyan 3154BA (sodium aminobenzoate) | — | — | — | 22.50 | — |
|  | SENSIJET SMART Yellow 3074BA (sodium aminobenzoate) | — | — | — | — | 22.50 |
|  | SENSIJET Black SDP2000 (sodium carbonate, sodium sulfonate) | — | 48.28 | — | — | — |
|  | Polymer particle dispersion containing carbon black (Preparation Example 9) | 46.67 | — | — | — | — |

TABLE 3-continued

| | Component (percent by mass) | Example 11 | Example 12 | Example 13 | Example 14 | Example 15 |
|---|---|---|---|---|---|---|
| Resin Particle | Resin emulsion 1 of Manufacturing Example 1 | — | — | — | — | — |
| | Resin emulsion 2 of Manufacturing Example 2 | — | — | — | — | — |
| | Resin emulsion 3 of Manufacturing Example 3 | — | — | — | — | — |
| | Resin emulsion 4 of Manufacturing Example 4 | 7.50 | 7.50 | 7.50 | 7.50 | 7.50 |
| | Resin emulsion 5 of Manufacturing Example 5 | — | — | — | — | — |
| | Polycarbonate urethane resin emulsion (TAKELAC™ W-6110) | — | — | — | — | — |
| | Vinyl chloride-based acrylic resin emulsion (VINYBLAN 700) | — | — | — | — | — |
| Organic solvent / Organic solvent | Chemical structure 1 3-n-buthoxy-N,N-dimethyl propaneamide (SP value: 9.03) | — | — | — | — | — |
| | Chemical structure 4 3-ethyl-3-hydroxyl methyl oxetane (SP value: 11.3) | 42.00 | 42.00 | 39.00 | 49.00 | 52.50 |
| | 1,2-butane diol (SP value: 12.8) | — | — | — | — | — |
| | 1,2-Propane diol (SP value: 13.5) | — | — | — | — | — |
| | Triethylene glycol butylhlmethyl ether (SP value: 8.41) | — | — | — | — | — |
| Wetting agent | Glycerin (SP value: 16.38) | — | — | — | — | — |
| | Triethylene glycol (SP value: 15.4) | — | — | — | — | — |
| Permeating agent | 2-Ethyl-1,3-hexanediol (SP value: 10.6) | 2.00 | 2.00 | 2.00 | 2.00 | 2.00 |
| | 2,2,4-Trimethyl-1,3-pentanediol (SP value: 10.8) | — | — | — | — | — |
| Surfactant | Chemical structure VII polyether-modified siloxane compound | — | — | 2.00 | — | — |
| | Chemical structure IX polyether-modified siloxane compound | — | — | — | 2.00 | — |
| | Chemical structure X polyether-modified siloxane compound | — | — | — | — | 3.00 |
| | TEGO Wet 270 | 2.00 | 2.00 | — | — | — |
| | SILFACE SAG503A | — | — | — | — | — |
| | UNIDYNE™ DSN403N | — | — | — | — | — |
| | Zonyl FS-300 | — | — | — | — | — |
| | Surfynol 104E | — | — | — | — | — |
| | SOFTANOL EP7025 | — | — | — | — | — |
| Mildew-proofing agent | Proxel GXL | 0.05 | 0.05 | 0.05 | 0.05 | 0.05 |
| Foam Inhibotor (Defoaming Agent) | 2,4,7,9-tetramethyldecane-4,7-diol | — | — | 0.40 | 0.40 | 0.40 |
| | 2,5,8,11-tetramethyldodecane-5,8-diol | 0.40 | 0.40 | — | — | — |
| pH regulator | 2-amino-2-ethyl-1,3-propane diol | 0.10 | 0.10 | 0.20 | 0.20 | 0.20 |
| | Pure water | Rest | Rest | Rest | Rest | Rest |
| | Total (Percent by mass) | 100 | 100 | 100 | 100 | 100 |

TABLE 4

| Component (percent by mass) | | | Comparative Example | | | | |
|---|---|---|---|---|---|---|---|
| | | | 1 | 2 | 3 | 4 | 5 |
| Coloring material (pigment dispersion) | | Surface reformed black pigment dispersion 1 (Preparation Example 1) | — | — | — | — | — |
| | | Surface reformed black pigment dispersion 2 (Preparation Example 2) | — | — | — | — | — |
| | | Surface reformed black pigment dispersion 3 (Preparation Example 3) | — | — | — | — | — |
| | | Surface reformed black pigment dispersion 4 (Preparation Example 4) | — | — | — | — | — |
| | | Surface reformed black pigment dispersion 5 (Preparation Example 5) | — | — | — | — | — |
| | | Surface reformed magenta pigment dispersion 1 (Preparation Example 6) | 35.00 | 35.00 | — | — | — |
| | | Surface reformed cyan pigment dispersion 1 (Preparation Example 7) | — | — | 22.50 | 22.50 | 22.50 |
| | | Surface reformed yellow pigment dispersion 1 (Preparation Example 8) | — | — | — | — | — |
| | | SENSIJET SMART Magenta 3122BA (sodium aminobenzoate) | — | — | — | — | — |
| | | SENSIJET SMART Cyan 3154BA (sodium aminobenzoate) | — | — | — | — | — |
| | | SENSIJET SMART Yellow 3074BA (sodium aminobenzoate) | — | — | — | — | — |
| | | SENSIJET Black SDP2000 (sodium carbonate, sodium sulfonate) | — | — | — | — | — |
| | | Polymer particle dispersion containing carbon black (Preparation Example 9) | — | — | — | — | — |
| Resin Particle | | Resin emulsion 1 of Manufacturing Example 1 | — | — | — | — | — |
| | | Resin emulsion 2 of Manufacturing Example 2 | — | — | — | — | — |
| | | Resin emulsion 3 of Manufacturing Example 3 | — | — | — | — | — |
| | | Resin emulsion 4 of Manufacturing Example 4 | — | — | 6.25 | 6.25 | 6.25 |
| | | Resin emulsion 5 of Manufacturing Example 5 | — | — | — | — | — |
| | | Polycarbonate urethane resin emulsion (TAKELAC™ W-6110) | 6.25 | — | — | — | — |
| | | Vinyl chloride-based acrylic resin emulsion (VINYBLAN 700) | — | 6.25 | — | — | — |
| Organic solvent | Organic solvent | Chemical structure 1 3-n-buthoxy-N,N-dimethyl propaneamide (SP value: 9.03) | 15.00 | — | — | — | — |
| | | Chemical structure 4 3-ethyl-3-hydroxyl methyl oxetane (SP value: 11.3) | — | — | 49.00 | 49.00 | 49.00 |
| | | 1,2-butane diol (SP value: 12.8) | 5.00 | — | — | — | — |
| | | 1,2-Propanediol (SP value: 13.5) | — | — | — | — | — |
| | | Triethylene glycol butyhlmethyl ether (SP value: 8.41) | — | — | — | — | — |
| | Wetting agent | Glycerin (SP value: 16.38) | 22.00 | 30.00 | — | — | — |
| | | Triethylene glycol (SP value: 15.4) | — | 12.50 | — | — | — |

TABLE 4-continued

| | | Comparative Example | | | | |
|---|---|---|---|---|---|---|
| Component (percent by mass) | | 1 | 2 | 3 | 4 | 5 |
| Permeating agent | 2-Ethyl-1,3-hexanediol (SP value: 10.6) | 2.00 | 2.00 | 2.00 | 2.00 | 2.00 |
| | 2,2,4-Trimethyl-1,3-pentanediol (SP value: 10.8) | — | — | — | — | — |
| Surfactant | Chemical structure VII polyether-modified siloxane compound | — | — | — | — | — |
| | Chemical structure IX polyether-modified siloxane compound | — | — | 2.00 | 2.00 | 2.00 |
| | Chemical structure X polyether-modified siloxane compound | — | — | — | — | — |
| | TEGO Wet 270 | 2.00 | 2.00 | — | — | — |
| | SILFACE SAG503A | — | — | — | — | — |
| | UNIDYNE™ DSN403N | — | — | 2.00 | — | — |
| | Zonyl FS-300: | — | — | — | 5.00 | — |
| | Surfynol 104E | — | — | — | — | 2.00 |
| | SOFTANOL EP7025 | — | — | — | — | — |
| Mildew-proofing agent | Proxel GXL | 0.05 | 0.05 | 0.05 | 0.05 | 0.05 |
| Foam Inhibitor (Defoaming Agent) | 2,4,7,9-tetramethyldecane-4,7-diol | 0.40 | 0.40 | 0.40 | 0.40 | 0.40 |
| | 2,5,8,11-tetramethyldodecane-5,8-diol | — | — | — | — | — |
| pH regulator | 2-amino-2-ethyl-1,3-propane diol | 0.20 | 0.20 | 0.20 | 0.20 | 0.20 |
| | Pure water | Rest | Rest | Rest | Rest | Rest |
| Total (Percent by mass) | | 100 | 100 | 100 | 100 | 100 |

TABLE 5

| | | Comparative Example | | |
|---|---|---|---|---|
| Component (percent by mass) | | 6 | 7 | 8 |
| Coloring material (pigment dispersion) | Surface reformed black pigment dispersion 1 (Preparation Example 1) | — | — | 37.50 |
| | Surface reformed black pigment dispersion 2 (Preparation Example 2) | — | — | — |
| | Surface reformed black pigment dispersion 3 (Preparation Example 3) | — | 35.00 | — |
| | Surface reformed black pigment dispersion 4 (Preparation Example 4) | — | — | — |
| | Surface reformed black pigment dispersion 5 (Preparation Example 5) | — | — | — |
| | Surface reformed magenta pigment dispersion 1 (Preparation Example 6) | — | — | — |
| | Surface reformed cyan pigment dispersion 1 (Preparation Example 7) | 22.50 | — | — |
| | Surface reformed yellow pigment dispersion 1 (Preparation Example 8) | — | — | — |
| | SENSIJET SMART Magenta 3122BA (sodium aminobenzoate) | — | — | — |
| | SENSIJET SMART Cyan 3154BA (sodium aminobenzoate) | — | — | — |

TABLE 5-continued

| | Component (percent by mass) | Comparative Example 6 | Comparative Example 7 | Comparative Example 8 |
|---|---|---|---|---|
| | SENSIJET SMART Yellow 3074BA (sodium aminobenzoate) | — | — | — |
| | SENSIJET Black SDP2000 (sodium carbonate, sodium sulfonate) | — | — | — |
| | Polymer particle dispersion containing carbon black (Preparation Example 9) | — | — | — |
| Resin Particle | Resin emulsion 1 of Manufacturing Example 1 | — | — | 6.25 |
| | Resin emulsion 2 of Manufacturing Example 2 | — | — | — |
| | Resin emulsion 3 of Manufacturing Example 3 | — | — | — |
| | Resin emulsion 4 of Manufacturing Example 4 | 6.25 | — | — |
| | Resin emulsion 5 of Manufacturing Example 5 | — | — | — |
| | Polycarbonate urethane resin emulsion (TAKELAC ™ W-6110) | — | 6.25 | — |
| | Vinyl chloride-based acrylic resin emulsion (VINYBLAN 700) | — | — | — |
| Organic solvent / Organic solvent | Chemical structure 1 3-n-buthoxy-N,N-dimethyl propaneamide (SP value: 9.03) | — | — | — |
| | Chemical structure 4 3-ethyl-3-hydroxyl methyl oxetane (SP value: 11.3) | 49.00 | 42.00 | — |
| | 1,2-butane diol (SP value: 12.8) | — | — | — |
| | 1,2-propane diol (SP value: 13.5) | — | — | 25.00 |
| | Triethylene glycol butyhlmethyl ether (SP value: 8.41) | | | 20.00 |
| Wetting agent | Glycerin (SP value: 16.38) | — | — | — |
| | Triethylene glycol (SP value: 15.4) | — | — | — |
| Permeating agent | 2-Ethyl-1,3-hexanediol (SP value: 10.6) | 2.00 | 2.00 | — |
| | 2,2,4-trimethyl-1,3-pentanediol (SP value: 10.8) | — | — | — |
| Surfactant | Chemical structure VII polyether-modified siloxane compound | — | — | 1.00 |
| | Chemical structure IX polyether-modified siloxane compound | 2.00 | — | — |
| | Chemical structure X polyether-modified siloxane compound | — | — | — |
| | TEGO Wet 270 | — | — | — |
| | SILFACE SAG503A | — | — | — |
| | UNIDYNE ™ DSN403N | — | 1.00 | — |
| | Zonyl FS-300: | — | — | — |
| | Surfynol 104E | — | — | — |
| | SOFTANOL EP7025 | 2.00 | — | — |
| Mildew-proofing agent | Proxel GXL | 0.05 | 0.05 | 0.05 |
| Foam Inhibitor (Defoaming Agent) | 2,4,7,9-tetramethyldecane-4,7-diol | 0.40 | — | 0.50 |
| | 2,5,8,11-tetramethyldodecane-5,8-diol | — | 0.40 | — |

TABLE 5-continued

|  | | Comparative Example | | |
|---|---|---|---|---|
| Component (percent by mass) | | 6 | 7 | 8 |
| pH regulator | 2-amino-2-ethyl-1,3-propane diol | 0.20 | 0.10 | 0.20 |
|  | Pure water | Rest | Rest | Rest |
| Total (Percent by mass) | | 100 | 100 | 100 |

Abbreviations, etc. shown in Tables 1 to 5 represent the following.

SENSIJET SMART Magenta 3122BA: (surface treated pigment dispersion, sodium aminobenzoate, manufactured by SENSIENT Corporation)

SENSIJET SMART Cyan 3154BA: (surface treated pigment dispersion, sodium aminobenzoate, manufactured by SENSIENT Corporation)

SENSIJET SMART Yellow 3074BA: (surface treated pigment dispersion, sodium aminobenzoate, manufactured by SENSIENT Corporation)

SENSIJET SMART Black SDP2000: (surface treated pigment dispersion, sodium carbonate, sodium sulfonate, manufactured by SENSIENT Corporation)

TAKELAC™ W-6110: polycarbonate polyurethane resin emulsion (effective solid portion 33.9 percent by mass, viscosity at 25 degrees C.: 455 mPa·s, manufactured by Mitsui Chemicals, Inc.)

VINYBLAN 700: Vinyl chloride-based acrylic resin emulsion (effective solid portion 30.0 percent by mass, viscosity at 25 degrees C.: 100 mPa·s, manufactured by Nisshin Chemical Co., Ltd.)

Organic compound represented by Chemical structure (3-n-buthoxy-N,N-dimethyl propaneamide)

Structure unit 1

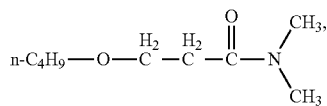

SP value: 9.03

Organic compound represented by Chemical structure 4 (3-ethyl-3-hydroxymethyl oxetane)

Chemical structure 4

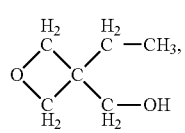

SP value: 11.3

Polyether-modified siloxane compound represented by Chemical structure VII

Chemical structure VII

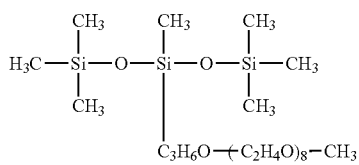

Polyether-modified siloxane compound represented by Chemical structure IX

Chemical structure IX

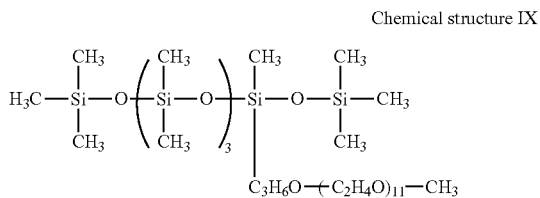

Polyether-modified siloxane compound represented by Chemical structure X

Chemical structure X

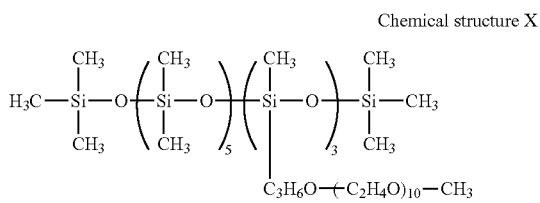

TEGO Wet 270 (polyether-modified siloxane compound (effective component: 100 percent by mass,) manufactured by Evonik Industries AG)

TEGO Wet 270 is a polyether-modified siloxane compound represented by Chemical formula III.

SILFACE SAG503A: (polyether-modified siloxane compound (effective component: 100 percent by mass, manufactured by Nisshin Chemical Co., Ltd.)

SILFACE SAG503A is a polyether-modified siloxane compound represented by the Chemical formula V UNIDYNE™ DSN403N: Polyoxyethylene perfluoroalkyl ether (effective component 100 percent by mass, manufactured by DAIKIN INDUSTRIES, Ltd.)

ZONYL FS-300: Polyoxyethylene perfluoroalkyl ether (effective component 40 percent by mass, manufactured by E. I. du Pont de Nemours and Company)

Surfynol 104E: acetylene glycol compound (effective component: 100 percent by mass, manufactured by Nisshin Chemical Co., Ltd.)

SOFTANOL EP-7025: Higher alcohol ethoxylate compound (effective component: 100 percent by mass, manufactured by Nippon Shokubai Co., Ltd.)

PROXEL GXL: mildew-proofing agent (effective component: 20 percent by mass, containing dipropylene glycol, manufactured by Avecia) mainly composed of 1,2-benzisothiazolin-3-one.

Properties of the inks prepared in Examples 1 to 15 and Comparative Examples 1 to 8 were measured in the following manner. The results are shown in Table 6.

Measuring of Viscosity

Viscosity of the ink was measured at 25 degrees C. by using a viscometer (RE-550L, manufactured by TOKI SANGYO CO., LTD.).

Measuring of pH pH of each ink was measured at 25 degrees C. using a pH meter (HM-30R type, manufactured by DKK-TOA CORPORATION).

Measuring of Dynamic Surface Tension

Dynamic surface tension of each ink was measured at 25 degrees C. at a surface life of 15 msec by SITA_DynoTester (manufactured by SITA Messtechnik GmbH) as measured by maximum bubble pressure technique.

Static Surface Tension

Static surface tension of each ink was measured at 25 degrees C. using an automatic surface tensiometer (DY-300, manufactured by KYOWA INTERFACE SCIENCE Co., Ltd.).

TABLE 6

| | Ink Property values | | | | |
|---|---|---|---|---|---|
| | Viscosity (mPa·s) | pH | 15 msec dynamic surface tension A (mN/m) | Static surface tension B (mN/m) | $[(A - B)/(A + B)] \times 100$ |
| Example 1 | 8.2 | 9.5 | 33.2 | 24.3 | 15.5 percent |
| Example 2 | 8.5 | 9.6 | 31.7 | 22.9 | 16.1 percent |
| Example 3 | 8.6 | 9.7 | 32.9 | 23.9 | 15.8 percent |
| Example 4 | 8.4 | 9.7 | 29.7 | 22.1 | 14.7 percent |
| Example 5 | 8.0 | 9.4 | 33.3 | 26.8 | 10.8 percent |
| Example 6 | 8.9 | 9.7 | 28.9 | 21.5 | 14.7 percent |
| Example 7 | 8.7 | 9.7 | 32.3 | 22.6 | 17.7 percent |
| Example 8 | 8.4 | 9.5 | 29.0 | 21.6 | 14.6 percent |
| Example 9 | 8.1 | 9.2 | 27.5 | 20.8 | 13.9 percent |
| Example 10 | 8.2 | 9.5 | 32.4 | 26.1 | 10.8 percent |
| Example 11 | 9.5 | 9.6 | 32.3 | 23.3 | 16.2 percent |
| Example 12 | 8.5 | 9.5 | 30.1 | 22.5 | 14.4 percent |
| Example 13 | 9.7 | 9.4 | 32.9 | 23.2 | 17.3 percent |
| Example 14 | 9.5 | 9.6 | 29.7 | 22.6 | 13.6 percent |
| Example 15 | 9.1 | 9.5 | 28.4 | 22.9 | 10.7 percent |
| Comparative Example 1 | 9.8 | 9.3 | 31.8 | 22.7 | 16.7 percent |
| Comparative Example 2 | 10.4 | 9.4 | 32.0 | 23.1 | 16.2 percent |
| Comparative Example 3 | 8.4 | 9.0 | 28.8 | 19.5 | 19.3 percent |
| Comparative Example 4 | 8.3 | 9.1 | 35.1 | 22.5 | 21.9 percent |
| Comparative Example 5 | 8.1 | 9.4 | 34.8 | 29.5 | 8.2 percent |
| Comparative Example 6 | 8.2 | 9.4 | 37.9 | 30.6 | 10.7 percent |
| Comparative Example 7 | 10.1 | 9.2 | 29.7 | 19.8 | 20.0 percent |
| Comparative Example 8 | 10.4 | 9.3 | 33.6 | 25.0 | 14.7 percent |

Image Forming

In an environment at 22.5 to 23.5 degrees C. and 45 to 55 percent RH, using an image forming apparatus (TPSiO GXe-5500, manufactured by RICOH CO., LTD.), while changing the drive voltage of the piezo element to discharge the same amount of ink in order that the attachment amount of the ink on OK topcoat+ (weight: 104.7 g/m$^2$) as recording medium was the same.

Next, image density, anti-beading, discharging stability-1, discharging stability-2, fixability-I, and fixability-II of Examples 1 to 15 and Comparative Examples 1 to 8 were evaluated in the following manner. The results are shown in Tables 7 and 8.

In addition, discharging stability-3 and discharging stability-4 of Examples 1 to 15 were evaluated in the following manner. The results are shown in Table 9.

Image Density

The chart including a "black square" of a 64 point text prepared by Microsoft Word 2000 was printed on MyPaper (manufactured by Ricoh Company Ltd.) as recording medium and the color of the black square portion on the print surface was measured by spectrodensitometer (X-Rite 939, manufactured by X-Rite Inc.) and evaluated according to the following criteria. The printing mode used was: a modified mode in which "Plain Paper—Standard Fast" was modified to "no color calibration" from the user setting for plain paper by a driver installed onto the printer. The rating C and above are allowable in terms of practical use.

Evaluation Criteria

A: Black: 1.25 or greater, Yellow: 0.8 or greater, Magenta: 1.00 or greater, Cyan: 1.05 or greater B: Black: 1.20 to less than 1.25, Yellow: 0.75 to less than 0.8, Magenta: 0.95 to less than 1.00, Cyan: 1.00 to less than 1.05

C: Black: 1.15 to less than 1.20, Yellow: 0.70 to less than 0.75, Magenta: 0.90 to less than 0.95, Cyan: 0.95 to less than 1.00

D: Black: less than 1.15, Yellow: less than 0.70, Magenta: less than 0.90, Cyan: less than 0.95

Anti-Beading

The recording medium was changed to OK TOP COAT+ (weight: 104.7 g/m$^2$, manufactured by OJI PAPER CO., LTD.) and the print mode used was modified from "gloss paper—aesthetic" to "No Color Calibration" by the driver installed onto the printer. Solid images were printed in the same manner as in the evaluation of image density to visually check density uniformity (beading) of the solid image and evaluated according to the following criteria. The rating C and above are allowable in terms of practical use.

Evaluation Criteria
A: Nothing at all
B: Slightly observed
C: Fairly observed
D: Significantly observed Since the black solid image was very difficult for visual confirmation, it was observed by an optical microscope with a magnifying power of 40 times.

Discharging Stability-1: Intermittent Discharging Evaluation

A chart of solid images having an area ratio of 5 percent per color created by WORD 2000 (created by Microsoft Corporation) was continuously printed with a run length of 200 sheet of MyPaper (manufactured by RICOH Company Ltd.) and disturbance of discharging from each nozzle after the printing was evaluated according to the following criteria. The print mode used: A modified mode in which "Plain Paper—Standard Fast" was modified to "No Color Calibration" from the user setting for plain paper by the driver installed onto the printer. The rating B and above are allowable in terms of practical use.

Evaluation Criteria
A: No discharging disturbance
B: Slight discharging disturbance observed
C: Discharging disturbance observed or no discharging observed Discharging Stability 2: Nozzle Plate Ink Repelling Time In an environment at 22.5 to 23.5 degrees C. and 45 to 55 percent RH, 50 g of each ink was loaded into a 50 mL beaker. The nozzle plate of the head used in the image forming apparatus (IPSiO GXe-5500, manufactured by RICOH CO., LTD.) was taken out and nipped by tweezers and dipped into the ink at a rate of 315 mm/minute and taken out at the same rate to measure the ink repelling time from the ink repelling layer of the nozzle plate according to the following criteria followed by the evaluation according to the following criteria. The repelling ink layer of the nozzle plate was Optool DSX, manufactured by DAIKIN INDUSTRIES, Ltd. The rating C and above are allowable in terms of practical use.

Evaluation Criteria
A: Ink repelling time less than 10 seconds
B: Ink repelling time 10 to less than 30 seconds
C: Ink repelling time 30 to less than 60 seconds
D: Ink repelling time 60 seconds or longer If the ink repelling time is long, the nozzle plate is easily wet by the ink so that the ink tends to be non-discharged in the continuous discharging evaluation.

Discharging Stability-3: Discharging Stability Using Circulation Type Head

In an environment in which the temperature and moisture were adjusted to be at 22.5 to 23.5 degrees C. and 45 to 55 percent RH, using liquid discharging device (remodeled based on IPSIO GXe-5500, manufactured by Ricoh Co., Ltd.) onto which the circulation type liquid discharging mechanism illustrated in FIGS. 3 to 5 was installed, the drive voltage of the piezoelectric element was changed in order that the same amount of the ink was discharged to cause the same amount of the ink to be attached to a recording medium.

Next, a print chart having a print area of 5 percent was printed with a run length of 1,000 sheets. After 24 hour suspension immediately after the printing with a run length of 1,000 sheets, each of a solid image, a half tone image, and a nozzle check pattern was printed on 5 sheets of commercial inkjet paper (SWORD iJET 43 gloss, manufactured by MITSUBISHI PAPER MILLS LIMITED).

The sheets were visually observed to check uniformity of the images and non-discharging nozzle to evaluate discharging disturbance and nozzle clogging. The print conditions were that the recording density was 600 dpi×300 dpi with 100 percent duty and one pass printing. The evaluation criteria are as follows. In this evaluation, ink was constantly circulated irrespective of up-time or downtime of the circulation type discharging head. The rating B and above are allowable in terms of practical use.

Evaluation Criteria
A: Non discharging disturbance with no clogging
B: Slight discharging disturbance with no clogging
C: Significant discharging disturbance with clogging Discharging Stability-4: Discharging Stability Using Normal Head In an environment in which the temperature and moisture were adjusted to be at 22.5 to 23.5 degrees C. and 45 to 55 percent RH, using a liquid discharging device (IPSIO GXe-5500, manufactured by Ricoh Co., Ltd.), the drive voltage of the piezoelectric element was changed in order that the same amount of the ink was discharged to cause the same amount of the ink to be attached to a recording medium.

Next, a print chart having a print area of 5 percent was printed with a run length of 1,000 sheets. After 24 hour suspension immediately after the printing with a run length of 1,000 sheets, each of a solid image, a half tone image, and a nozzle check pattern was printed on 5 sheets of commercial inkjet paper (SWORD iJET 43 gloss, manufactured by MITSUBISHI PAPER MILLS LIMITED). The sheets were visually observed to check uniformity of the images and non-discharging nozzle to evaluate discharging disturbance and nozzle clogging. The print conditions were that the recording density was 600 dpi×300 dpi with 100 percent duty and one pass printing. The evaluation criteria are as follows. In this evaluation, ink was constantly circulated irrespective of up-time or downtime of the circulation type discharging head. The rating B and above are allowable in terms of practical use.

Evaluation Criteria
A: Non discharging disturbance with no clogging
B: Slight discharging disturbance with no clogging
C: Significant discharging disturbance with clogging Fixability-I The recording medium was changed to OK TOP COAT+ (weight: 104.7 g/m$^2$, manufactured by OJT PAPER CO., LTD.) and the print mode used was modified from "gloss paper—fast" to "No Color Calibration" by the driver installed onto the printer.

Solid images were printed in the same manner as in the image density and dried for 30 seconds by a natural convection type drier in which the inner temperature was set to 100 degrees C. Thereafter, the solid image was abraded 20 times out and home with white paper OK TOPCOAT+ set in an abrasion tester (Clockmeter, manufactured by TOYO SEIKI KOGYO CO. LTD.). Density of the contamination on the abraded white paper was measured by a spectrodensitometer (X-Rite939, manufactured by X-Rite Inc.) to make an evaluation according to the following criteria. The background density of the recording medium was excluded from the density of the contamination. The rating C and above are allowable in terms of practical use.

Evaluation Criteria
A: Less than 0.1
B: 0.1 to less than 0.3
C: 0.3 to less than 0.5
D: 0.5 or greater Fixability-II The recording medium was changed to OK TOP COAT+ (weight: 104.7 g/m², manufactured by OJI PAPER CO., LTD.) and the print mode used was modified from "gloss paper—fast" to "No Color Calibration" by the driver installed onto the printer.

Solid images were printed in the same manner as in the image density and dried for 10 seconds by a natural convection type drier in which the inner temperature was set to 100 degrees C. Thereafter, the solid image was overlapped on white paper OK TOPCOAT+ and left in an environment of 25 degrees C. and 50 percent RH under a load of 5 kg/cm² for two hours. After the two hour resting, the overlapped solid image and the white paper were peeled off and the area of the solid image transferred onto the white paper was visually observed to make an evaluation according to the following criteria. The rating C and above are allowable in terms of practical use.

Evaluation Criteria
A: No transfer observed
B: Minute points of images transferred
C: Image slightly transferred
D: Image transferred

TABLE 7

| | Image Density | Beading | Discharging stability-1 Intermittent discharging evaluation | Discharging stability-2 Ink repelling time |
|---|---|---|---|---|
| Example 1 | B | B | A | A |
| Example 2 | A | A | A | A |
| Example 3 | A | A | A | A |
| Example 4 | A | A | A | A |
| Example 5 | B | B | A | A |
| Example 6 | A | A | A | B |
| Example 7 | A | A | A | A |
| Example 8 | A | A | A | A |
| Example 9 | A | A | A | B |
| Example 10 | A | A | A | A |
| Example 12 | B | B | B | A |
| Example 13 | A | B | B | A |
| Example 14 | A | B | B | A |
| Example 15 | A | A | B | A |
| Example 16 | A | A | B | B |
| Comparative Example 1 | B | C | B | A |
| Comparative Example 2 | B | D | B | A |
| Comparative Example 3 | A | A | B | D |
| Comparative Example 4 | B | C | A | D |
| Comparative Example 5 | B | D | B | A |
| Comparative Example 6 | C | D | B | A |
| Comparative Example 7 | A | B | B | D |
| Comparative Example 8 | B | A | D | A |

TABLE 8

| | Fixability-I | Fixability-II |
|---|---|---|
| Example 1 | A | C |
| Example 2 | B | B |
| Example 3 | B | A |
| Example 4 | B | A |
| Example 5 | B | A |
| Example 6 | A | C |
| Example 7 | B | B |
| Example 8 | B | A |
| Example 9 | B | A |
| Example 10 | B | A |
| Example 12 | B | A |
| Example 13 | B | A |
| Example 14 | B | A |
| Example 15 | B | A |
| Example 16 | B | A |
| Comparative Example 1 | A | D |
| Comparative Example 2 | D | B |
| Comparative Example 3 | B | A |
| Comparative Example 4 | B | A |
| Comparative Example 5 | B | B |
| Comparative Example 6 | B | B |
| Comparative Example 7 | A | D |
| Comparative Example 8 | A | D |

TABLE 9

| | Discharging stability-3 Circulation type head | Discharging stability-4 Normal head |
|---|---|---|
| Example 1 | A | B |
| Example 2 | A | A |
| Example 3 | A | A |
| Example 4 | A | A |
| Example 5 | A | B |
| Example 6 | B | B |
| Example 7 | A | A |
| Example 8 | A | A |
| Example 9 | B | B |
| Example 10 | A | A |
| Example 11 | B | B |
| Example 12 | A | B |
| Example 13 | B | B |
| Example 14 | A | B |
| Example 15 | B | B |

Aspects of the present disclosure are, for example, as follows.

1. An ink includes a coloring material, one or more organic solvents, a resin particle, and water. The resin particle includes a structure unit having a carboxyl group and a structure unit having an alkoxysilyl group. The one or more organic solvents include at least one organic solvent having a solubility parameter of from 8.96 to less than 11.8. The ink has a dynamic surface tension A of 34.0 mN/m or less for a surface life of 15 msec at 25 degrees C. according to maximum bubble pressure technique. The dynamic surface tension A and the static surface tension B of the ink at 25 degrees C. satisfy the following relation:

$$10.0 \text{ percent} \leq [(A-B)/(A+B)] \times 100 \leq 19.0 \text{ percent}.$$

2. The ink according to 1 mentioned above, wherein the resin particle has a glass transition temperature (Tg) of 15 degrees C. or higher.

3. The ink according to 1 or 2 mentioned above, wherein the ink has a dynamic surface tension A of 30.0 mN/m or less for a surface life of 15 msec at 25 degrees C. according to maximum bubble pressure technique. The dynamic surface tension A and the static surface tension B at 25 degrees C. satisfy the following relation:

12.0 percent≤[(A−B)/(A+B)]×100≤17.0 percent.

4. The ink according to any one of 1 to 3 mentioned above has a dynamic surface tension of from 20.0 to 30.0 mN/m at 25 degrees C.

5. The ink according to any one of 1 to 4 mentioned above, wherein the organic solvent having a solubility parameter of 8.96 to less than 11.8 includes at least one member selected from the group consisting of compounds represented by the following Chemical formula I and II.

Chemical formula I

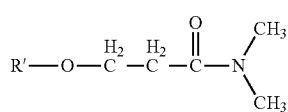

In the Chemical formula I, R' represents an alkyl group having 4 to 6 carbon atoms, Chemical formula II

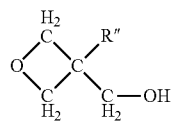

In the Chemical formula II, R" represents an alkyl group having one or two carbon atoms.

6. The ink according to any one of 1 to 5 mentioned above, wherein the organic solvent having a solubility parameter of 8.96 to less than 11.8 accounts for 10 percent by mass or greater of the total content of the ink.

7. The ink according to any one of 1 to 6 mentioned above, wherein the organic solvent having a solubility parameter of 8.96 to less than 11.8 accounts for 20 to 60 percent by mass of the total content of the ink.

8. The ink according to any one of 1 to 7 mentioned above, wherein the organic solvent includes no polyhydric alcohol having an equilibrium moisture content of 30 percent or more at 23 degrees C. and a relative humidity of 80 percent.

9. The ink according to any one of 1 to 8 mentioned above, further includes a polyether-modified siloxane compound as surfactant.

10. The ink according to 9 mentioned above, wherein the polyether-modified siloxane compound is at least one member selected from the group consisting of compounds represented by the following Chemical formula III to VI.

Chemical formula III

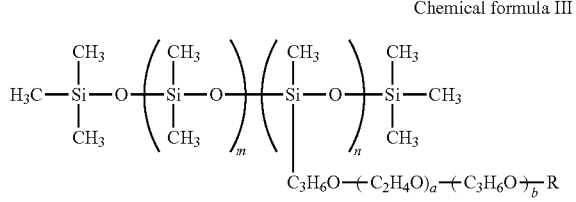

In the Chemical formula III, m represents 0 or an integer of from 1 to 23 and n represents an integer of from 1 to 10. a represents an integer of from 1 to 23 and b represents 0 or an integer of from 1 to 23. R represents a hydrogen atom or an alkyl group having 1 to 4 carbon atoms, Chemical formula IV

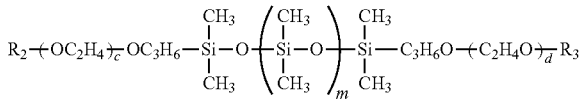

In the Chemical formula IV, m represents an integer of from 1 to 8 and each c and d independently represent integers of from 1 to 10. Each $R_2$ and $R_3$ independently represent hydrogen atoms or alkyl groups having 1 to 4 carbon atoms.

Chemical formula V

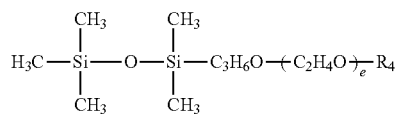

In the Chemical formula V, e represents an integer of from 1 to 8 and $R_4$ represents a hydrogen atom or an alkyl group having 1 to 4 carbon atoms, Chemical formula VI

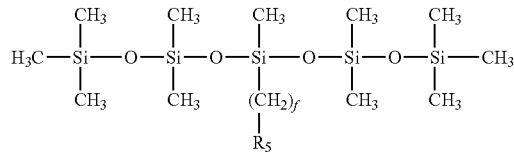

In the Chemical formula VI, f represents an integer of from 1 to 8, $R_5$ represents a polyether group represented by the following chemical formula a.

Chemical formula a

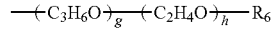

In the Chemical formula a, g represents 0 or an integer of from 1 to 23 and h represents 0 or an integer of from 1 to 23, excluding the case in which g and h are 0 at the same time. $R_6$ represents a hydrogen atom or an alkyl group having 1 to 4 carbon atoms.

11. The ink according to 9 or 10 mentioned above, wherein the polyether-modified siloxane compound has a proportion of from 0.001 to 5 percent by mass.

12. The ink according to any one of 1 to 11 mentioned above, wherein the coloring material is a water-dispersible pigment.

13. The ink according to 12 mentioned above, wherein the water-dispersible pigment has a hydrophilic functional group at a surface thereof and the hydrophilic functional group is a quaternary ammonium salt.

14. The ink according to 13 mentioned above, wherein the water-dispersible pigment is reformed by at least one of a geminalbis phosphonic acid group and a geminalbis phosphonic acid salt group.

15. The ink according to any one of 12 to 14 mentioned above, wherein the water-dispersible pigment is at least one member selected from the group consisting of black pigment, cyan pigment, magenta pigment, and yellow pigment.

16. The ink according to any one of 1 to 15 mentioned above, wherein the ink is used for inkjet recording or spray painting.

17. An ink container includes an ink accommodating unit accommodating the ink of any one of 1 to 16 mentioned above.

18. An image forming method includes applying at least one stimulus selected from the group consisting of heat, pressure, vibration, and light to the ink of any one of 1 to 16 mentioned above and jetting the ink to record an image thereon.

19. An image forming apparatus includes an ink discharging device to apply at least one stimulus selected from the group consisting of heat, pressure, vibration, and light to the ink of any one of 1 to 16 mentioned above to jet the ink to a recording medium to record an image thereon.

20. A formed image matter includes a recording medium and an image layer on the recording medium. The image layer includes a coloring material, one or more organic solvents, a resin particle, and water. The resin particle includes a structure unit having a carboxyl group and a structure unit having an alkoxysilyl group. The one or more organic solvents include at least one organic solvent having a solubility parameter of from 8.96 to less than 11.8. The ink has a dynamic surface tension A of 34.0 mN/m or less for a surface life of 15 msec at 25 degrees C. according to maximum bubble pressure technique. The dynamic surface tension A and the static surface tension B of the ink at 25 degrees C. satisfy the following relation:

10.0 percent≤[($A-B$)/($A+B$)]×100≤19.0 percent.

21. A liquid discharging device includes the ink of any one of 1 to 16 mentioned above and a liquid discharging portion including nozzles to discharge the ink. The liquid discharging portion includes a nozzle to discharge the ink, a liquid chamber to communicate with the nozzle, a supply port through which the ink flows into the liquid chamber, and a circulation port through which the ink flows out of the liquid chamber, and a circulating device to cause the ink that has flown into the liquid chamber through the supply port to partially or entirely flow out of the liquid chamber through the circulation port. The ink has a dynamic surface tension A of 34.0 mN/m or less for a surface life of 15 msec at 25 degrees C. according to maximum bubble pressure technique. The dynamic surface tension A and a static surface tension B of the ink at 25 degrees C. satisfy the following relation:

10.0 percent≤[($A-B$)/($A+B$)]×100≤19.0 percent.

22. An ink includes a coloring material, an organic solvent, a resin particle, and water. The resin particle includes a structure unit having a carboxyl group and a structure unit having an alkoxysilyl group. The organic solvent includes at least one member selected from the group consisting of the compounds represented by the following Chemical structure 1 to Chemical structure 5.

Chemical structure 1

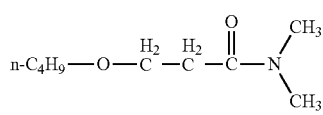

Chemical structure 2

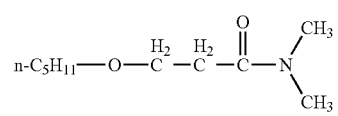

Chemical structure 3

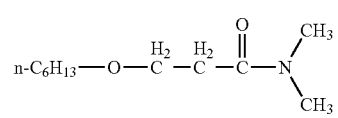

Chemical structure 4

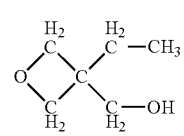

Chemical structure 5

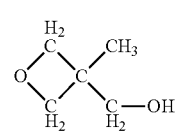

According to the present disclosure, ink is provided which has good image fixability and discharging stability and with which quality images can be formed on general printing paper in addition to plain paper while beading is suppressed.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink comprising:
a coloring material;
an organic solvent;
a resin particle including a structure unit having a carboxyl group and a structure unit having an alkoxysilyl group;
water, and
a polyether-modified siloxane compound,
wherein the organic solvent comprises an organic solvent having a solubility parameter of 8.96 to less than 11.8,
wherein the ink has a dynamic surface tension A of 34.0 mN/m or less for a surface life of 15 msec at 25 degrees C. according to maximum bubble pressure technique,
wherein the dynamic surface tension A and a static surface tension B of the ink at 25 degrees C. satisfy the following relation:

10.0 percent≤[($A-B$)/($A+B$)]×100≤19.0 percent, and wherein the polyether-modified siloxane compound comprises at least one member selected from the group consisting of compounds represented by the following Chemical formulae III to VI, Chemical formula III

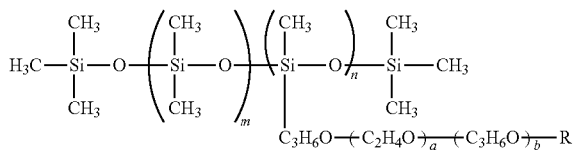

where
m represents 0 or an integer of from 1 to 23,
n represents an integer of from 1 to 10,
a represents an integer of from 1 to 23,
b represents 0 or an integer of from 1 to 23, and
R represents a hydrogen atom or an alkyl group having 1 to 4 carbon atoms, Chemical formula IV

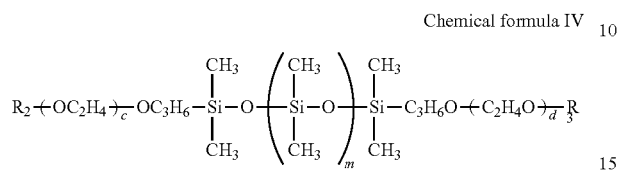

where
m represents an integer of from 1 to 8,
each c and d independently represent integers of from 1 to 10, and
each $R_2$ and $R_3$ independently represent hydrogen atoms or alkyl groups having 1 to 4 carbon atoms, Chemical formula V

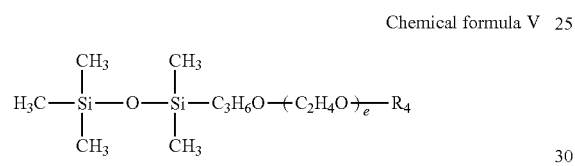

where
e represents an integer of from 1 to 8 and
$R_4$ represents a hydrogen atom or an alkyl group having 1 to 4 carbon atoms, Chemical formula VI

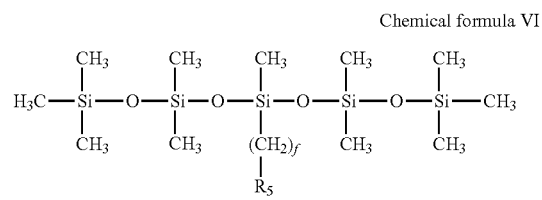

where f represents an integer of from 1 to 8, and
$R_5$ represents a polyether group represented by the following chemical formula a, Chemical formula a

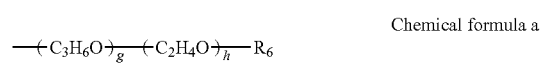

where
g represents 0 or an integer of from 1 to 23 and
h represents 0 or an integer of from 1 to 23, excluding a case in which g and h are 0 at the same time, and
$R_6$ represents a hydrogen atom or an alkyl group having 1 to 4 carbon atoms.

2. The ink according to claim 1,
wherein the resin particle has a glass transition temperature (Tg) of 15 degrees C. or higher.

3. The ink according to claim 1,
wherein the ink has a dynamic surface tension A of 30.0 mN/m or less for a surface life of 15 msec at 25 degrees C. according to maximum bubble pressure technique, wherein the dynamic surface tension A and the static surface tension B at 25 degrees C. satisfy the following relation:

12.0 percent≤[(A−B)/(A+B)]×100≤17.0 percent.

4. The ink according to claim 1,
wherein the static surface tension B at 25 degrees C. is from 20.0 to 30.0 mN/m.

5. The ink according to claim 1,
wherein the organic solvent having the solubility parameter of 8.96 to less than 11.8 comprises at least one member selected from the group consisting of compounds represented by the following Chemical formulae I and II, Chemical formula I

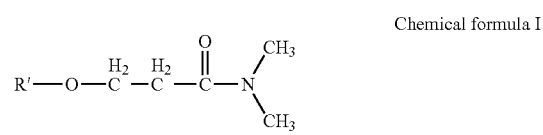

where R' represents an alkyl group having 4 to 6 carbon atoms,

Chemical formula II

where R" represents an alkyl group having one or two carbon atoms.

6. The ink according to claim 1,
wherein the organic solvent does not comprise a polyhydric alcohol having an equilibrium moisture content of from 30 percent or more at 23 degrees C. and a relative humidity of 80 percent.

7. The ink according to claim 1,
wherein the polyether-modified siloxane compound has a proportion of from 0.001 to 5 percent by mass.

8. The ink according to claim 1,
wherein the coloring material comprises a water-dispersible pigment.

9. The ink according to claim 8,
wherein the water-dispersible pigment has a hydrophilic functional group at a surface thereof and the hydrophilic functional group comprises a quaternary ammonium salt.

10. The ink according to claim 9,
wherein the water-dispersible pigment is reformed by at least one of a geminalbis phosphonic acid group and a geminalbis phosphonic acid salt group.

11. The ink according to claim 8, wherein the water-dispersible pigment is at least one member selected from the group consisting of black pigment, cyan pigment, magenta pigment, and yellow pigment.

12. The ink according to claim 1,
wherein the ink is used for inkjet recording or spray painting.

13. An image forming method comprising:
applying at least one stimulus selected from the group consisting of heat, pressure, vibration, and light to the ink of claim 1; and
jetting the ink to record an image.

14. A liquid discharging device, comprising:
an ink comprising:
 a coloring material;
 an organic solvent comprising an organic solvent having a solubility parameter of 8.96 to less than 11.8;
 a resin particle including a structure unit having a carboxyl group and a structure unit having an alkoxysilyl group; and
 water;
a liquid discharging portion comprising:
 a nozzle configured to discharge the ink;
 a liquid chamber configured to communicate with the nozzle;
 a supply port through which the ink flows into the liquid chamber; and
 a circulation port through which the ink flows out of the liquid chamber; and
a circulating device,
wherein the circulating device circulates the ink by partially or entirely taking up the ink from the liquid chamber through the circulation port and supplying back to the liquid chamber through the supply port,
the ink has a dynamic surface tension A of 34.0 mN/m or less for a surface life of 15 msec at 25 degrees C. according to maximum bubble pressure technique, and
wherein the dynamic surface tension A and a static surface tension B of the ink at 25 degrees C. satisfy the following relation:

8.0 percent≤[(A−B)/(A+B)]×100≤19.0 percent, the ink comprises a polyether-modified siloxane compound as surfactant and
the polyether-modified siloxane compound is at least one member selected from the group consisting of compounds represented by the following Chemical formulae III to VI, Chemical formula III

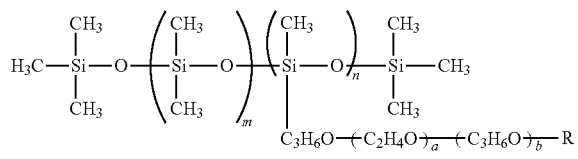

where
m represents 0 or an integer of from 1 to 23,
n represents an integer of from 1 to 10,
a represents an integer of from 1 to 23,
b represents 0 or an integer of from 1 to 23, and
R represents a hydrogen atom or an alkyl group having 1 to 4 carbon atoms, where
m represents an integer of from 1 to 8,
each c and d independently represent integers of from 1 to 10, and
each $R_2$ and $R_3$ independently represent hydrogen atoms or alkyl groups having 1 to 4 carbon atoms, Chemical formula V

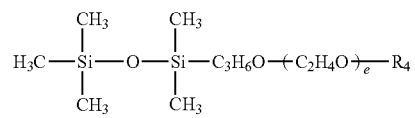

where
e represents an integer of from 1 to 8 and
$R_4$ represents a hydrogen atom or an alkyl group having 1 to 4 carbon atoms, Chemical formula VI

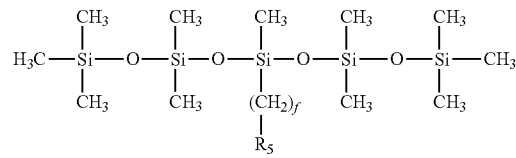

where
f represents an integer of from 1 to 8, and
$R_5$ represents a polyether group represented by the following chemical formula a, Chemical formula a

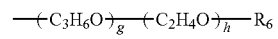

where
g represents 0 or an integer of from 1 to 23 and
h represents 0 or an integer of from 1 to 23, excluding a case in which g and h are 0 at the same time, and
$R_6$ represents a hydrogen atom or an alkyl group having 1 to 4 carbon atoms.

15. The liquid discharging device according to claim 14, wherein the organic solvent having a solubility parameter of 8.96 to less than 11.8 comprises at least one member selected from the group consisting of compounds represented by the following Chemical formula I and the following Chemical formula II, Chemical formula IV

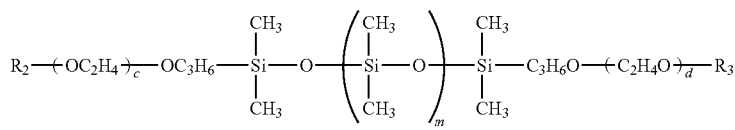

Chemical formula I

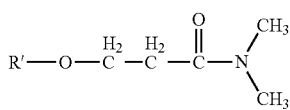

where
R' represents an alkyl group having 4 to 6 carbon atoms,

Chemical formula II

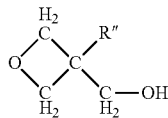

where
R" represents an alkyl group having one or two carbon atoms.

16. An ink, comprising:
a coloring material;
an organic solvent;
a resin particle including a structure unit having a carboxyl group and a structure unit having an alkoxysilyl group; and
water,
wherein the organic solvent comprises an organic solvent having a solubility parameter of 8.96 to less than 11.8,
wherein the ink has a dynamic surface tension A of 34.0 mN/m or less for a surface life of 15 msec at 25 degrees C. according to maximum bubble pressure technique,
wherein the dynamic surface tension A and a static surface tension B of the ink at 25 degrees C. satisfy the following relation:

$$8.0 \text{ percent} \leq [(A-B)/(A+B)] \times 100 \leq 19.0 \text{ percent, and}$$

wherein the organic solvent does not comprise a polyhydric alcohol having an equilibrium moisture content of 30 percent or more at 23 degrees C. and a relative humidity of 80 percent.

17. The liquid discharging device according to claim 14, wherein the circulating device is a pump.

18. The liquid discharging device according to claim 14, further comprising:
a stimulus generating device selected from the group consisting of a heater, a pressure applying device, a piezoelectric element, a piezoelectric element, a vibrator, an ultrasonic wave oscillator and light.

19. The liquid discharging device according to claim 14, further comprising:
a degassing device placed between the circulating device and the supply port.

20. The liquid discharging device according to claim 11, wherein the degassing device comprises an ink chamber and an air chamber.

* * * * *